United States Patent
Sato et al.

(10) Patent No.: US 6,748,018 B2
(45) Date of Patent: *Jun. 8, 2004

(54) PICTURE DECODING METHOD AND APPARATUS

(75) Inventors: Kazushi Sato, Chiba (JP); Kenji Komori, Kanagawa (JP); Tetsuo Kaneko, Kanagawa (JP); Satoshi Mitsuhashi, Tokyo (JP); Naofumi Yanagihara, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/369,001

(22) Filed: Aug. 5, 1999

(65) Prior Publication Data

US 2003/0185456 A1 Oct. 2, 2003

(30) Foreign Application Priority Data

Aug. 7, 1998 (JP) .......................... 10-224885

(51) Int. Cl.[7] .................................. H04B 1/66
(52) U.S. Cl. ......................... 375/240.21; 375/240.12; 375/240.25; 382/236; 382/232; 382/250; 382/238; 348/556
(58) Field of Search ................ 375/240.21, 240.25, 375/240.16, 240.12; 382/250, 232, 238, 236, 246, 251, 245, 248, 107; 348/348, 405, 384, 419, 403, 390, 404, 407, 412, 389, 409

(56) References Cited

U.S. PATENT DOCUMENTS

| | | | | |
|---|---|---|---|---|
| 5,528,299 A | * | 6/1996 | Dufour et al. | 348/412 |
| 5,635,985 A | * | 6/1997 | Boyce et al. | 375/240.15 |
| 5,777,680 A | * | 7/1998 | Kim | 348/405 |
| 5,790,686 A | * | 8/1998 | Koc et al. | 382/107 |
| 5,825,927 A | * | 10/1998 | Boyce et al. | 382/232 |
| 6,041,079 A | * | 3/2000 | Yim | 375/240 |

* cited by examiner

Primary Examiner—Shawn S. An
(74) Attorney, Agent, or Firm—Frommer Lawrence & Haug LLP; William S. Frommer

(57) ABSTRACT

An MPEG downdecoder is to be provided which eliminates dephasing of pixels of moving picture data without losing properties inherent in a picture obtained on interlaced scanning. If an interlaced picture is inputted, and the DCT mode is the field mode, an interlaced picture accommodating picture decoding unit 3 executes 4×4 decimating IDCT. If the DCT mode is the frame mode, the entire coefficients of the DCT block are IDCTed for separation into two pixel blocks associated with interlaced scanning. The separated two pixel blocks are DCTed. The coefficients of the low-frequency components are IDCTed and the two pixel blocks are synthesized together. A progressive picture accommodating picture decoding unit 2 is fed with a progressive picture. The coefficients of the low-frequency components of the DCT block are inverse orthogonal transformed.

4 Claims, 35 Drawing Sheets

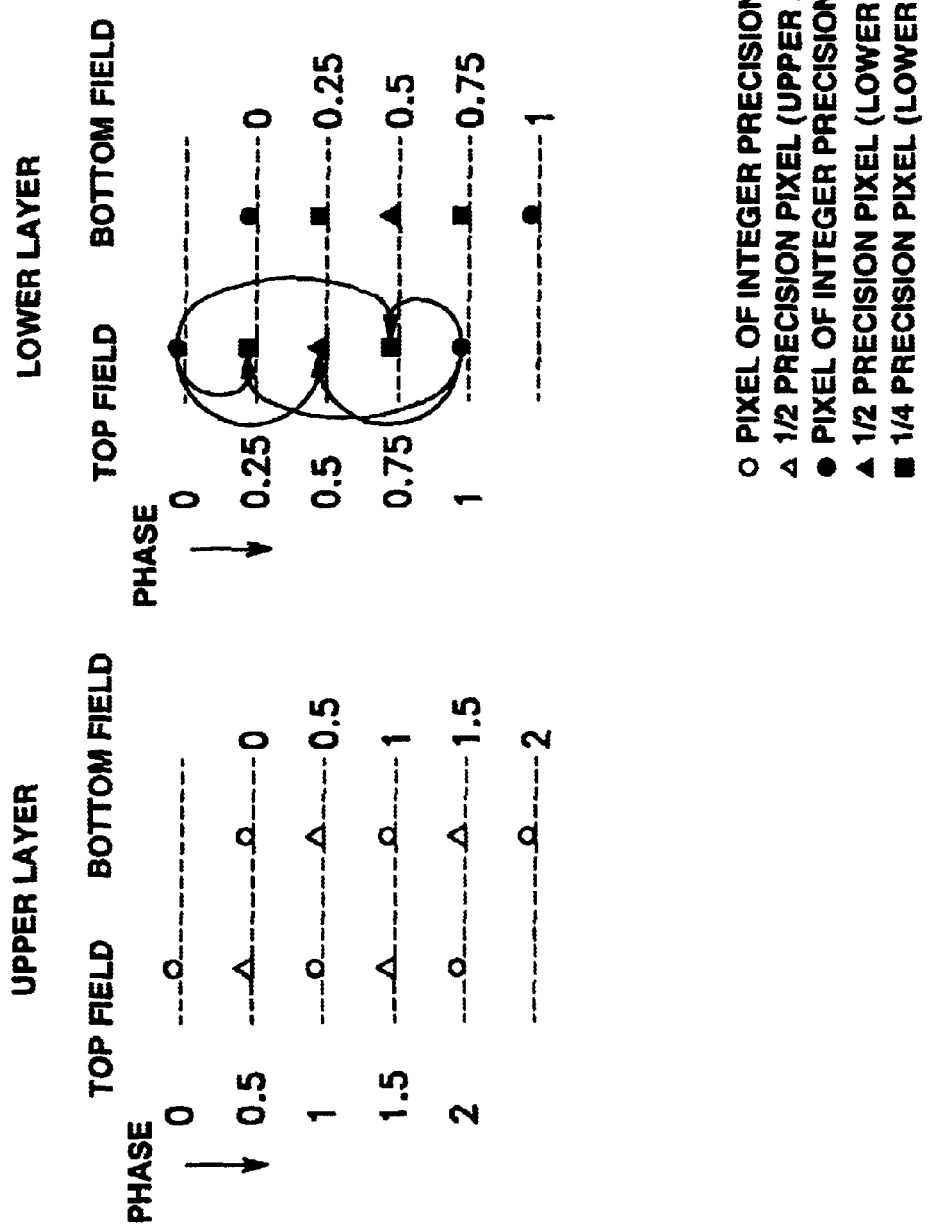

FIG.19

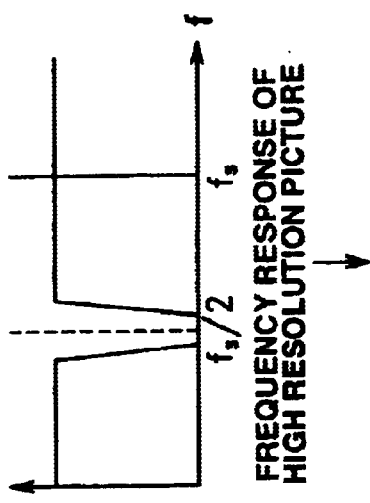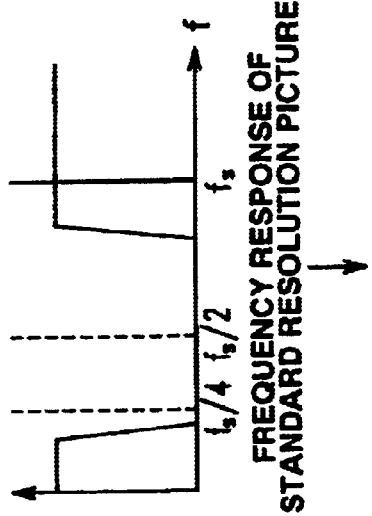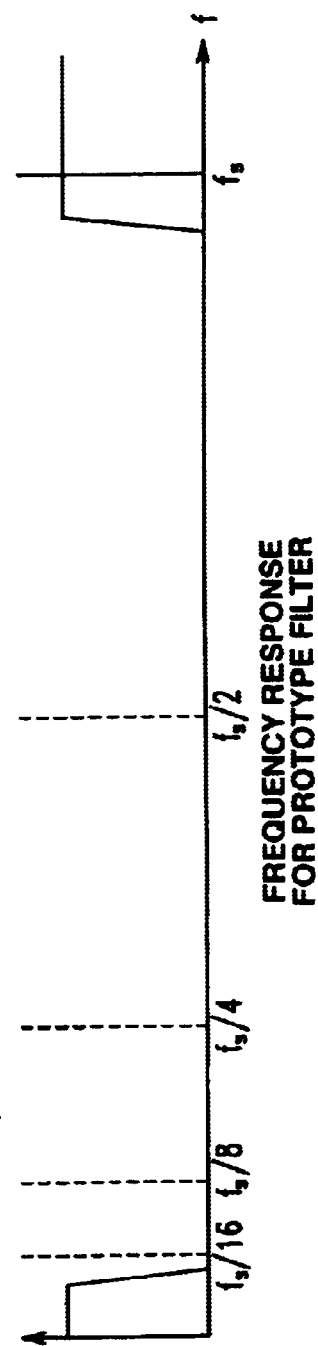

GAIN LIST = {1,1,1,1,1,0,0,0,0,0,0,0,0,0,0,0,0,0,0,0,0,0,0,0,0,0,0,0,0,}

GAIN LIST = {1,1,0,0,0,0,0,0,0,0,0,0,0,}

PICTURE DECODING METHOD AND APPARATUS

BACKGROUND OF THE INVENTION

1. Field of the Invention

This invention relates to a picture decoding method and apparatus for decoding compressed picture data of a first resolution obtained on predictive coding by motion prediction in terms of a pre-set pixel block (macro-block) as a unit and on performing orthogonally-transform in terms of a pre-set pixel block (orthogonal transform block) as a unit. More particularly, it relates to a picture decoding method and apparatus for decoding compressed picture data of the first resolution and for decimating the data to moving picture data of a second resolution lower than the first resolution.

2. Description of the Related Art

There is now going on the standardization of digital television signals employing the picture compression system, such as Moving Picture Experts Group Phase 2 (MPEG2). Among the standards for digital television broadcast, there are a standard for standard resolution pictures, such as those with the number of effective lines in the vertical direction of 576, and a standard for high-resolution pictures, such as those with the number of effective lines in the vertical direction of 1152. Recently, there is raised a demand for a downdecoder for decoding compressed picture data of a high-resolution picture and for reducing the resolution of the compressed picture data by ½ to generate picture data of the picture data of standard resolution to display the picture data on a television monitor adapted to cope with the standard resolution.

There is proposed in a publication entitled "Scalable Decoder free of low-range Drift" (written by Iwahashi, Kanbayashi and Takaya, Shingaku-Gihou CS94-186, DSP 94–108, 1995–01) a downdecoder for decoding a bitstream of, for example, MPEG2, obtained on predictive coding with motion prediction of a high-resolution picture and compression coding by discrete cosine transform, and for downsampling the picture to a picture of standard resolution. This Publication, referred to below as Publication 1, shows the following first to third downdecoders.

Referring to FIG. 1, this first downdecoder includes an inverse discrete cosine transform unit 1001, for processing a bitstream of a high resolution picture with 8 (number of coefficients as counted from the dc component in the horizontal direction) ×8 (number of coefficients as counted from the dc component in the vertical direction), an adder 1002 for adding a discrete cosine transformed high resolution picture and a motion-compensated reference picture, and a frame memory 1003 for transient storage of the reference picture. The first downdecoder also includes a motion compensation unit 1004 for motion-compensating the reference picture stored in the frame memory 1003 with ½ pixel precision, and a downsampling unit 1005 for converting the reference picture stored in the frame memory 1003 to a picture of standard resolution.

This first downdecoder reduces an output picture, obtained on decoding as a high resolution picture by inverse discrete cosine transform, by the downsampling unit 1005, to output resulting picture data with the standard resolution.

Referring to FIG. 2, the second downdecoder includes an inverse discrete cosine transform unit 1011 for performing 8×8 inverse discrete cosine transform, as it substitutes 0 for the high-frequency components of the discrete cosine transform (DCT) block of the high resolution picture, an adder 1012 for summing the discrete cosine transformed high resolution picture to the motion-compensated reference picture, and a frame memory 1013 for transient storage of the reference picture. The second downdecoder also includes a motion compensation unit 1014 for motion-compensating the reference picture stored in the frame memory 1013 with ½ pixel precision, and a downsampling unit 1015 for converting the reference picture stored in the frame memory 1013 to a picture of standard resolution.

This second downdecoder performs inverse discrete cosine transform to obtain a decoded output picture, as a high-resolution picture, as it substitutes 0 for coefficients of high-frequency components among the totality of coefficients of the DCT block, and reduces the output picture in size by the downsampling unit 1015 to output picture data of standard resolution.

Referring to FIG. 3, a third downdecoder includes a decimating inverse discrete cosine transform unit 102 for doing e.g., 4×4 inverse discrete cosine transform, using only the coefficients of the low-frequency components of the DCT block of the bitstream of the high resolution picture, for decoding to a standard resolution picture, and an adder 1022 for summing the standard resolution picture processed with decimating inverse discrete cosine transform and the motion-compensated reference picture. The third downdecoder also includes a frame memory 1023 for transiently storing the reference picture and a motion compensation unit 1024 for motion-compensating the reference picture stored by the frame memory 1023 with a ¼ pixel precision.

In this third downdecoder, IDCT is executed using only low-frequency components of all coefficients of the DCT block to decode a picture of low resolution from a picture of high resolution.

The above-described first downdecoder performs inverse discrete cosine transform on the totality of the coefficients in the DCT block to obtain a high-resolution picture on decoding. Thus, the inverse discrete cosine transform unit 1001 of high processing capability and the frame memory 1003 of high capacity are needed. The second downdecoder performs discrete cosine transform on the coefficients in the DCT block to obtain a high-resolution picture on decoding, as it sets the high-frequency components of the coefficients to zero, so that a lower processing capacity of the inverse discrete cosine transform unit 1011 suffices. However, the frame memory 1003 of high capacity is yet needed. In contradistinction from these first and second downdecoders, the third downdecoder performs inverse discrete cosine transform on the totality of the coefficients in the DCT block, using only coefficients of the low-frequency components of the coefficients in the DCT block, so that a low processing capability of an inverse discrete cosine transform unit 1021 suffices. Moreover, since the reference picture of the standard resolution picture is decoded, a lower capacity of the frame memory 1023 suffices.

Meanwhile, the display system of a moving picture in television broadcast is classified into a sequential scanning system and an interlaced scanning system. The sequential scanning system sequentially displays a picture obtained on sampling the totality of pictures in a given frame at the same timing. The interlaced scanning system alternately displays pictures obtained on sampling pixels in a given frame at different timings from one horizontal line to another.

In this interlaced scanning system, one of the pictures obtained on sampling pixels in a frame at different timings from one horizontal line to another is termed a top field or a first field, with the other picture being termed a bottom field or a second field. The picture containing the leading line in the horizontal direction of a frame becomes the top field, while the picture containing the second line in the horizontal direction of a frame becomes the bottom field. Thus, in the interlaced scanning system, a sole frame is made up of two fields.

With the MPEG2, not only a frame but also a field can be allocated to a picture as a picture compressing unit in order to compress the moving picture signals efficiently in the interlaced scanning system.

If, in the MPEG2, a field is allocated to a picture, the resulting bitstream structure is termed a field structure, whereas, if a frame is allocated to a picture, the resulting bitstream structure is termed a frame structure. In the field structure, a DCT block is constituted by pixels in the field and discrete cosine transform is applied on the field basis. The processing mode of performing field-based discrete cosine transform is termed the field DCT mode. In the frame structure, a DCT block is constituted by pixels in the frame and discrete cosine transform is applied on the frame basis. The processing mode of performing field-based discrete cosine transform is termed the frame DCT mode. In the field structure, a macro-block is constituted from pixels in a field and motion prediction is performed on the field basis. The processing mode of performing motion prediction on the field basis is termed the field motion prediction mode. In the frame structure, a macro-block is constituted from pixels in a frame and motion prediction is performed on the frame basis. The processing mode of performing motion prediction on the frame basis is termed the frame motion prediction mode.

Meanwhile, a picture decoding apparatus, adapted for decoding compressed picture data for the interlaced scanning system, using the third downdecoder shown in the Publication 1, is proposed in, for example, a Publication entitled in "A Compensation Method of Drift Errors in Scalability" written by N. Obikane, K. Tahara and J. Yonemitsu, HDTV Work Shop '93. This Publication is hereinafter termed the Publication 2.

Referring to FIG. 4, the conventional picture decoding device, shown in Publication 2, includes a bitstream analyzer 1031, fed with a bitstream obtained on compressing a high resolution picture in accordance with the MPEG2, for analyzing this bitstream, a variable length encoding/decoding unit 1032 for variable length encoding data for allocating codes of lengths corresponding to the data occurrence frequency and for decoding the variable length encoded bitstream, and a dequantizer 1033 for multiplying the respective coefficients of the DCT block with quantization steps. The conventional picture decoding device also includes a decimating inverse discrete cosine transform unit 1034 for decoding a standard resolution picture by e.g., 4×4 inverse discrete cosine transform using only coefficients of low-frequency components of the totality of the coefficients of the DCT block, and an adder 1035 for summing the standard resolution picture processed with decimating inverse discrete cosine transform to a motion-compensated reference picture. The conventional picture decoding device also includes a frame memory 1036 for transiently storing the reference picture and a motion compensation unit 1037 for motion compensating the reference picture stored in the frame memory 1036 to a ¼ pixel precision.

The decimating inverse discrete cosine transform unit 1034 of the conventional picture decoding device, shown in the Publication 2, performs the inverse discrete cosine transform, using only the coefficients of the low-frequency components of the totality of the coefficients in the DCT block. It is noted that the positions of the coefficients of the frame DCT mode, processed with the inverse discrete cosine transform, differ from those of the field DCT mode.

Specifically, in the field DCT mode, the decimating inverse discrete cosine transform 1034 applies the inverse discrete cosine transform only on the 4×4 of 8×8 coefficients in the DCT block, as shown in FIG. 5. On the other hand, in the frame DCT mode, the decimating inverse discrete cosine transform 1034 applies the inverse discrete cosine transform only on the 4×2+4×2 of 8×8 coefficients in the DCT block, as shown in FIG. 6.

Also, the motion compensation unit 1037 of the conventional picture decoding device performs motion compensation to ¼ pixel precision, adapted to cope with the field motion prediction mode or with the frame motion prediction mode, based on the information (motion vector) on the motion prediction performed on the high resolution picture. Specifically, while the MPEG2 usually provides that the motion compensation be performed to ½ pixel precision, the number of pixels in a picture is thinned out to one-half if a standard resolution picture is to be decoded from a high resolution picture. Thus, the motion compensation unit 1037 performs motion compensation as it sets the pixel precision for motion compensation to ¼ pixel.

Therefore, the motion compensation device 1037 performs linear interpolation on the pixels of the reference picture stored in the frame memory 1036 as a standard resolution picture to generate pixels to a ¼ pixel accuracy.

Specifically, the processing for linear interpolation of pixels in the perpendicular direction for the field motion prediction mode and that for the frame motion prediction mode are explained with reference to FIGS. 7 and 8, in which the phase of pixels in the vertical direction is indicated in the perpendicular direction, with the phase of each pixel in a displayed picture being indicated by an integer.

Referring to FIG. 7, the processing for interpolation of a picture motion-predicted in the field motion prediction mode is explained. For a high resolution picture (upper layer), motion compensation is independently performed to a ½ pixel precision, from field to field, as shown in FIG. 7A. On the other hand, for a standard resolution picture (lower layer), motion compensation is achieved by generating pixels dephased by ¼, ½ and ¾ pixel in the perpendicular direction by linear interpolation in a field based on the pixel of an integer number precision, as shown in FIG. 7B. That is, in the standard resolution picture (lower layer), pixels with ¼ pixel precision of the top field are generated by linear interpolation based on the pixels of the integer number precision of the top field, while those with ¼ pixel precision of the bottom field are generated by linear interpolation based on the pixels of the integer number precision of the bottom field. It is assumed for example that the value of a pixel of the top field, having the phase in the perpendicular direction at the 0-position, is a, with the value of a pixel having the phase in the perpendicular direction at the 1-position being b. In this case, the pixel of the top field with the phase in the perpendicular direction of ¼ is (3a+b)/4, while the pixel of the top field with the phase in the perpendicular direction of ½ is (a+b)/2, with the pixel of the top field with the phase in the perpendicular direction of ¾ being (a+3b)/4.

Referring to FIG. 8, the processing of interpolation of a picture motion-predicted in the frame motion prediction mode is explained. For a high resolution picture (upper layer), interpolation processing is performed across the fields, that is across the bottom field and the top field, as shown in FIG. 8A, with the motion compensation precision being ½ pixel precision. For a standard resolution picture (lower layer), motion compensation is achieved by generating pixels dephased by ¼, ½ and 3/4 pixels in the perpendicular direction, based on the pixels of the integer number precision of two fields, that is the top field and the bottom field, as shown in FIG. 8B. For example, it is assumed that the value of a pixel of the bottom field having the phase in the perpendicular direction of−1 is a, the value of a pixel of the top field having the phase in the perpendicular direction of 0 is b, the value of a pixel of the bottom field having the phase in the perpendicular direction of 1 is c, the value of a pixel of the top field having the phase in the perpendicular direction of 2 is d, and a pixel of the top field having the phase in the perpendicular direction of 3 is e. In this case, the pixels of ¼ pixel precision, having the phase in the perpendicular direction in a range from 0 and 2, may be found as follows:

The pixel having the phase in the perpendicular direction of ¼ is $(a+4b+3c)/8$, while the pixel having the phase in the perpendicular direction of ½ is $(a+3c)/4$. The pixel having the phase in the perpendicular direction of ¾ is $(a+2b+3c+2d)/8$, while the pixel having the phase in the perpendicular direction of 5/4 is $(2b+3c+2d+e)/8$. The pixel having the phase in the perpendicular direction of 3/2 is $(3c+e)/4$, while the pixel having the phase in the perpendicular direction of 7/4 is $(3c+4d+e)/8$.

With the above-described picture decoding device, disclosed in the Publication 2, the compressed picture data of the high resolution picture, associated with the interlaced scanning system, can be decoded to standard resolution picture.

However, with the conventional picture decoding device, shown in the above Publication 2, the pixels of the standard resolution picture obtained with the field DCT mode are dephased with respect to the pixels of the standard resolution obtained with the frame DCT mode. Specifically, with the field DCT mode, the phases of the pixels in the perpendicular direction of the respective pixels of the top field of the lower layer are ½, 5/2, . . . , with the phases in the perpendicular direction of the respective pixels of the bottom field of the lower layer being 1, 3, . . . , as shown in FIG. 9. On the other hand, with the field DCT mode, the phases of the pixels in the perpendicular direction of the respective pixels of the top field of the lower layer are 0, 2, . . . , with the phases in the perpendicular direction of the respective pixels of the bottom field of the lower layer being 1, 3, . . . , as shown in FIG. 10. Thus, the pictures with different phases co-exist in the frame memory 1036, thus deteriorating the picture quality of the output picture.

With the conventional picture decoding device, shown in the Publication 2, correction is not made of phase deviations or dephasing of the pixels at the time of the motion compensation with the field motion prediction mode and the frame motion prediction mode resulting in the deteriorated picture quality.

SUMMARY OF THE INVENTION

It is therefore an object of the present invention to provide a picture decoding method and a picture decoding device for decoding standard resolution picture data from compressed picture data of the high resolution picture whereby phase deviations of pixels of output moving picture data may be eliminated without detracting from characteristics proper to a picture obtained on interlaced scanning.

In one aspect, the present invention provides a picture decoding apparatus for decoding moving picture data of a second resolution from compressed picture data of a first resolution, obtained on predictive coding by motion prediction in terms of a pre-set pixel block (macro-block) as a unit and on compression coding by orthogonal transform in terms of a pre-set pixel block (orthogonal transform block) as a unit, the second resolution being lower than the first resolution, wherein the decoding apparatus includes first inverse orthogonal transform means for inverse orthogonal transforming an orthogonal transform block of the compressed picture data, orthogonal transformed by an orthogonal transform system (field orthogonal transform mode) associated with the interlaced scanning, second inverse orthogonal transform means for inverse orthogonal transforming an orthogonal transform block of the compressed picture data, orthogonal transformed in accordance with an orthogonal transform system (frame orthogonal transform mode) associated with the sequential scanning, addition means for summing the compressed picture data, inverse orthogonal transformed by the first inverse orthogonal transform means or the second inverse orthogonal transform means, to motion compensated reference picture data, to output moving picture data of the second resolution, memory means for storing moving picture data outputted by the addition means as reference picture data, and motion compensation means for motion compensating the macro-block of the reference picture data stored in the memory means. The first inverse orthogonal transform means inverse orthogonal transforms coefficients of low-frequency components of the orthogonal transform block. The second orthogonal transforming means includes a first picture decoding unit for inverse orthogonal transforming coefficients of the entire frequency components of the orthogonal transform block, separating respective pixels of the inverse orthogonal transformed orthogonal transform block into two pixel blocks associated with interlaced scanning, orthogonal transforming the separated two pixel blocks, inverse orthogonal transforming the coefficients of the low-frequency components of the two orthogonal transformed pixel blocks and synthesizing the inverse orthogonal transformed two pixel blocks to generate an orthogonal transform block. The second orthogonal transforming means also includes third inverse orthogonal transform means for inverse orthogonal transforming the orthogonal transform block of compressed picture data, orthogonal transformed in the frame orthogonal transform mode, addition means for summing the compressed picture data, inverse orthogonal transformed by the third inverse orthogonal transform means, to motion compensated reference picture data, to output moving picture data of the second resolution, memory means for storing the moving picture data outputted by the addition means as reference picture data, and motion compensation means for motion compensating the macro-block of reference picture data stored in the memory means. The first inverse orthogonal transform means includes a second picture decoding unit for inverse orthogonal transforming coefficients of low-frequency components of the orthogonal transform block. If compressed picture data of the first resolution, encoded from the moving picture signals of the interlaced scanning system, are inputted, the moving picture data of the second resolution are decoded by the first picture decoding unit and, if compressed picture data of the first resolution, encoded from the moving picture signals of the sequential scanning system, are inputted, the moving picture data of the second resolution are decoded by the second picture decoding unit.

With this picture decoding device, when the compressed picture data of the first resolution, obtained on encoding the moving picture signals of the interlaced scanning system, is inputted, the coefficients of the entire frequency components of an orthogonal transform block, obtained on orthogonal transform by the frame orthogonal transform mode, are inverse orthogonal transformed and separated into two pixel blocks associated with the interlaced scanning. The separated two pixel blocks are respectively orthogonal transformed and coefficients of the low-frequency components are inverse orthogonal transformed to synthesize the two inverse orthogonal transformed pixel blocks. Also, in the present picture decoding device, if compressed picture data of the first resolution, obtained on encoding the moving picture signals of the sequential scanning system, is inputted, coefficients of the low-frequency components of the orthogonal transform block are inverse orthogonal transformed. The picture decoding device outputs moving picture data of the second resolution lower than the first resolution.

In another aspect, the present invention provides a picture decoding apparatus for decoding moving picture data of a second resolution from compressed picture data of a first resolution, obtained on predictive coding by motion prediction in terms of a pre-set pixel block (macro-block) as a unit and on compression coding by orthogonal transform in terms of a pre-set pixel block (orthogonal transform block) as a unit, the second resolution being lower than the first resolution, wherein the picture decoding apparatus includes first inverse orthogonal transform means for inverse orthogonal transforming an orthogonal transform block of the compressed picture data, orthogonal transformed by an orthogonal transform system (field orthogonal transform mode) associated with the interlaced scanning, second inverse orthogonal transform means for inverse orthogonal transforming an orthogonal transform block of the compressed picture data, orthogonal transformed in accordance with an orthogonal transform system (frame orthogonal transform mode) associated with the sequential scanning, addition means for summing the compressed picture data, inverse orthogonal transformed by the first inverse orthogonal transform means or the second inverse orthogonal transform means, to motion compensated reference picture data, to output moving picture data of the second resolution, memory means for storing moving picture data outputted by the addition means as reference picture data and motion compensation means for motion compensating the macro-block of reference picture data stored in the memory means. The first inverse orthogonal transform means inverse orthogonal transforms coefficients of low-frequency components of the orthogonal transform block, corrects the phase by ¼ pixel with respect to the vertical direction of the respective pixels of the top field obtained on inverse orthogonal transform, and corrects the phase by ¾ pixel with respect to the vertical direction of the respective pixels of the top field obtained on inverse orthogonal transform. The second inverse orthogonal transform means includes a first picture decoding unit for inverse orthogonal transforming coefficients of the entire frequency components of the orthogonal transform block, separating the inverse orthogonal transformed orthogonal transform block into two pixel blocks associated with the interlaced scanning, orthogonal transforming the separated two pixel blocks, inverse orthogonal transforming the coefficients of the low-frequency components of the orthogonal transformed two pixel blocks, correcting the phase of the respective pixels of the top field resulting from inverse orthogonal transform by ¼ pixel, correcting the phase of the respective pixels of the bottom field resulting from inverse orthogonal transform by ¾ pixel, and synthesizing the phase-corrected top and bottom fields. The second inverse orthogonal transform means also includes third inverse orthogonal transform means inverse orthogonal transforming an orthogonal transform block of the compressed picture data, orthogonal transformed in the frame orthogonal transform mode, addition means for summing compressed image data inverse orthogonal transformed by the third inverse orthogonal transform means to motion compensated reference picture data to output moving picture data of second resolution, memory means for storing the moving picture data outputted by the addition means as reference picture data, and motion compensation means for motion compensating a macro-block of the reference picture data stored in the memory means. The first inverse orthogonal transform means includes a second picture decoding unit for inverse orthogonal transforming the coefficients of low-frequency components of the orthogonal transform block. If compressed picture data of the first resolution, encoded from the moving picture signals of the interlaced scanning system, are inputted, the moving picture data of the second resolution are decoded by the first picture decoding unit and, if compressed picture data of the first resolution, encoded from the moving picture signals of the sequential scanning system, are inputted, the moving picture data of the second resolution are decoded by the second picture decoding unit.

In this picture decoding device, if compressed picture data of the first resolution, obtained on encoding moving picture signals of the interlaced scanning system, are inputted, the coefficients of the low-frequency components of the orthogonal transform block, obtained on orthogonal transform in the field orthogonal transform mode, are inverse orthogonal transformed, and the pixels of the top field, obtained on inverse orthogonal transform, are corrected in phase by ¼ pixel in the vertical direction, while the pixels of the bottom field, obtained on inverse orthogonal transform, are corrected in phase by ¾ pixel in the vertical direction. The coefficients of the entire frequency components of the orthogonal transform block, obtained on orthogonal transform in the frame orthogonal transform mode, are inverse orthogonal transformed, and the inverse orthogonal transformed orthogonal transform block is separated into two pixel blocks associated with the interlaced scanning. The separated two pixel blocks are respectively orthogonal transformed and the coefficients of the low-frequency components of the two orthogonal transformed pixel blocks are inverse orthogonal transformed. The pixels of the top field, obtained on inverse orthogonal transform, are corrected in phase by ¼ pixel in the vertical direction, while the pixels of the bottom field, obtained on inverse orthogonal transform, are corrected in phase by ¾ pixel in the vertical direction, and the phase-corrected top and bottom fields are synthesized together. In the present picture decoding device, if the compressed picture data of the first resolution, encoded from the moving picture signals of the sequential scanning system, is inputted, coefficients of the low-frequency components of the orthogonal transform block are inverse orthogonal transformed. The picture decoding device outputs moving picture data of the second resolution lower than the first resolution.

In still another aspect, the present invention provides a picture decoding method for decoding moving picture data of a second resolution from compressed picture data of a first resolution, obtained on predictive coding by motion prediction in terms of a pre-set pixel block (macro-block) as a unit and on compression coding by orthogonal transform in terms of a pre-set pixel block (orthogonal transform block) as a unit, the second resolution being lower than the first resolution, wherein, if compressed picture data of the first resolution, encoded from moving picture signals of the interlaced scanning system are inputted, an orthogonal transform block of the compressed picture data, orthogonal transformed in accordance with the orthogonal transform system associated with the sequential scanning (field orthogonal transform mode), is inverse orthogonal transformed, an orthogonal transform block of the compressed picture data, orthogonal transformed in accordance with the orthogonal transform system associated with the sequential scanning (frame orthogonal transform mode), is inverse orthogonal transformed, the inverse orthogonal transformed compressed picture data is summed to motion compensated reference picture data, reference picture data obtained on addition is stored as reference picture data, a macro-block of the stored reference picture data is motion compensated, coefficients of low-frequency components of the orthogonal transform block, orthogonal transformed in the field orthogonal transform mode, are inverse orthogonal transformed, coefficients of the entire frequency components of the orthogonal transform block, orthogonal transformed in the frame orthogonal transform mode, are inverse orthogonal transformed, pixels of the inverse orthogonal transformed orthogonal transform block are separated into two pixel blocks associated with interlaced scanning, the separated two pixel blocks are respectively orthogonal transformed, coefficients of the low-frequency components of the two orthogonal transformed pixel blocks are inverse orthogonal transformed, and the two inverse orthogonal transformed pixel blocks are synthesized to generate an orthogonal transform block, and wherein, if compressed picture data of the first resolution, encoded from the moving picture signals of the sequential scanning system, are inputted, the orthogonal transformed block of the compressed picture data, orthogonal transformed in the frame orthogonal transform mode, is inverse orthogonal transformed, the inverse orthogonal transformed compressed picture data and the motion compensated reference picture data are summed together, moving picture data resulting from the addition are stored as reference picture data, a macro-block of the stored reference picture data is motion compensated and coefficients of the low-frequency components of the orthogonal transform block are inverse orthogonal transformed.

With this picture decoding method, when the compressed picture data of the first resolution, obtained on encoding the moving picture signals of the interlaced scanning system, is inputted, the coefficients of the entire frequency components of an orthogonal transform block, obtained on orthogonal transform by the frame orthogonal transform mode, are inverse orthogonal transformed and separated into two pixel blocks associated with the interlaced scanning. The separated two pixel blocks are respectively orthogonal transformed and coefficients of the low-frequency components are inverse orthogonal transformed to synthesize the two inverse orthogonal transformed pixel blocks. Also, in the present picture decoding device, if compressed picture data of the first resolution, obtained on encoding the moving picture signals of the sequential scanning system, is inputted, coefficients of the low-frequency components of the orthogonal transform block are inverse orthogonal transformed. The picture decoding device outputs moving picture data of the second resolution lower than the first resolution.

In yet another aspect, the present invention provides a picture decoding method for decoding moving picture data of a second resolution from compressed picture data of a first resolution, obtained on predictive coding by motion prediction in terms of a pre-set pixel block (macro-block) as a unit and on compression coding by orthogonal transform in terms of a pre-set pixel block (orthogonal transform block) as a unit, the second resolution being lower than the first resolution, wherein, if compressed picture data of the first resolution, encoded from moving picture signals of the interlaced scanning system are inputted, an orthogonal transform block of the compressed picture data, orthogonal transformed in accordance with the orthogonal transform system associated with the sequential scanning (field orthogonal transform mode), is inverse orthogonal transformed, the inverse orthogonal transformed compressed picture data is summed to motion compensated reference picture data, and wherein, if compressed picture data of the first resolution, encoded from the moving picture signals of the sequential scanning system, are inputted, the orthogonal transformed block of the compressed picture data, orthogonal transformed in the frame orthogonal transform mode, is inverse orthogonal transformed, the inverse orthogonal transformed compressed picture data and the motion compensated reference picture data are summed together, moving picture data resulting from the addition are stored as reference picture data, a macro-block of the stored reference picture data is motion compensated and coefficients of the low-frequency components of the orthogonal transform block are inverse orthogonal transformed.

In this picture decoding method, if compressed picture data of the first resolution, obtained on encoding moving picture signals of the interlaced scanning system, are inputted, the coefficients of the low-frequency components of the orthogonal transform block, obtained on orthogonal transform in the field orthogonal transform mode, are inverse orthogonal transformed, and the pixels of the top field, obtained on inverse orthogonal transform, are corrected in phase by ¼ pixel in the vertical direction, while the pixels of the bottom field, obtained on inverse orthogonal transform, are corrected in phase by ¾ pixel in the vertical direction. The coefficients of the entire frequency components of the orthogonal transform block, obtained on orthogonal transform in the frame orthogonal transform mode, are inverse orthogonal transformed, and the inverse orthogonal transformed orthogonal transform block is separated into two pixel blocks associated with the interlaced scanning. The separated two pixel blocks are respectively orthogonal transformed and the coefficients of the low-frequency components of the two orthogonal transformed pixel blocks are inverse orthogonal transformed. The pixels of the top field, obtained on inverse orthogonal transform, are corrected in phase by ¼ pixel in the vertical direction, while the pixels of the bottom field, obtained on inverse orthogonal transform, are corrected in phase by ¾ pixel in the vertical direction, and the phase-corrected top and bottom fields are synthesized together. In the present picture decoding device, if the compressed picture data of the first resolution, encoded from the moving picture signals of the sequential scanning system, is inputted, coefficients of the low-frequency components of the orthogonal transform block are inverse orthogonal transformed. The picture decoding device outputs moving picture data of the second resolution lower than the first resolution.

According to the present invention, if the compressed picture data of the first resolution, obtained on encoding moving picture signals of the interlaced scanning system are inputted, coefficients of the low-frequency components of the orthogonal transform block, obtained on orthogonal transform by the frame orthogonal transform mode, are inverse orthogonal transformed and separated into two pixel blocks associated with the interlaced scanning. The two inverse orthogonal transformed pixel blocks are synthesized together. According to the present invention, if compressed picture data of the first resolution, obtained in encoding moving picture signals of the sequential scanning system, are inputted, the coefficients of the low-frequency components of the orthogonal transform block are inverse orthogonal transformed. According to the present invention, moving picture data of the second resolution lower than the first resolution are outputted.

Therefore, it becomes possible with the present invention to eliminate pixel dephasing between the field orthogonal transform mode and the frame orthogonal transform mode, and to improve the picture quality of the sequential scanned picture, without detracting from the properties inherent in the interlaced picture.

According to the present invention, if the compressed picture data of the first resolution, encoded from the moving picture signals of the interlaced scanning system, is inputted, the coefficients of the low-frequency components of the orthogonal transform block, obtained on orthogonal transform in the field orthogonal transform mode, are inverse orthogonal transformed, and the respective pixels of the top field, obtained on inverse orthogonal transform, are corrected in phase by ¼ pixel in the vertical direction, while the respective pixels of the bottom field, obtained on inverse orthogonal transform, are corrected in phase by ¾ pixel in the vertical direction, as described above. The coefficients of the entire frequency components of the orthogonal transform block, obtained on orthogonal transform by the frame orthogonal transform mode, are inverse orthogonal transformed. The orthogonal transform block, obtained on inverse orthogonal transform, are separated into two pixel blocks associated with the interlaced scanning, and the two separated pixel blocks are respectively orthogonal transformed. The coefficients of the low-frequency components of the two orthogonal transformed pixel blocks are inverse orthogonal transformed, and the pixels of the top field obtained on inverse orthogonal transform are corrected in phase by ¼, while those of the bottom field obtained on inverse orthogonal transform are corrected in phase by ¾. The phase-corrected top and bottom fields are synthesized together. According to the present invention, if the compressed picture data of the first resolution, obtained on encoding the moving picture signals of the sequential scanning system, are inputted, coefficients of the low-frequency components of the orthogonal transform block are inverse orthogonal transformed. According to the present invention, moving picture data of the second resolution lower than the first resolution are outputted.

Thus, according to the present invention, it is possible to reduce the processing volume and the recording capacity necessary for decoding, while pixel dephasing of the pixels of the output moving picture data of the second resolution can be eliminated without detracting from the properties inherent in the interlaced picture. That is, output moving picture data can be displayed without filtering processing, while the moving picture data of the second resolution can be improved in picture quality.

BRIEF DESCRIPTION OF THE DRAWINGS

FIG. 7 illustrates linear interpolation processing in the field DCT mode of the conventional decoding device shown in FIG. 4.

FIG. 19 illustrates a DCT block of luminance and chrominance components in a 420-format macro-block.

FIG. 27 illustrates frequency response of a prototype filter required for designing the 4×8 phase-correcting IDCT matrix.

DESCRIPTION OF THE PREFERRED EMBODIMENTS

Figure 1:
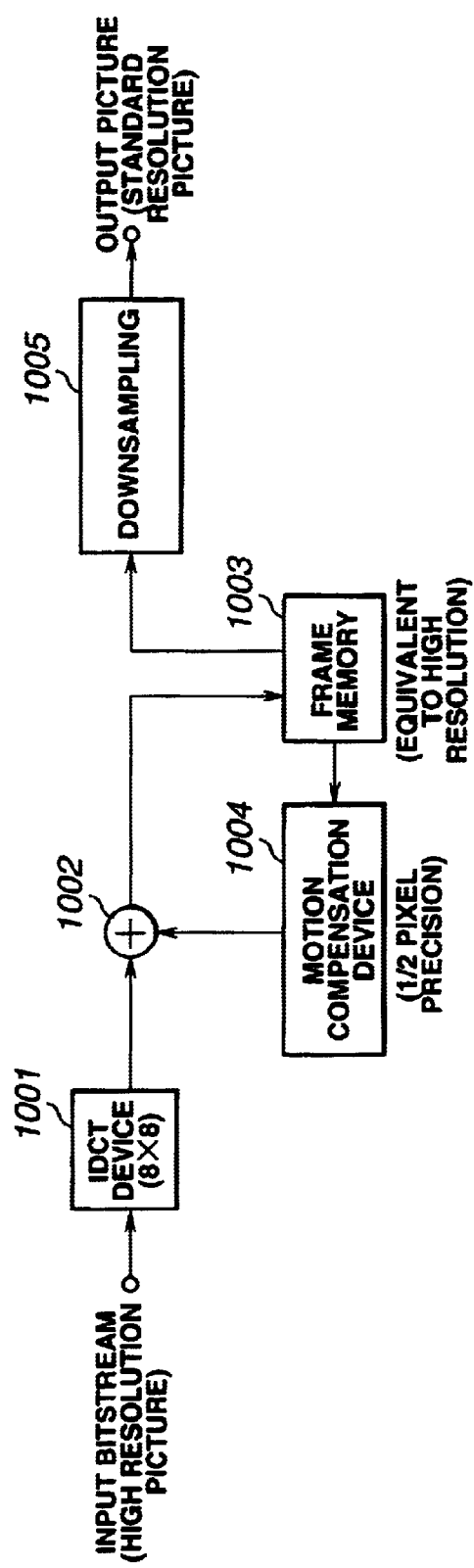
FIG. 1 is a block diagram showing a conventional first downdecoder.
Figure 2:
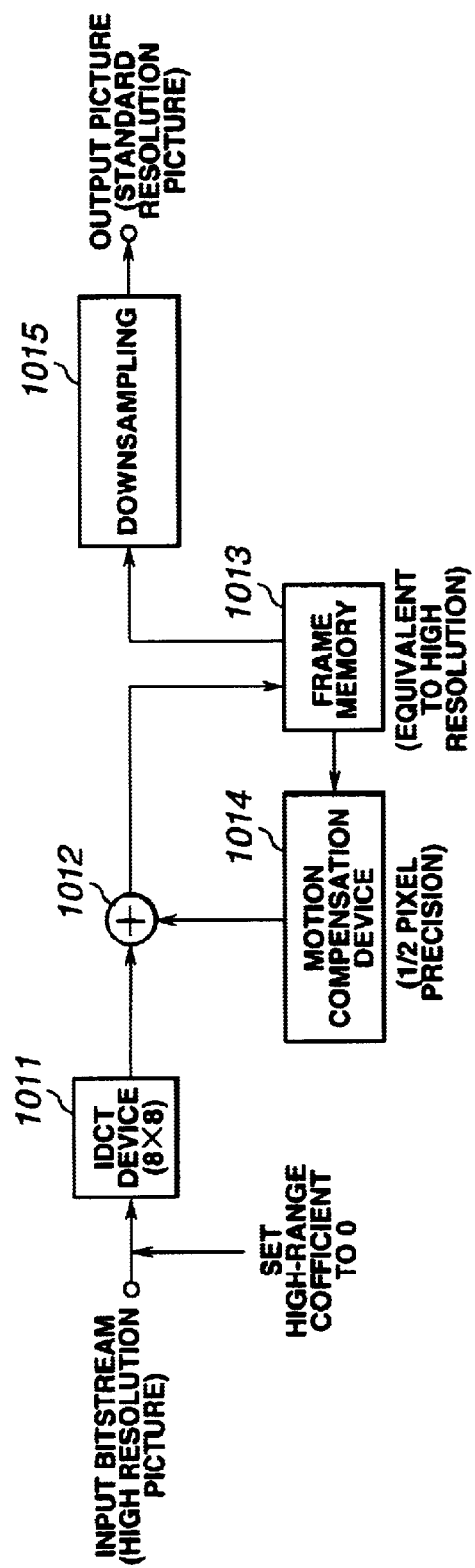
FIG. 2 is a block diagram showing a conventional second downdecoder.
Figure 3:
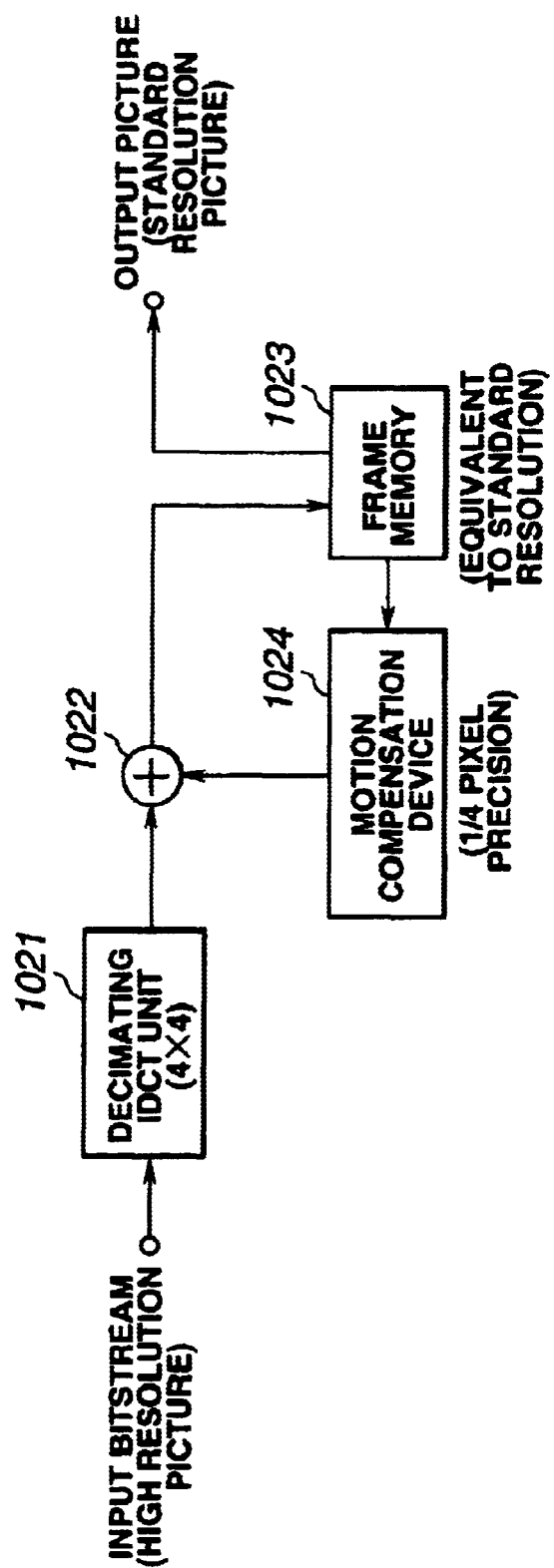
FIG. 3 is a block diagram showing a conventional third downdecoder.

Referring to the drawings, preferred embodiments of a picture decoding device according to the present invention will be explained in detail.

First Embodiment

First, a picture decoding device according to a first embodiment of the present invention is explained.

Figure 11:
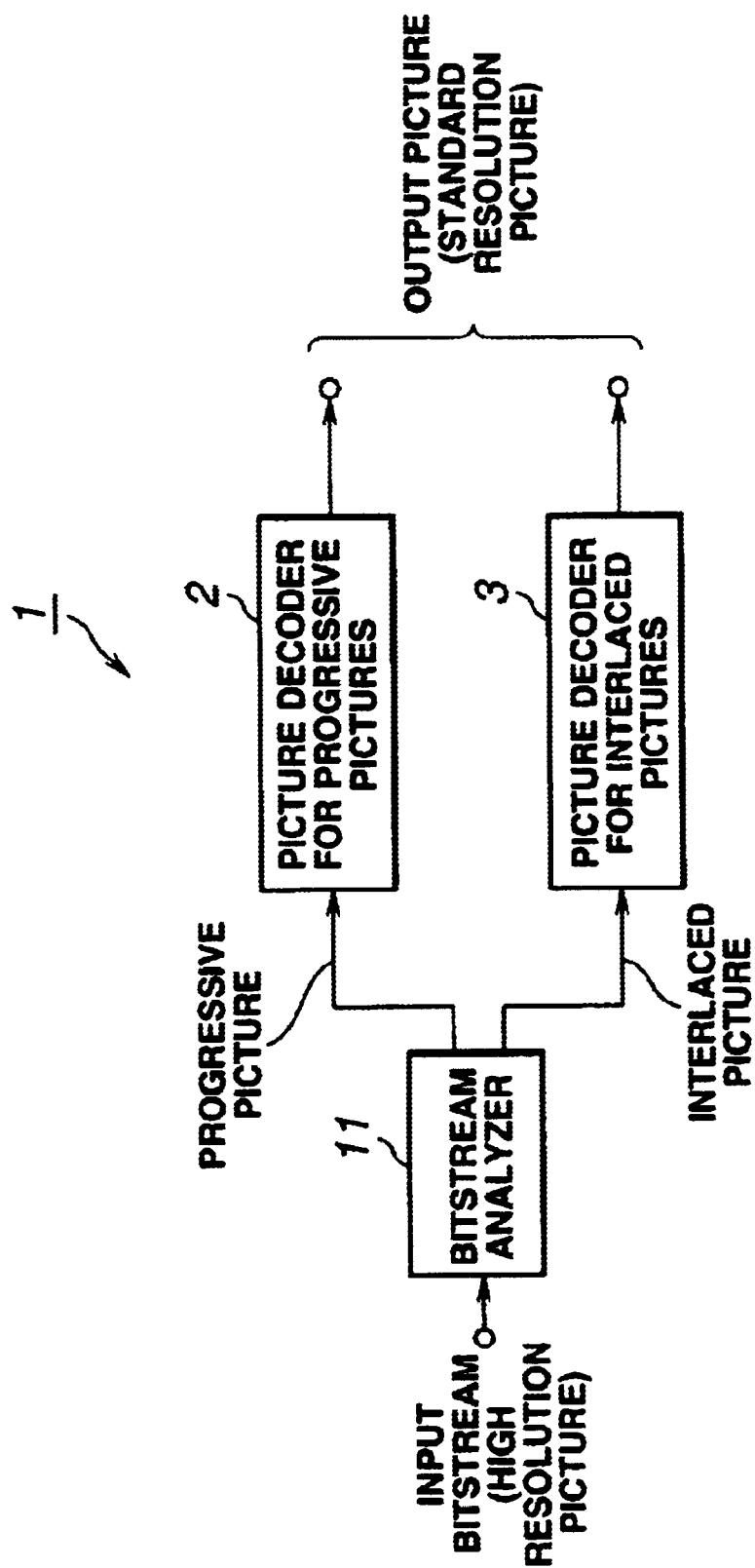
FIG. 11 is a block diagram showing a picture decoding device according to a first embodiment of the present invention.

Referring to FIG. 11, a picture decoding device 1 of the first embodiment of the present invention is designed and constructed so that a bitstream obtained on compressing a high resolution picture with the number of effective lines in the vertical direction of, for example, 1152, by MPEG2, is entered as an input, with the input bitstream being decoded and decimated to a resolution of ½ to output a standard resolution picture with the number of effective lines in the vertical direction of, for example, 576.

In the following explanation of the embodiments of the present invention, a high resolution picture is termed an upper layer and a standard resolution picture is termed a lower layer. It is noted that, if a DCT block having 8×8 discrete cosine coefficients is inverse discrete cosine transformed, there result decoded data made up of 8×8 pixels. The processing of inverse discrete cosine transform processing and simultaneously reducing the resolution, such as decoding 8×8 discrete cosine coefficients to obtain decoded data made up of 4×4 pixels, is termed the decimating inverse discrete cosine transform.

This picture decoding device 1 includes a bitstream analysis unit 11, fed with a bitstream of a compressed high resolution picture and adapted for analyzing the input bitstream, and a progressive picture accommodating picture decoding unit 2 adapted for decoding a progressive picture, that is a bitstream as moving picture signals of the sequential scanning type. The picture decoding device 1 also includes an interlaced picture accommodating picture decoding unit 3 for decoding an interlaced picture, that is moving picture signals of the interlaced scanning system.

The bitstream analysis unit 11 detects the syntax of the input bitstream to verify whether or not this input bitstream is the progressive picture or the interlaced picture. If the input bitstream is the progressive pictures, the input bitstream is sent to the progressive picture accommodating picture decoding unit 2, whereas, if the input bitstream is the interlaced picture, it is sent to the interlaced picture accommodating picture decoding unit 3.

Figure 12:
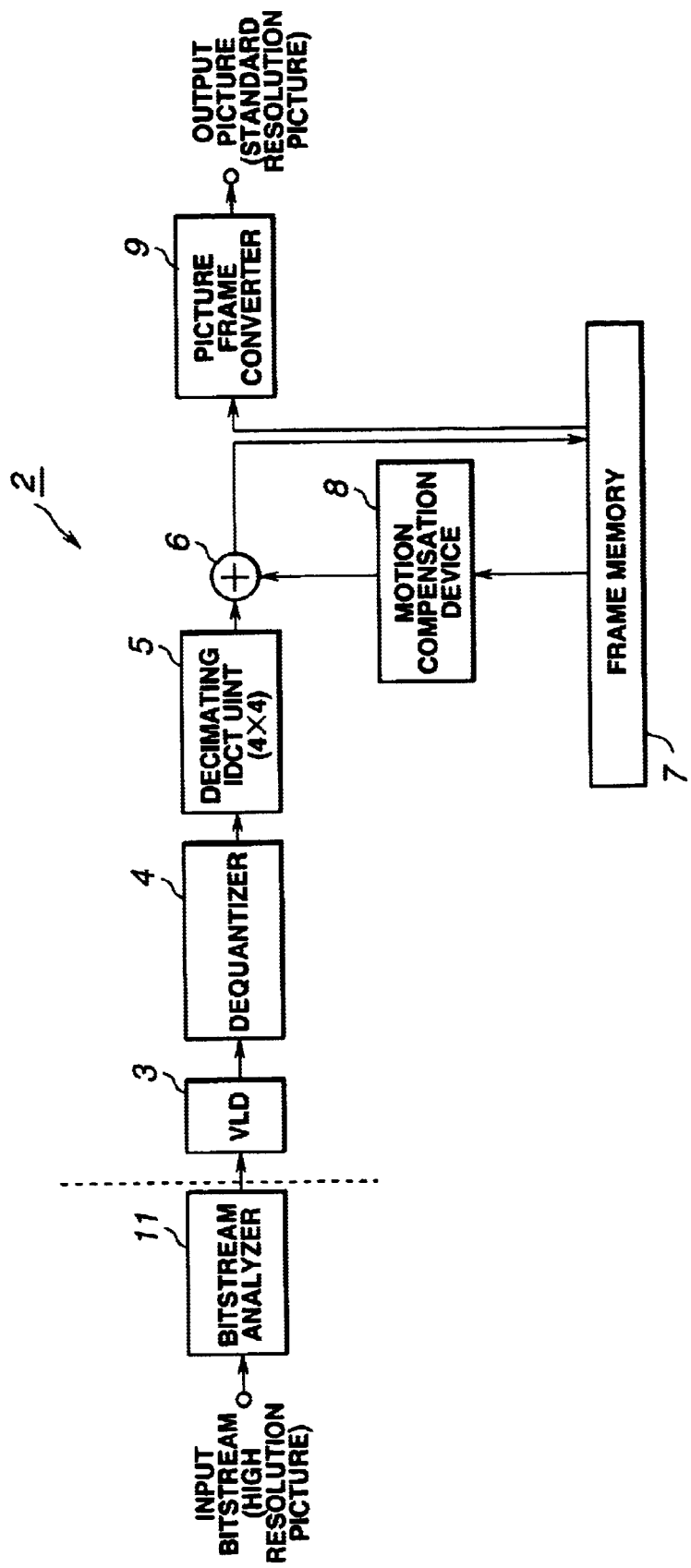
FIG. 12 is a block diagram showing a picture decoding unit of the picture decoding device shown in FIG. 11 adapted for coping with progressive images.

Referring to FIG. 12, the progressive picture accommodating picture decoding unit 2 includes a variable-length decoding unit 3 for decoding the bitstream, processed with variable length encoding of allocating code lengths corresponding to the data occurrence frequency, and a dequantizer 4 for multiplying respective coefficients of the DCT block with the quantization step. The progressive picture accommodating picture decoding unit 2 also includes a decimating IDCT unit 5 for applying decimating IDCT to the DCT block to generate a standard resolution picture, and an addition unit 6 for summing the standard resolution picture, processed with decimating IDCT, to the motion compensated reference picture. The progressive picture accommodating picture decoding unit 2 also includes a frame memory 7 for transient storage of the reference picture, a motion compensation unit 8 for motion compensating the reference picture stored in the frame memory 7 and a picture frame conversion unit 9 for post-filtering the picture stored in the frame memory 7 to change the picture frame of the picture.

Figure 5:
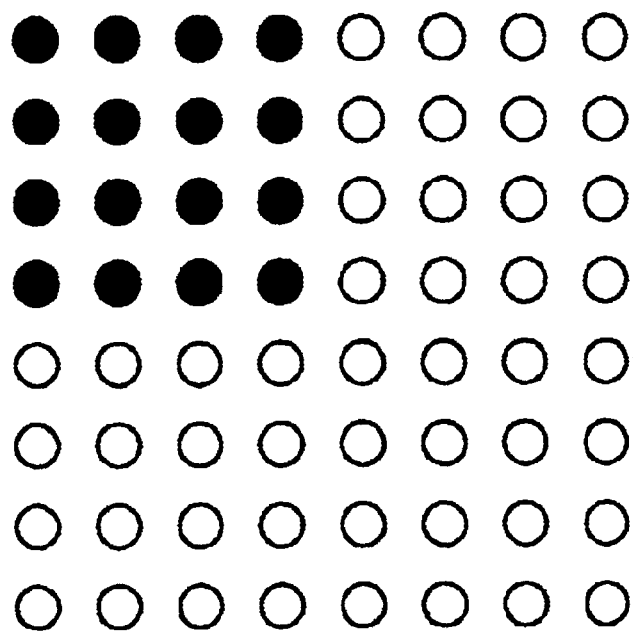
FIG. 5 illustrates the reducing inverse DCT in the field DCT mode of the conventional decoding device shown in FIG. 4.
Figure 6:
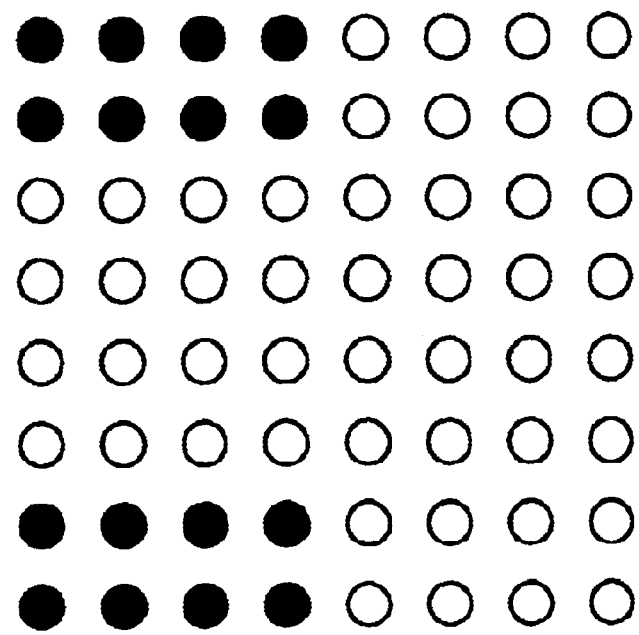
FIG. 6 is a view similar to FIG. 5 and illustrates the decimating inverse DCT in the field DCT mode of the conventional decoding device shown in FIG. 4.
Figures 8A, 8B:
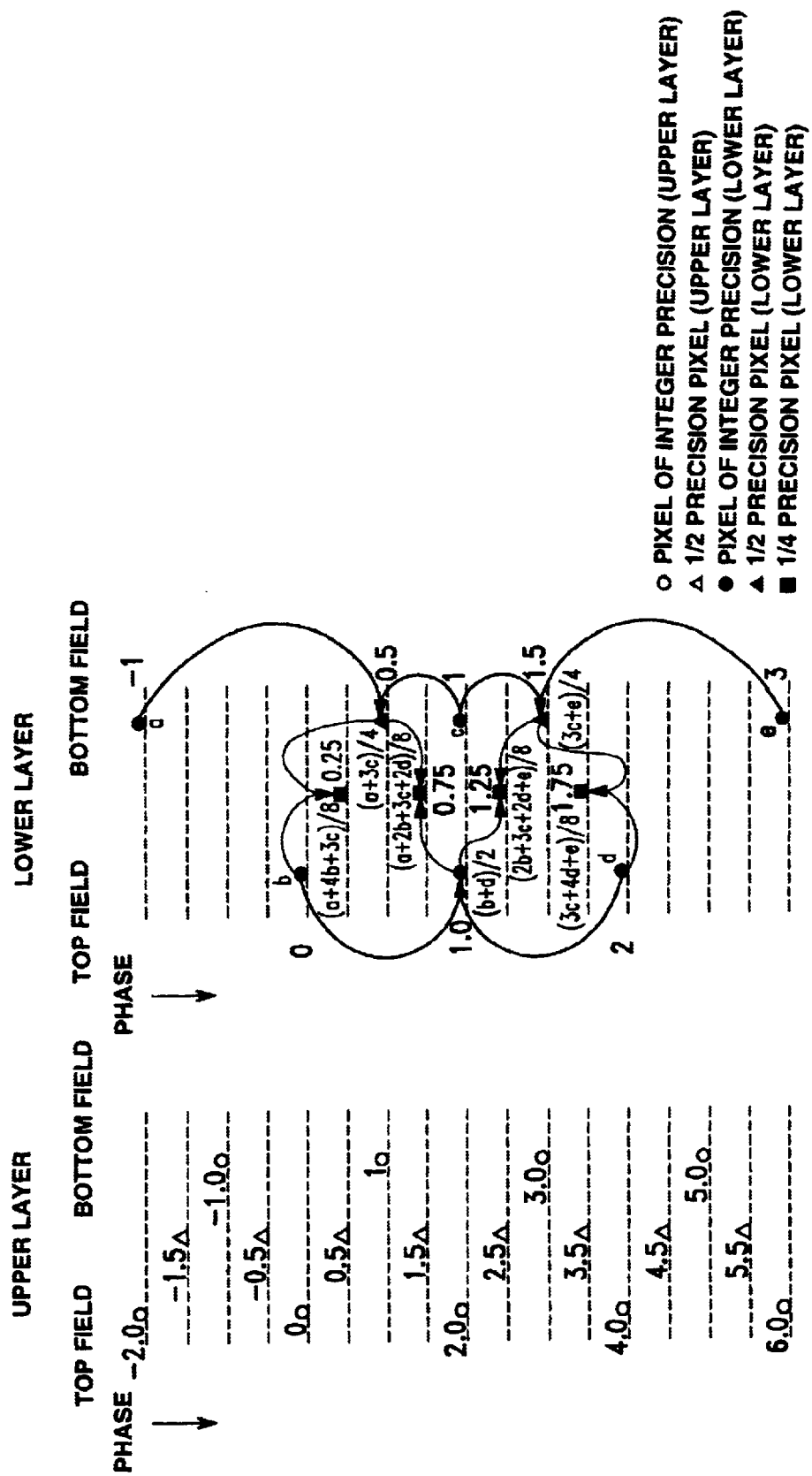
FIG. 8 illustrates linear interpolation processing in the frame DCT mode of the conventional decoding device shown in FIG. 4.
Figures 9A, 9B:
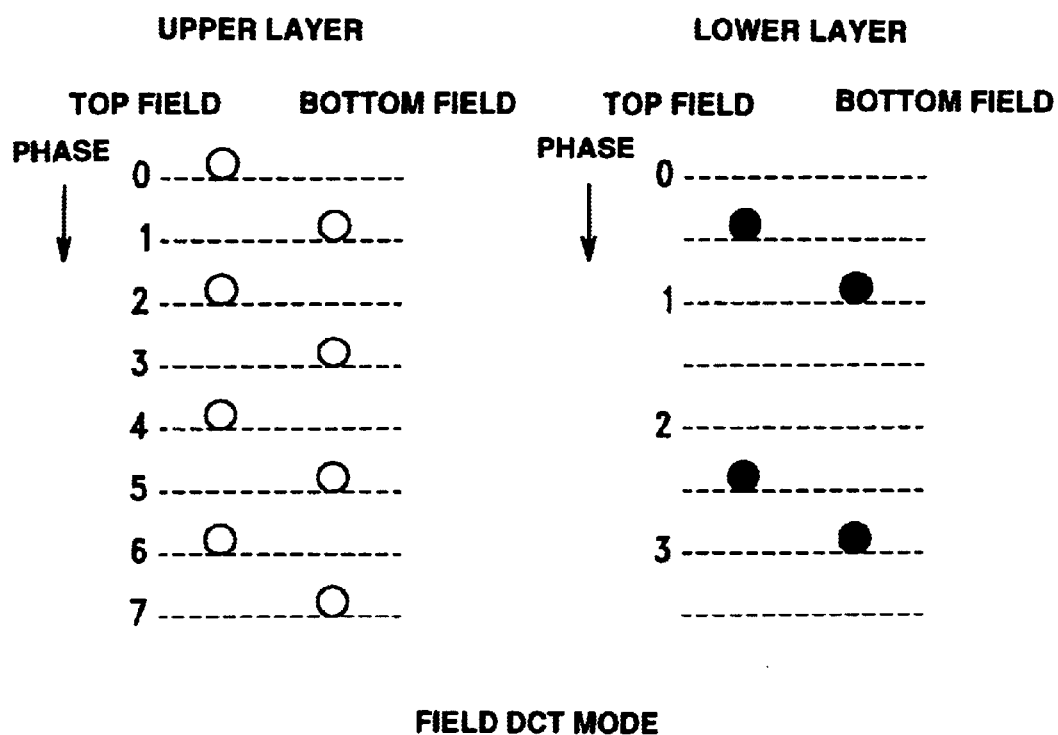
FIG. 9 illustrates the phase of the pixel obtained as a result of the field DCT mode of the conventional decoding device shown in FIG. 4.
Figures 10A, 10B:
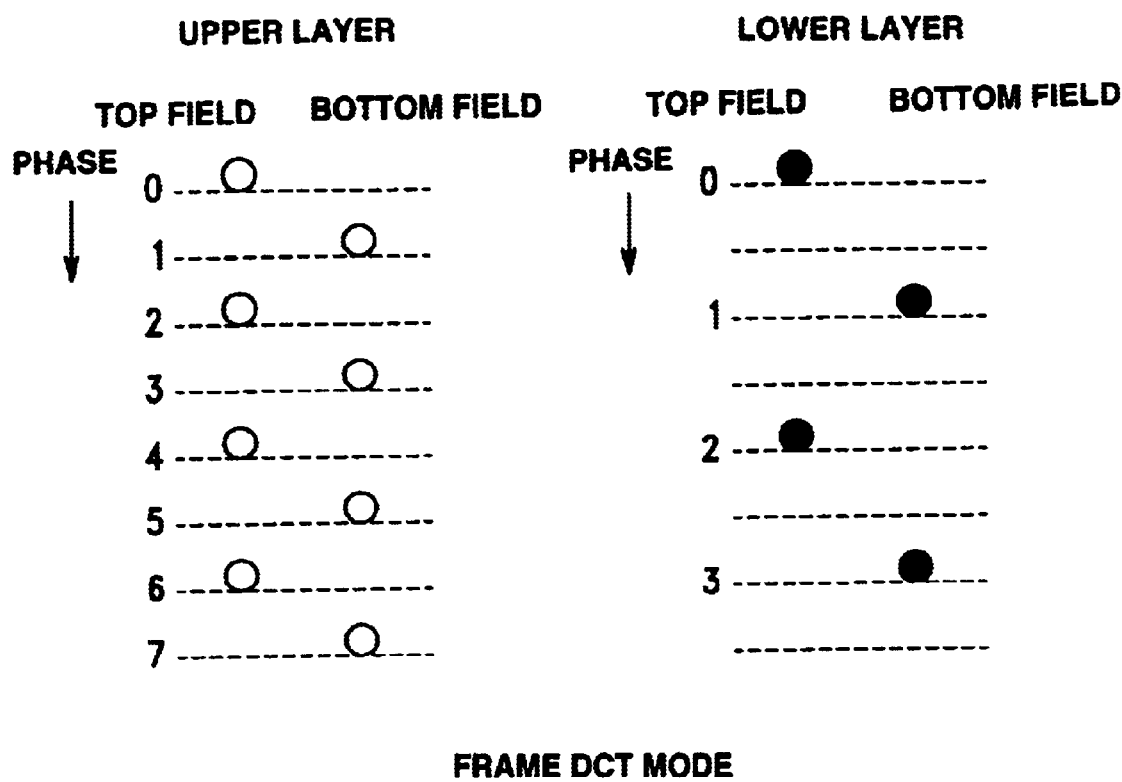
FIG. 10 illustrates the phase of the pixel obtained as a result of the frame DCT mode of the conventional decoding device shown in FIG. 4.

The decimating IDCT unit 5 applies IDCT only to low-range 4×4 coefficients of the DCT block having 8×8 coefficients in a DCTed macro-block, as shown in FIG. 5. That is, the decimating IDCT unit 5 performs decimating IDCT based on the 4-point DCT coefficients in the low range sides in the horizontal and vertical directions. With the present decimating IDCT unit 5, it is possible to decode a standard resolution picture each DCT block of which is constituted by 4×4 pixels.

Figure 13:
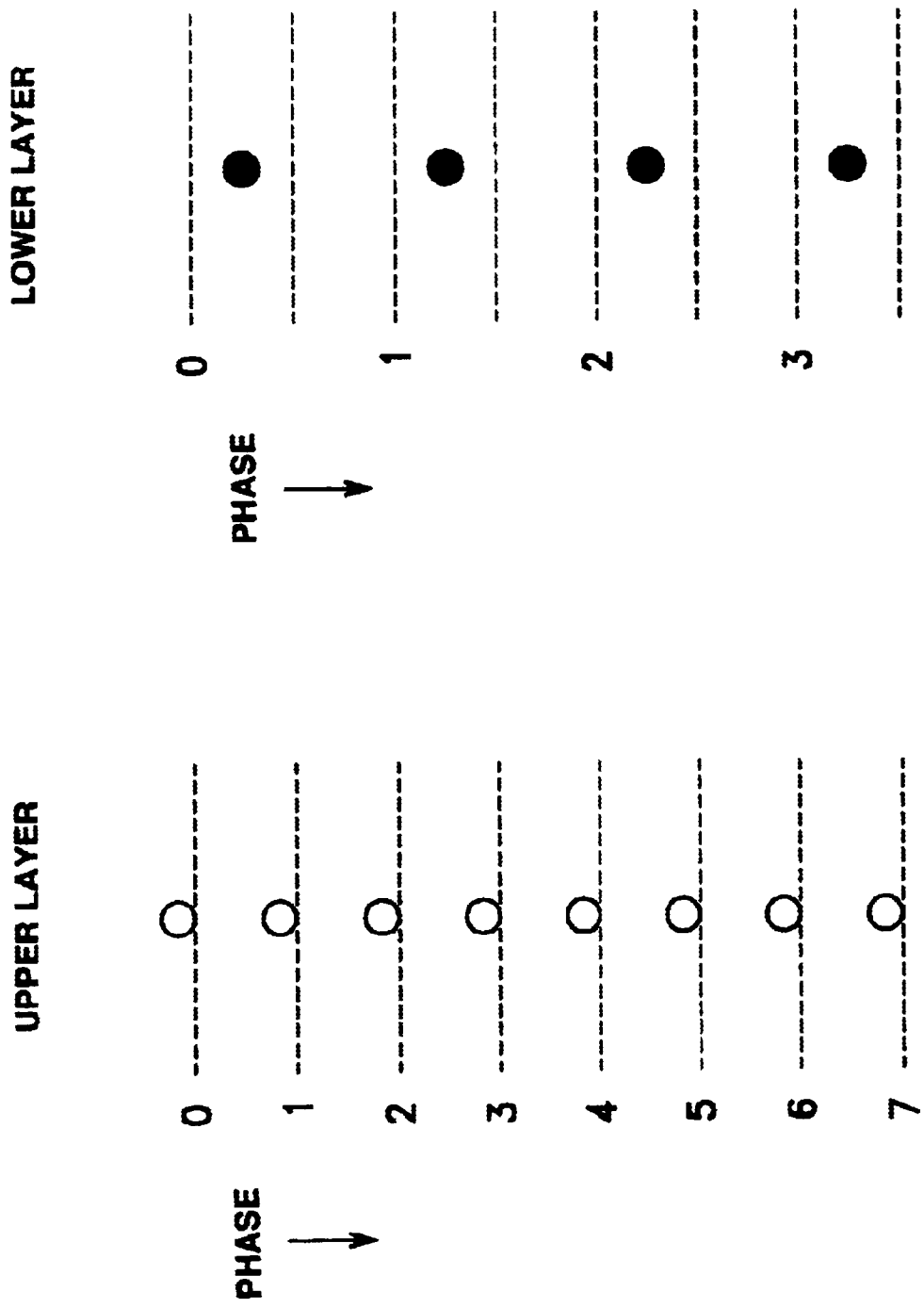
FIG. 13 illustrates the phase in the vertical direction of a reference picture stored in a frame memory of the picture decoding unit adapted for coping with progressive images shown in FIG. 11.

The macro-blocks contained in a progressive picture are all DCTed in the frame DCT mode. Thus, in each pixel of the decoded image data, the phases of the respective pixels in the vertical direction are ¼, ⁵⁄₄, ⁹⁄₄ and ¹³⁄₄, as shown in FIG. 13. Specifically, the phase of the leading pixel of the lower layer (pixel with the phase of ¼) is intermediate between the phases of the first and second pixels from the leading end of the upper layer (pixels with the phases of 0 and 1), the phase of the second pixel from the leading pixel of the lower layer (pixel with the phase of 5/4) is intermediate between the phases of the third and fourth pixels from the leading end of the upper layer (pixels with the phases of 2 and 3), the phase of the third pixel from the leading pixel of the lower layer (pixel with the phase of 9/4) is intermediate between the phases of the fifth and sixth pixels from the leading end of the upper layer (pixels with the 4 and 5), and the phase of the fourth pixel from the leading pixel of the lower layer (pixel with the phase of 13/4) is intermediate between the phases of the seventh and eighth pixels from the leading end of the upper layer (pixels with the 6 and 7).

If the macro-block, processed with decimating IDCT by the decimating IDCT unit 5, is an intra-picture, the addition unit 6 directly stores the intra-picture in the frame memory 7. If the macro-block, processed with decimating IDCT by the decimating IDCT unit 5, is an inter-picture, the addition unit 6 synthesizes the inter-picture to the reference picture motion compensated by the motion compensation unit 8 to store the synthesized picture in the frame memory 7.

The motion compensation unit 8 interpolates the reference picture of the standard resolution, stored in the frame memory 7, to ¼ pixel precision, and motion-compensates the resulting picture. The reference picture, thus motion compensated by the motion compensation unit 8, is sent to the addition unit 6 so as to be synthesized to the inter-picture.

Specifically, the motion compensation unit 8 interpolates the pixels of the standard resolution picture, stored in the frame memory 7, to generate pixels of the 1/4 pixel precision, in order to accommodate the high resolution picture of ½ pixel precision, as now explained.

For pixels in the horizontal direction, pixels of the ½ pixel precision are generated, using a doubled interpolation filter, from the pixels of the integer precision, stored in the frame memory 7. The motion compensation unit 8 generates pixels of ½ pixel precision, using, for example, a half-band filter. Using a linear interpolation filter, the motion compensation unit 8 then generates pixels of ¼ pixel precision, from pixels of ½ pixel precision generated using the doubled interpolation filter. By employing a doubled interpolation filter, such as a half-band filter, the motion compensation unit 8 is able to output pixels of the same phase as the pixels of the standard resolution picture stored in the frame memory 7, as a reference picture corresponding to the high resolution picture. Thus, the present motion compensation unit 8 can perform high-speed processing. It is possible with the motion compensation unit 8 to execute the above processing using a sole matrix, or to generate the ¼ pixel precision from the integer precision pixel using a quadrupled interpolation filter.

As for pixels in the vertical direction, integer precision pixels, such that the phases in the vertical direction of the respective pixels will be ¼, 5/4, 9/4 and 13/4, as shown in FIG. 14A, are retrieved from the frame memory 7.

Then, using the doubled interpolation filter, such as the half-band filter, ½ pixel precision pixels are generated from the pixels of the integer precision taken out from the frame memory 7, as shown in FIG. 14B. For example, the pixel whose phase in the vertical direction is 1¼ is generated by doubled interpolation from the pixels lying at the positions of . . . , 5/4, 9/4, 13/4 and 17/4, as shown in FIG. 14B.

Figure 4:
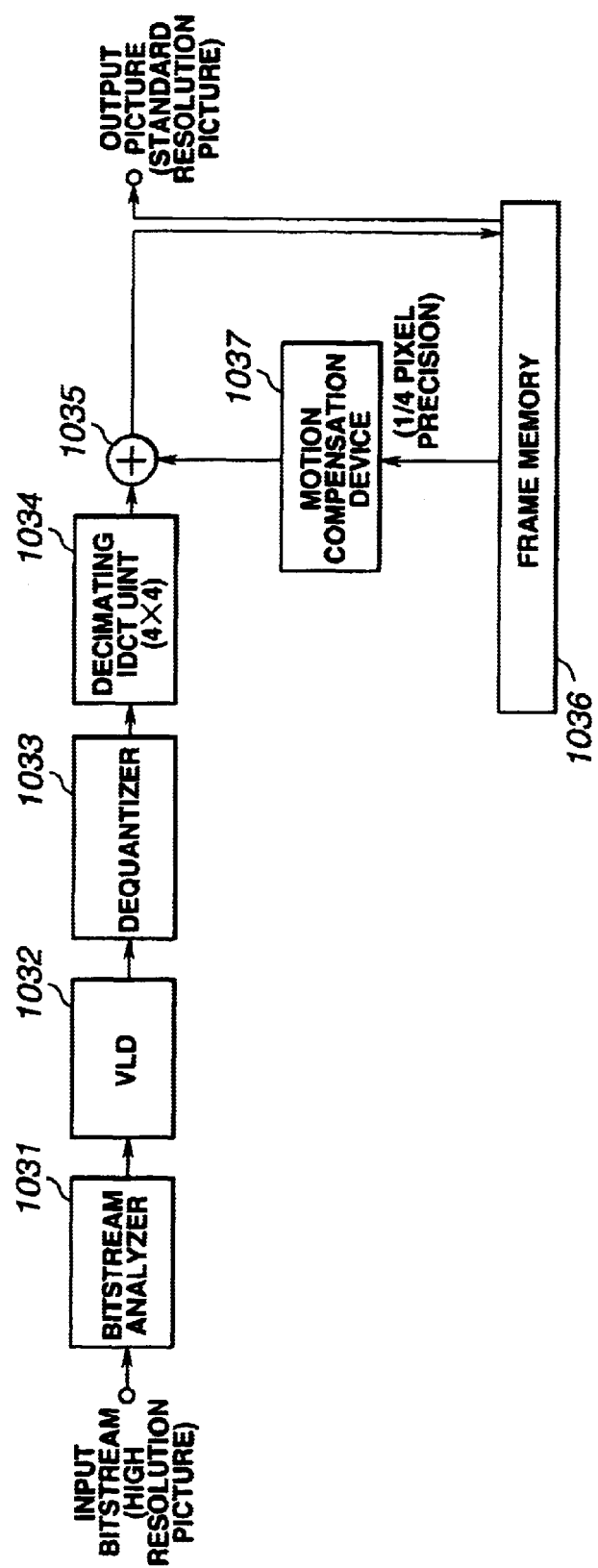
FIG. 4 is a block diagram of a conventional picture decoding device.

Then, using a linear interpolation filter, ¼ precision pixels are generated from the pixels of the ½ pixel precision, generated using the doubled interpolation filter, as shown in FIG. 4C. The pixel, whose phase in the vertical direction is 4, is generated by linear interpolation from the pixels at 7/2 and 9/2, as shown in FIG. 14C. On the other hand, the pixel whose phase in the vertical direction is 5, is generated by linear interpolation from the pixels at 9/2 and 11/2.

Thus, if the pixel for interpolation is at an integer precision position, the motion compensation unit 8, doing the interpolation in the vertical direction, is able to output a pixel of the same phase as the pixel of the standard resolution picture stored in the frame memory 7, without performing product/sum processing associated with the number of taps, as a result of employing the doubled interpolation filter, such as the half-band filter. Therefore, the motion compensation unit 3 can execute high-speed processing. It is also possible with the motion compensation unit 8 to calculate the above processing using a sole matrix, or to generate ¼ precision pixels from the integer precision pixel using the quadrupled filter.

The motion compensation unit 8 may also be provided with an internal filter decision device to decide the number of filtering taps.

The filter decision device decides the number of taps, with which the motion compensation unit 8 performs filtering, based on the information on the macro-block in the bit-stream in the input high resolution picture.

When decimating the high-resolution picture to a standard resolution picture, there exists the relation of trade-off between the picture quality of the output standard resolution picture and the number of filtering taps. That is, although the output standard resolution picture is improved in picture quality by increasing the number of the filtering taps, the processing volume is increased by increasing the number of the filter taps. That is, if the motion compensation unit 8 with low calculation capability is used, and the number of filter taps is increased to improve the picture quality, the printer device is likely to fail to operate in real-time. Conversely, if the number of filter taps is decreased to assure real-time operation, the picture quality is lowered.

In the present filter decision device, the number of taps of the motion compensation unit 8 is changed over based on the information on the macro-block to improve the picture quality of the output standard resolution picture as well as to assure real-time operation.

The processing for deciding the number of filter taps, carried out by the filter decision device, is explained. The filter decision device decides the number of filter taps, based on the information in the input bitstream analyzed by the bitstream analysis unit 11.

For example, the information for deciding the number of filter taps is the following six information, taken alone or in combination.

First, the number of the filter taps is determined depending on whether the processed data is the luminance signals or chrominance signals, for the following reason:

The subjective evaluation of the picture quality is significantly influenced by luminance signals. Also, in the 420 format, used in digital television broadcast, the information volume of the luminance signals is four times that of the chrominance signals. Also, in the MPEG2, the motion vector detected during encoding using the luminance signals is also used for chrominance signals. Thus, by filtering using a number of taps for motion compensation for luminance signals, and by performing linear interpolation for motion compensation for chrominance signals, or by filtering using a smaller number of taps, it is possible to reduce the processing volume without degrading the apparent picture quality.

Second, the number of filter taps is determined based on whether the processed data is of a P-picture or a Bitstream-picture. The reason is as follows:

In a device for decoding only the low range of the DCT coefficients of a bitstream, such as MPEG bitstream, e.g., the above-described picture decoding device 60, the picture is deteriorated in quality due to error integration caused by motion compensation. An error in a P-picture affects the next following P- or Bitstream-pictures. However, errors in a Bitstream-picture is not propagated. Thus, by using a larger number of filter taps for motion compensation of the pixels of the P-picture and by using linear interpolation or by using a smaller number of filter taps for pixel motion compensation to approximate the linear interpolation, the processing volume can be decreased without lowering the picture quality.

Third, the number of filter taps is set depending on whether the motion compensation of the processed data is the forward prediction mode/backward prediction mode or the bitstream-directional prediction mode. The reason is as follows:

For the same reason as stated above, if a larger number of filter taps is used for motion compensation for the forward prediction mode/backward prediction mode and a smaller number of filter taps is used for pixel motion compensation for the bidirectional prediction mode to approximate the linear interpolation, the processing volume can be decreased without lowering the picture quality.

Fourth, the number of filter taps is determined depending on the particular value of the motion vector of a macro-block containing processed data. The reason is as follows:

If a motion compensation device outputs a pixel value corresponding to the phase of the ¼ pixel precision, deterioration in the picture quality is less outstanding, even with the use of a smaller number of taps, than if the motion compensation device outputs a pixel value corresponding to the phase of the ½ pixel precision, by the motion vector value. Therefore, the processing volume can be decreased without lowering the picture quality by switching the number of filter taps depending on the motion vector value.

Fifth, the number of filter taps is set depending on whether the interpolation processing is that in the horizontal direction or that in the vertical direction. The reason is as follows:

In particular, in the case of an interlaced picture, deterioration in the picture quality due to the decreased number of the filter taps is more apparent in the vertical direction than in the horizontal direction. Therefore, the processing volume can be decreased without lowering the picture quality by using a number of filter taps for motion compensation in the vertical direction and by using linear interpolation or by using a smaller number of filter taps for motion compensation in the horizontal direction to approximate the linear interpolation.

Sixth, the number of filter taps is determined depending on whether the processed data is of the field motion compensation mode or the frame motion compensation mode. The reason is as follows:

In picture encoding devices in general, macro-blocks with large field-to-field difference is processed in the field motion compensation mode, while those with small field-to-field difference is processed in the frame motion compensation mode. Thus, by allocating a larger number of taps to the field motion compensation mode and by allocating a smaller number of taps to the frame motion compensation mode, the processing volume can be decreased without lowering the picture quality.

The picture frame conversion unit 9 is fed with the reference picture of the standard resolution, stored in the frame memory 7, or with the picture synthesized by the addition unit 6, and converts the picture by post-filtering into meeting with the standard resolution television standard. That is, the picture frame conversion unit 9 converts the picture frame of the high-resolution television standard into a picture frame of a standard resolution television standard for decimation by ¼.

With the progressive picture accommodating picture decoding unit 2, having the above-described structure, it is possible to decode the bitstream of the progressive picture, compressed in accordance with the MPEG2, as well as to reduce the resolution to ½, to output a standard resolution picture.

The interlaced picture accommodating picture decoding unit 3 is hereinafter explained.

Figure 15:
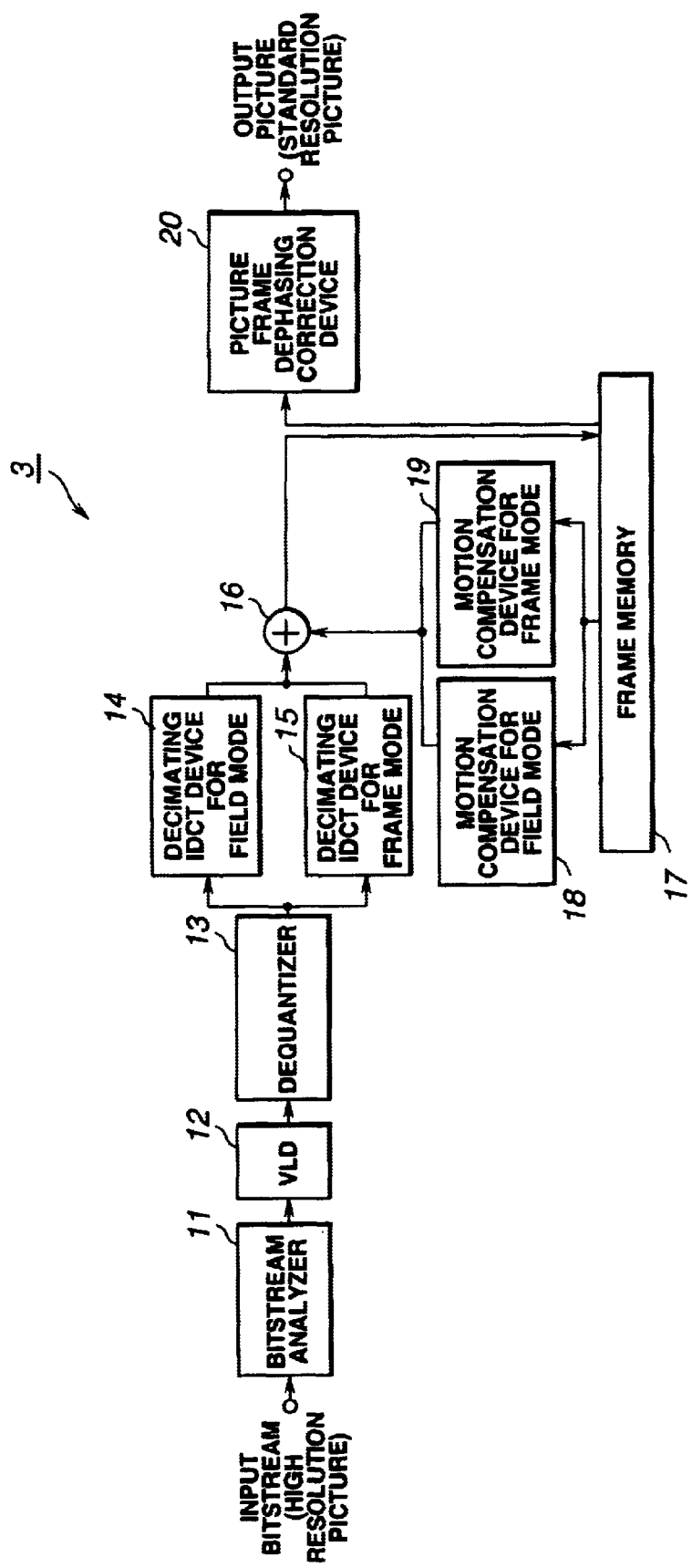
FIG. 15 is a block diagram showing a picture decoding unit of the picture decoding device adapted to cope with the interlaced picture.

Referring to FIG. 15, the interlaced picture accommodating picture decoding unit 3 includes a variable length decoding unit 12 for decoding the bitstream, processed with variable length encoding of allocating a code length associated with the data occurrence frequency, a dequantizer 13 for multiplying the coefficients of the DCT block with quantization steps and a decimating inverse discrete cosine transform unit 14 for field mode for executing decimating inverse discrete cosine transform on the DCT block discrete cosine transformed with the field DCT mode to generate a standard resolution picture. The interlaced picture accommodating picture decoding unit 3 also includes a decimating inverse discrete cosine transform unit for frame mode 15 for executing decimating inverse discrete cosine transform on a DCT block discrete cosine transformed with the frame DCT mode to generate a standard resolution picture, and an addition unit 16 for summing the standard resolution picture processed with decimating IDCT, a frame memory 17 for temporarily storing the reference picture and a motion compensation unit for field mode 18 for motion compensating the reference picture stored in the frame memory 17 in meeting with the field motion predictive mode. The interlaced picture accommodating picture decoding unit 3 also includes a motion compensation unit for frame mode 19 for motion compensating the reference picture stored in the frame memory 17 in meeting with the frame motion predictive mode, and a picture frame converting dephasing correction unit 20 for post-filtering a picture stored in the frame memory 17 for picture frame conversion and for correcting the dephasing of pixels for display on a television monitor etc.

The decimating inverse discrete cosine transform unit 14 for field mode is used if the macro-block of an input bitstream is discrete cosine transformed in the field DCT mode. The decimating inverse discrete cosine transform unit 14 for field mode performs inverse discrete cosine transform only on the low-range 4×4 coefficients of the DCT block, exhibiting 8×8 coefficients in the macro-block discrete cosine transformed in the field DCT mode, as shown in FIG. 5. That is, the decimating inverse discrete cosine transform unit 14 for field mode performs decimating inverse discrete cosine transform based on four point inverse discrete cosine coefficients in the horizontal direction and in the vertical direction. This decimating inverse discrete cosine transform unit 14 for field mode can decode the standard resolution picture, each DCT block of which is made up of 4×4 pixels, by the above-described decimating inverse discrete cosine transform. The phases of the pixels of the decoded picture data are ½, ⁵⁄₂, . . . , in the perpendicular direction of the respective pixels of the top field, with the phases in the perpendicular direction of the respective pixels of the bottom field being 1, 3, . . . , as shown in FIG. 13. That is, in the top field of the decoded lower layer, the phase of the leading end pixel (pixel with the phase of ½) is intermediate between the first and second pixels (pixels with the phase 0 and the phase 2) as from the leading end of the top field of the upper layer, while the phase of the second pixel as from the leading end pixel (pixel with the phase of ⅖) is intermediate between the third and fourth pixels (pixels with the phase 4 and the phase 6) as from the leading end of the top field of the upper layer. On the other hand, in the bottom field of the decoded lower layer, the phase of the leading end pixel (pixel with the phase of 1) is intermediate between the first and second pixels (pixels with the phase 1 and the phase 3) as from the leading end of the bottom field of the upper layer, whereas the phase of the second pixel as from the leading end pixel (pixel with the phase of 3) is intermediate between the third and fourth pixels (pixels with the phase 5 and the phase 7) as from the leading end of the bottom field of the upper layer.

Figure 16:
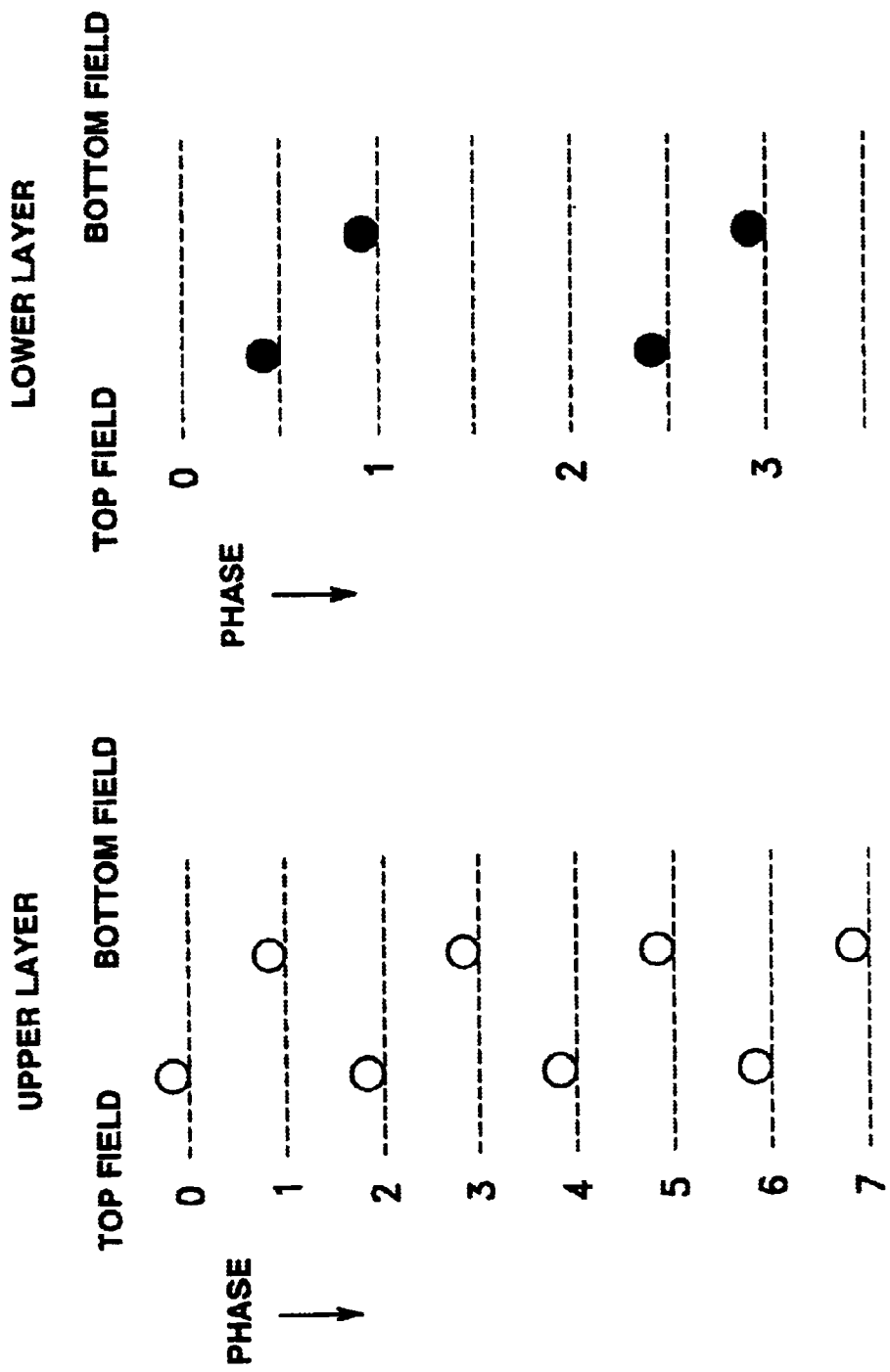
FIG. 16 illustrates the phase of pixels in the vertical direction of a reference picture stored in a frame memory of the picture decoding unit adapted for coping with progressive images shown in FIG. 11.

The decimating inverse discrete cosine transform unit for frame mode 15 is used when the macro-block of the input bitstream is discrete cosine transformed with the frame DCT mode. The decimating inverse discrete cosine transform unit for frame mode 15 performs decimating inverse discrete cosine transform on the DCT block showing 8×8 coefficients in the macro-block discrete cosine transformed in the frame DCT mode. The decimating inverse discrete cosine transform unit for frame mode 15 decodes the standard resolution picture, each DCT block of which is constituted by 4×4 pixels, while generating a picture of the same phase as the phase of the pixel of the standard resolution picture generated by the decimating inverse discrete cosine transform unit 14. That is, the phases in the perpendicular direction of the respective pixels of picture data decoded by the decimating inverse discrete cosine transform unit for frame mode 15 are such that the phases in the perpendicular direction of respective pixels of the top field are ½, ⁵⁄₂, . . . , with the phases in the perpendicular direction of the respective pixels of the bottom field being 1, 3, . . . , as shown in FIG. 16.

The processing by the decimating inverse discrete cosine transform unit for frame mode 15 will be explained subsequently in detail.

If a macro-block processed with decimating inverse discrete cosine transform by the decimating inverse discrete cosine transform unit 14 or by the decimating inverse discrete cosine transform unit for frame mode 15 is an intra-picture, the addition unit 16 directly stores the intra-picture in the frame memory 17. If a macro-block processed with decimating inverse discrete cosine transform by the decimating inverse discrete cosine transform unit 14 or by the decimating inverse discrete cosine transform unit for frame mode 15 is an inter-picture, the addition unit 16 synthesizes the reference picture, motion compensated by the motion compensation unit for field mode 18 or by the motion compensation unit for frame mode 19, to the inter-picture, to store the synthesized picture in the frame memory 17.

The motion compensation unit for field mode 18 is used if the motion prediction mode for the macro-block is the field motion prediction mode. The motion compensation unit for field mode 18 performs interpolation, in meeting with the frame motion prediction mode, with ¼ pixel precision, on the reference picture of the standard resolution picture, stored in the frame memory 17 to execute motion compensation to cope with dephasing components between the top and bottom fields. The reference picture, motion compensated by the motion compensation unit for field mode 18, is sent to the addition unit 16 for synthesis to the inter-picture.

The motion compensation unit for frame mode 19 is used when the macro-block motion prediction mode is the frame motion prediction mode. The motion compensation unit for frame mode 19 performs interpolation, with ¼ pixel precision, on the reference picture of the standard resolution picture, stored in the frame memory 17, to execute motion compensation in meeting with the field motion prediction mode, to cope with dephasing components between the top and bottom fields. The reference picture, motion compensated by the motion compensation unit for frame mode 19, is routed to the addition unit 16 for synthesis to the inter-picture.

The picture frame converting dephasing correction unit 20 is fed with the standard resolution reference picture stored in the frame memory 17, or with the picture synthesized by the addition unit 16, and corrects the picture by post-filtering for phase deviation between the top and bottom fields, while converting the picture frame in meeting with the standard of the standard resolution television. Specifically, the picture frame converting dephasing correction unit 20 corrects the standard resolution picture, with the phases of the pixels of the top field in the perpendicular direction being ½, ⁵⁄₂, . . . and with the phases in the perpendicular direction of the respective pixels of the bottom field being 1, 3, . . . , so that the phases in the perpendicular direction of the respective pixels of the top field will be 0, 2, 4, . . . and so that the phases in the perpendicular direction of the respective pixels of the bottom field will be 1, 3, 5, . . . . The picture frame converting dephasing correction unit 20 also reduces the picture frame of the standard for high resolution television to ¼ for conversion to a picture frame of the standard for standard resolution television.

With the interlaced picture accommodating picture decoding unit 3, having the above-described structure, it is possible to decode a bitstream, obtained on picture compression of a high resolution picture by the MPEG2, and to reduce the resolution to ½, in order to output a standard resolution picture.

The processing contents of the decimating inverse discrete cosine transform unit for frame mode 15 will be explained subsequently in further detail.

Meanwhile, the decimating inverse discrete cosine transform unit for frame mode 15 is able to perform one or both of the one-block processing or the two-block processing as now explained. It is possible with the decimating inverse discrete cosine transform unit for frame mode 15 to switch between the one-block processing and the two-block processing as the occasion may demand or to perform only one of the processings.

Figure 17:
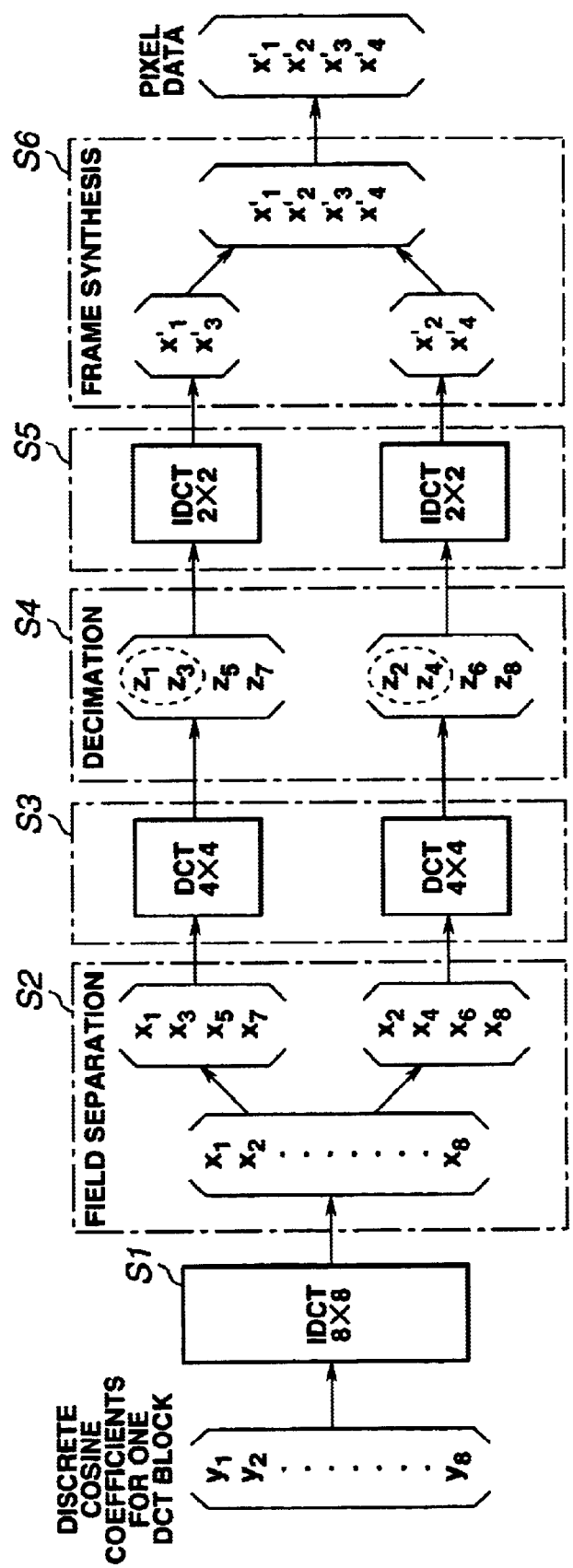
FIG. 17 illustrates the contents of one-block processing of the decimating IDCT device for frame mode of the picture decoding unit adapted for coping with progressive images shown in FIG. 11.

First, the one-block processing is explained. FIG. 17 illustrates the contents of the one-block processing.

The decimating inverse discrete cosine transform unit for frame mode 15 is fed with a bitstream, obtained on compression encoding a high resolution picture, in terms of a DCT block as a unit, as shown in FIG. 17.

First, at step S1, 8×8 inverse discrete cosine transform (IDCT 8×8) is performed on the discrete cosine coefficients y of the DCT block. The coefficients in the perpendicular direction, among the totality of the discrete cosine coefficients of the DCT block, are indicated as $y_1$ to $y_8$ in the drawing. By this inverse discrete cosine transform, 8×8 decoded pixel data x are produced. It is noted that pixel data in the perpendicular direction of the totality of pixel data of the DCT block are indicated as $x_1$ to $x_8$ in the drawing.

At the next step S2, the 8×8 pixel data x are retrieved alternately on the line basis in the perpendicular direction, and are separated into two pixel blocks, namely a pixel block of the 4×4 top field, in meeting with the interlaced scanning, and a pixel block of the 4×4 bottom field, in meeting with the interlaced scanning. That is, the pixel data $x_1$ on the first line, pixel data $x_3$ on the third line, pixel data $x_5$ on the fifth line and pixel data $x_7$ on the seventh line in the vertical direction are retrieved to generate a pixel block for the top field. On the other hand, the pixel data $x_2$ on the second line, pixel data $x_4$ on the fourth line, pixel data $x_6$ on the sixth line and pixel data $x_8$ on the eighth line in the vertical direction are retrieved to generate a pixel block for the bottom field. The processing for separating pixels of a DCT block into two pixel blocks in meeting with the interlaced scanning is referred to below as field separation.

Then, at step S3, each of the two pixel blocks, resulting from field separation, is processed with 4×4 discrete cosine transform (DCT 4×4).

Next, at step S4, high-frequency components of discrete cosine coefficients of the pixel block for the top field, obtained on 4×4 discrete cosine transform, are thinned out to give a pixel block made up of 2×2 discrete cosine coefficients. It is noted that discrete cosine coefficients in the perpendicular direction, among the totality of the coefficients of the pixel block for the top field, are shown as $z_1$, $z_3$, $z_5$ and $z_7$ in the drawing. Also, high-frequency components of discrete cosine coefficients of the pixel block for the bottom field, obtained on 4×4 discrete cosine transform, are thinned out to give a pixel block made up of 2×2 discrete cosine coefficients. It is noted that discrete cosine coefficients in the perpendicular direction, among the totality of the coefficients of the pixel block for the bottom field, are shown as $z_2$, $z_4$, $z_6$ and $z_8$ in the drawing.

Then, at step S5, 2×2 inverse discrete cosine transform (IDCT 2×2) is performed on the pixel blocks, from which the discrete cosine coefficients of the high-frequency components have been thinned out. 2×2 decoded pixel data x' can be obtained on 2×2 inverse discrete cosine transform. The pixel data in the perpendicular direction, among the totality of pixel data of the pixel block of the top field, are shown as $x'_1$ and $x'_3$, while the pixel data in the perpendicular direction, among the totality of pixel data of the pixel block of the bottom field, are shown as $x'_2$ and $x'_4$.

Then, at step S6, pixel data of the pixel block for the top field and pixel data of the pixel block for the bottom field are alternately synthesized along the perpendicular direction on the line basis to generate a DCT block. The processing of alternately synthesizing pixels of the two pixel blocks for the top and bottom fields along the perpendicular direction is referred to below as frame synthesis.

By performing the one-block processing, shown in the above steps S1 to S6, the decimating inverse discrete cosine transform unit for frame mode 15 is able to generate a 4×4 DCT block, constituted by pixels of the same phase as the phase of the pixels of the standard resolution picture generated by the decimating inverse discrete cosine transform unit 14, as shown in FIG. 12.

On the other hand, the decimating inverse discrete cosine transform unit for frame mode 15 performs the one-block processing from the above steps S1 to S6 using a sole matrix. Specifically, the decimating inverse discrete cosine transform unit for frame mode 15 performs matrix processing on a matrix [FS'], shown in the following equations 1:

$$[FS'] = \frac{1}{\sqrt{2}} \begin{bmatrix} A & B & D & -E & F & G & H & I \\ A & -C & -D & E & -F & -G & -H & -J \\ A & C & -D & -E & -F & G & -H & J \\ A & -B & D & E & F & -G & H & -I \end{bmatrix} \quad (1)$$

obtained on expansion computations of the above processing using the addition theorem, and on discrete cosine coefficients ($y_1$ to $y_8$) of a sole DCT block to obtain pixel data x' ($x'_1$ to $x'_4$) of the decimating inverse discrete cosine transformed DCT block.

In the above equation (1), A to J are given as follows:

$$A = \frac{1}{\sqrt{2}}$$

$$D = \frac{1}{4}$$

$$H = \frac{1}{4} + \frac{1}{2\sqrt{2}}$$

$$B = \frac{\cos\frac{\pi}{16} + \cos\frac{3\pi}{16} + 3\cos\frac{5\pi}{16} - \cos\frac{7\pi}{16}}{4}$$

$$E = \frac{\cos\frac{\pi}{16} - \cos\frac{3\pi}{16} - 3\cos\frac{5\pi}{16} - \cos\frac{7\pi}{16}}{4}$$

$$I = \frac{\cos\frac{\pi}{16} - \cos\frac{3\pi}{16} + 3\cos\frac{5\pi}{16} + \cos\frac{7\pi}{16}}{4}$$

$$F = \frac{\cos\frac{\pi}{8} - \cos\frac{3\pi}{8}}{4}$$

$$C = \frac{\cos\frac{\pi}{16} - 3\cos\frac{3\pi}{16} - \cos\frac{5\pi}{16} - \cos\frac{7\pi}{16}}{4}$$

$$G = \frac{\cos\frac{\pi}{16} - 3\cos\frac{3\pi}{16} + \cos\frac{5\pi}{16} + \cos\frac{7\pi}{16}}{4}$$

$$J = \frac{\cos\frac{\pi}{16} + 3\cos\frac{3\pi}{16} - \cos\frac{5\pi}{16} + \cos\frac{7\pi}{16}}{4}$$

Figure 18:
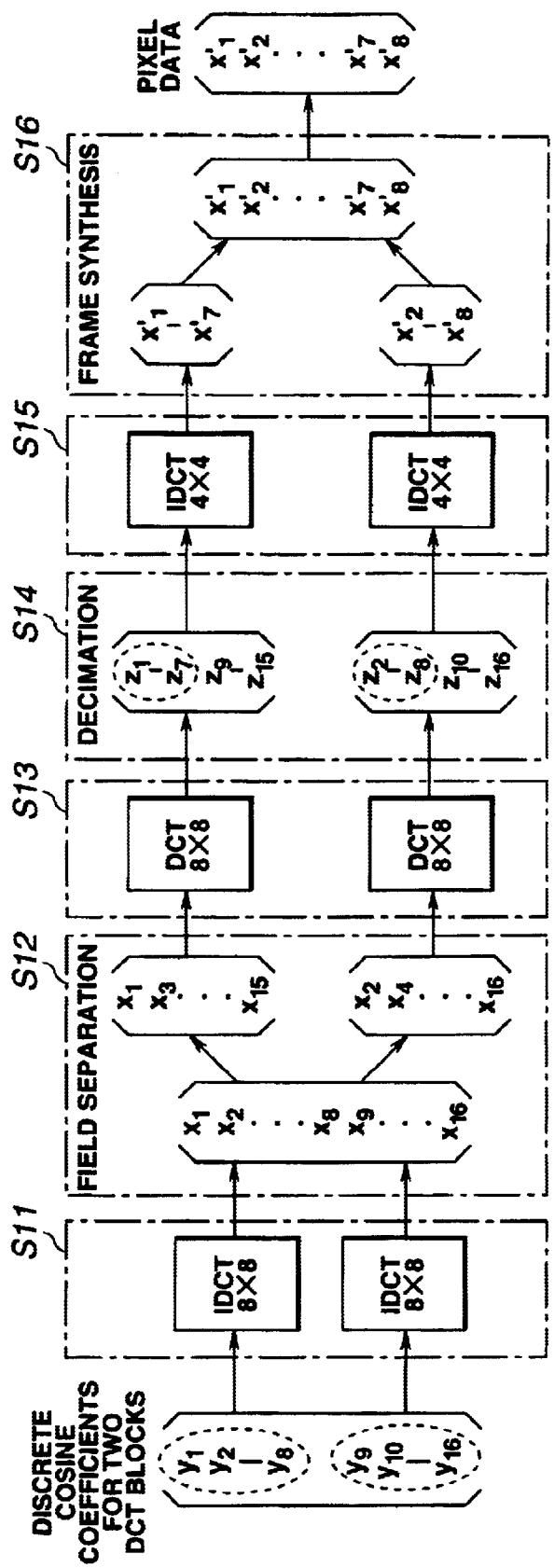
FIG. 18 illustrates the contents of two-block processing of the decimating IDCT device for frame mode of the picture decoding unit adapted for coping with progressive images shown in FIG. 11.

The two-block processing is now explained. FIG. 18 illustrates the contents of the two-block processing.

To the decimating inverse discrete cosine transform unit for frame mode 15, a bitstream obtained on compression encoding a high resolution picture is inputted in terms of two DCT blocks as a unit, as shown in FIG. 18. If, for example, a macro-block is made up of four DCT blocks of the luminance components and two DCT blocks of the chroma components, in accordance with the so-called 420 format, two DCT blocks of luminance components, neighboring to each other along the perpendicular direction, are inputted. If a macro-block is constituted as shown in FIG. 19, DCT blocks 0 and 2 of the luminance components (Y) are inputted as a pair, whilst DCT blocks 1 and 3 of the luminance components (Y) are also inputted as a pair.

First, at step Spindle shaft inserting opening 11, 8×8 inverse discrete cosine transform (IDCT 8×8) is executed independently on discrete cosine coefficients y of the two DCT blocks. The coefficients along the perpendicular direction, among the totality of the discrete cosine coefficients of the temporally previous DCT block, are indicated as $y_1$ to $y_8$, whilst the coefficients along the perpendicular direction, among the totality of the discrete cosine coefficients of the temporally posterior DCT blocks, are indicated as $y_9$ to $y_{16}$. The inverse discrete cosine transform yields 8×8 decoded pixel data x. The pixel data along the perpendicular direction, among the totality of the pixel data of the temporally previous DCT block, are indicated as $x_1$ to $x_8$, whilst the pixel data along the perpendicular direction, among the totality of the pixel data of the temporally posterior DCT blocks, are indicated as $x_9$ to $x_{16}$.

Then, at step S12, 8×8 pixel data x of two DCT blocks are alternately retrieved on the line basis in the perpendicular direction for field separation into two blocks, namely an 8×8 pixel block of the top field for interlaced scanning and an 8×8 pixel block of the bottom field for interlaced scanning. That is, the pixel data $x_1$ on the first line, pixel data $x_3$ on the third line, pixel data $x_5$ on the fifth line and pixel data $x_7$ on the seventh line in the vertical direction are retrieved from the temporally previous DCT block, while the pixel data $x_9$ on the first line, pixel data $x_{11}$ on the second line, pixel data $x_{13}$ on the third line and pixel data $x_{15}$ on the fourth line in the vertical direction are retrieved from the temporally posterior DCT block to generate an 8×8 pixel block for the top field. On the other hand, the pixel data $x_2$ on the second line, pixel data $x_4$ on the fourth line, pixel data $x_6$ on the sixth line and pixel data $x_8$ on the eighth line in the vertical direction are retrieved from the temporally previous DCT block, while the pixel data $x_{10}$ on the second line, pixel data $x_{12}$ on the fourth line, pixel data $x_{14}$ on the sixth line and pixel data $x_{16}$ on the eighth line in the vertical direction are retrieved from the temporally posterior DCT block to generate an 8×8 pixel block for the bottom field.

Then, at step S13, 8×8 discrete cosine transform (DCT 8×8) is executed on each of the field-separated two 8×8 pixel blocks.

Then, at step S14, high-frequency components of discrete cosine coefficients z of the pixel blocks for the top field, obtained on 8×8 discrete cosine transform, are thinned out at step S14 to constitute a pixel block constituted by 4×4 discrete cosine coefficients. The discrete cosine coefficients in the perpendicular direction, among the totality of the coefficients of the pixel blocks for the top field, are indicated as $z_1$, $z_3$, $z_5$, $z_7$, $z_9$, $z_{11}$, $z_{13}$, $z_{15}$. Also, high-frequency components of discrete cosine coefficients z of the pixel blocks for the bottom field, obtained on 8×8 discrete cosine transform, are thinned out to constitute a pixel block constituted by 4×4 discrete cosine coefficients. The discrete cosine coefficients in the perpendicular direction, among the totality of the coefficients of the pixel blocks for the bottom field, are indicated as $z_2$, $z_4$, $z_6$, $z_8$, $z_{10}$, $z_{12}$, $z_{14}$, $z_{16}$.

Then, at step S15, 4×4 inverse discrete cosine transform (IDCT 4×4) is performed on each of the 4×4 pixel blocks, from which the discrete cosine coefficients of the high-frequency components have been thinned out. 4×4 decoded pixel data x' can be obtained on 4×4 inverse discrete cosine transform. The pixel data in the perpendicular direction, among the totality of pixel data of the pixel block of the top field, are shown as $x'_1$, $x'_3$, $x'_5$ and $x'_7$, while the pixel data in the perpendicular direction, among the totality of pixel data of the pixel block of the bottom field, are shown as $x'_2$, $x'_4$, $x'_6$ and $x'_8$.

Next, at step Second sidewall section 16, pixel data of the pixel block for the top field and pixel data of the pixel block for the bottom field are alternately frame-synthesized on the line basis in the perpendicular direction to generate a DCT block processed with decimating inverse discrete cosine transform and which is made up of 8×8 pixel data.

By executing the two-block processing as shown by the above steps Spindle shaft inserting opening 11 to Second sidewall section 16, the decimating inverse discrete cosine transform unit for frame mode 15 is able to generate a DCT block constituted by pixels of the same phase as the phase of the pixels of the standard resolution picture generated by the decimating inverse discrete cosine transform unit 14, as shown in FIG. 16.

The decimating inverse discrete cosine transform unit for frame mode 15 also executes the two-block processing from the above step Spindle shaft inserting opening 11 up to the step Second sidewall section 16 using a sole matrix. Specifically, the decimating inverse discrete cosine transform unit for frame mode 15 performs matrix processing on a matrix [FS″], indicated by the following equation (2):

$$[FS''] = \frac{1}{8\sqrt{2}}[A \quad B \quad C \quad D] \qquad (2)$$

obtained on expansion computation of the above processing using an addition theorem, and discrete cosine coefficients $y(y_1$ to $y_{16})$ of two DCT blocks, to obtain pixel data x' ($x'_1$ to $x'_8$) of the reducing inverse discrete cosine transformed DCT block.

In the equation (2), A to D denote the following:

A

| | | | |
|---|---|---|---|
| 4a + 3d − e + f + g | 1 + a + 2b − c + d + e + 3f − g | 1 + d + 2 − f + g | −2a + 2b + c − d + e + f + g |
| 4a + 3d − e + f + g | 2 − a + bitstream − d + 3e + f + g | −1 − d + e − f + g | −bitstream + d − e − f − g |
| 4a + d + e + f + g | −a − bitstream + d − 3e − f − g | −1 − d − 3e + f + g | −bitstream + 2c − d + e + f + g |
| 4a + d + e + f + g | −1 − a − 3c − d − e − 3f + g | 1 + d − e − f − 3g | −2a + 2b + c + d − e − f − g |
| 4a − d − e − f − g | a + bitstream + d − 3e − f − g | −1 + d + 3e − f − g | bitstream − 2c − d + e + f + g |
| 4a − d − e − f − g | 1 + a + 3c − d − e − 3f + g | 1 − d + e + f + 3g | 2a − 2b − c + d − e − f − g |
| 4a − 3d + e − f − g | −1 − a − 2b + c + d + e + 3f − g | 1 − d − e + f − g | 2a − 2b − c − d + e + f + g |
| 4a − 3d + e − f − g | −2 + a − bitstream − d + 3e + f + g | −1 + d − e + f − g | bitstream + d − e − f − g |

Bitstream

| | | | |
|---|---|---|---|
| 2b − 2c − d + e + f + 3g | −1 + 2a + bitstream + d − e + f + g | 1 + 2a + d + e + f − g | 1 + a + bitstream − 2c + d − e + 3f + g |
| −2b + 2c + d − e − f − 3g | −1 − 2a + 3c − d + e − f − g | −1 − 2a − d − e − f − g | −a − 2b − c − d − 3e + f − g |
| −2b + 2c − d + e − f + g | −1 − 2a + 2b − c − d − e + f + g | − 1 − 2a + d − e + 3f + g | 2 − a + 2b + c + d + 3e − f + g |
| 2b − 2c + d − e + f − g | 1 − 2a + bitstream − d + e − f − g | 1 + 2a + 3d − e + f + g | −1 − a − bitstream − d + e − 3f − g |
| −2b + 2c + d − e + f − g | 1 + 2a − 2b + c + d − e + f + g | −1 − 2a − d + e + 3f − g | −2 + a − 2b − c + d + 3e − f + g |
| 2b − 2c − d + e − f + g | −1 + 2a − bitstream − d + e − f − g | 1 + 2a − 3d + e − f − g | 1 + a + bitstream − d + e − 3f − g |
| 2b − 2c + d − e − f − 3g | 1 − 2a − bitstream + d − e + f + g | 1 + 2a − d − e − f + g | −1 − a − bitstream + 2c + d − e + 3f + g |
| −2b + 2c + d − e + f + 3g | 1 + 2a − 3c − d + e − f − g | −1 − 2a + d + e + f + g | a + 2b + c − d − 3e + f − g |

C

-continued

| | | | |
|---|---|---|---|
| 4a − 3d + e − f − g | 2 − a + bitstream + d − 3e − f − g | −1 + d − e + f − g | −bitstream − d + e + f + g |
| 4a − 3d + e − f − g | 1 + a + 2b − c − d − e − 3f + g | 1 − d − e + f − g | −2a + 2b + c + d − e − f − g |
| 4a − d + e − f − g | −1 − a − 3c + d + e + 3f − g | 1 − d + e + f + 3g | −2a + 2b + c − d + e + f + g |
| 4a − d + e − f − g | −a − bitstream − d + 3e + f + g | −1 − d − 3e − f − g | −bitstream + 2c + d − e − f − g |
| 4a + d + e + f + g | 1 + a + 3e + d + e + 3f − g | 1 + d − e − f − 3g | 2a − 2b − c − d + e + f + g |
| 4a + d + e + f + g | a + bitstream − d + 3e + f + g | −1 − d − 3e + f + g | bitstream − 2c + d − e − f − g |
| 4a + 3d − e + f + g | −2 + a − bitstream + d − 3e − f − g | −1 − d + e − f + g | bitstream − d + e + f + g |
| 4a + 3d − e + f + g | −1 − a − 2b + c − d − e − 3f + g | 1 + d + e − f + g | 2a − 2b − c + d − e − f − g |
| D | | | |
| −2b + 2c − d + e + f + 3g | −1 − 2a + 3c + d − e + f + g | −1 − 2a + d + e + f + g | −a − 2b − c + d + e3 − f + g |
| 2b − 2c + d − e − f − 3g | −1 + 2a + bitstream − d + e − f − g | 1 + 2a − d − e − f + g | 1 + a + bitstream − 2c − d + e − 3f − g |
| 2b − 2c − d + e − f + g | 1 − 2a + bitstream + d − e + f + g | 1 + 2a − 3d + e − f − g | −1 − a − bitstream + d − e + 3f + g |
| −2b + 2c + d − e + f − g | −1 − 2a + 2b − c − d + e − f − g | −1 − 2a − d + e + 3f − g | 2 − a + 2b + c − d − 3e + f − g |
| 2b − 2c + d − e + f − g | −1 + 2a − bitstream + d − e + f + g | 1 + 2a + 3d − e + f + g | 1 + a + bitstream + d − e + 3f + g |
| −2b + 2c − d + e − f + g | 1 + 2a − 2 bitstream + c − d + e − f − g | −1 − 2a + d − e − 3f + g | −2 + a − 2b − c − d − 3e + f − g |
| −2b + 2c + d − e − f − 3g | 1 + 2a − 3c + d − e + f + g | −1 − 2a − d − e − f − g | a + 2b + c + d + 3e − f + g |
| 2b − 2c − d + e + f + 3g | 1 − 2a − bitstream − d + e − f − g | 1 + 2a + d + e + f − g | −1 − a − bitstream + 2c − d + e − 3f − g |

In the above equation (2), a to g are defined as follows:

$$a = \cos\frac{\pi}{4}$$

$$b = \cos\frac{\pi}{8}$$

$$c = \cos\frac{3\pi}{8}$$

$$d = \cos\frac{\pi}{16}$$

$$e = \cos\frac{3\pi}{16}$$

$$f = \cos\frac{5\pi}{16}$$

$$g = \cos\frac{7\pi}{16}$$

If, in the decimating inverse discrete cosine transform unit for frame mode 15, a so-called 420-format macro-block shown in FIG. 19 is inputted, two-block processing as indicated by the above steps Spindle shaft inserting opening 11 to Second sidewall section 16 is executed on the luminance components by way of performing a decimating inverse discrete cosine transform, while one-block processing as indicated by the above steps S1 to S6 is executed on the chroma components by way of performing a decimating inverse discrete cosine transform.

With the interlaced picture accommodating picture decoding unit 3 of the first embodiment of the present invention, 4×4 decimating inverse discrete cosine transform is applied to each of the top field and the bottom field in the field DCT mode to decode the standard resolution picture. In the frame DCT mode, a standard resolution picture is decoded on frame separation and on decimating inverse discrete cosine transform. With the present interlaced picture accommodating picture decoding unit 3, in which different processing is performed for the field DCT mode and the frame DCT mode, the interlacing character proper to the picture obtained on interlaced scanning is not degraded. In addition, the picture decoded in the field DCT mode can be rendered equal in phase to that decoded in the frame DCT mode, while the output picture is not deteriorated in picture quality.

Meanwhile, in the interlaced picture accommodating picture decoding unit 3, decimating inverse discrete cosine transform by the decimating inverse discrete cosine transform unit 14 and decimating inverse discrete cosine transform by one-block processing at steps S1 to S6 of the decimating inverse discrete cosine transform unit for frame mode 15 can be executed using a high-speed algorithm.

For example, the processing speed can be enhanced by employing the Wang algorithm (Zhong D E Wang., "Fast Algorithms for the Discrete W Transform and for the Discrete Fourier Transform", IEEE Tr. ASSP-32, No.4, predicted upper-order picture. 803 to 816, August 1984).

The matrix used by the decimating inverse discrete cosine transform unit 14 for processing may be resolved by the Wang algorithm as indicated by the following equation (3):

$$[C_4^{II}]^{-1} = [C_4^{III}] = \frac{1}{\sqrt{2}}\begin{bmatrix} 1 & 0 & 0 & 1 \\ 0 & 1 & 1 & 0 \\ 0 & 1 & -1 & 0 \\ 1 & 0 & 0 & -1 \end{bmatrix}\begin{bmatrix} C_2^{III} & \\ & \overline{C_2^{III}} \end{bmatrix}\begin{bmatrix} 1 & 0 & 0 & 1 \\ 0 & 0 & 1 & 0 \\ 0 & 0 & 0 & 1 \\ 0 & 1 & 0 & 0 \end{bmatrix} \quad (3)$$

$$[C_2^{III}] = [C_2^{II}]^T = \begin{bmatrix} \frac{1}{\sqrt{2}} & \frac{1}{\sqrt{2}} \\ \frac{1}{\sqrt{2}} & -\frac{1}{\sqrt{2}} \end{bmatrix} = \frac{1}{\sqrt{2}}\begin{bmatrix} 1 & 1 \\ 1 & -1 \end{bmatrix} \quad C_r = \cos(r\pi)$$

$$[\overline{C_2^{IV}}] = \begin{bmatrix} -\frac{C_1}{8} & \frac{C_3}{8} \\ \frac{C_3}{8} & \frac{C_1}{8} \end{bmatrix} = \begin{bmatrix} 1 & 0 & -1 \\ 0 & 1 & 1 \end{bmatrix}\begin{bmatrix} -\frac{C_1+C_3}{8} & 0 & 0 \\ 0 & \frac{C_1+C_3}{8} & 0 \\ 0 & 0 & \frac{C_3}{8} \end{bmatrix}\begin{bmatrix} 1 & 0 \\ 0 & 1 \\ 1 & -1 \end{bmatrix}.$$

Figure 20:
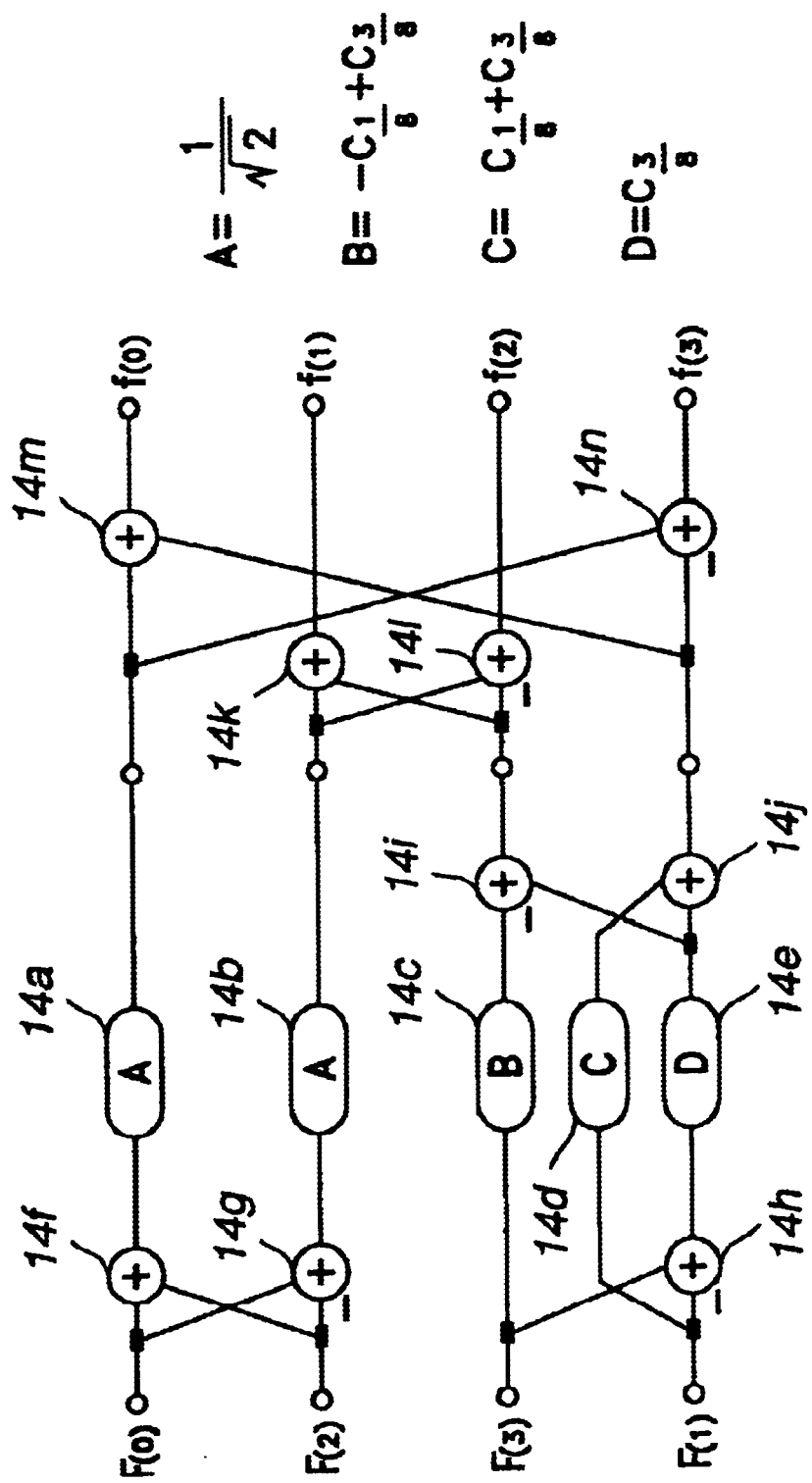
FIG. 20 illustrates a calculation flow in case the Wang's algorithm is applied to the processing of the decimating IDCT device for the field mode of the picture decoding unit adapted to cope with the interlaced picture.

FIG. 20 shows the processing flow in the case of applying the Wang algorithm to the processing by the decimating inverse discrete cosine transform unit 14. As may be seen form this processing flow, a high processing speed can be realized using first to fifth multipliers 14a to 14e and first to ninth adders 14f to 14n.

The matrix [FS'] used by the decimating inverse discrete cosine transform unit 15 for processing may be resolved by the Wang algorithm as indicated by the following equation (4):

$$[FS'] = \frac{1}{\sqrt{2}} \begin{bmatrix} 1 & 0 & 0 & 0 \\ 0 & 0 & 0 & 1 \\ 0 & 1 & 0 & 0 \\ 0 & 0 & 1 & 0 \end{bmatrix} \begin{bmatrix} 1 & 0 & 1 & 0 \\ 0 & 1 & 0 & 1 \\ 1 & 0 & -1 & 0 \\ 0 & 1 & 0 & -1 \end{bmatrix} \begin{bmatrix} [M_1] & \\ & [M_2] \end{bmatrix} \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 1 & 0 & 0 \\ 0 & 1 & 0 & 0 & 0 & 0 & 0 & 0 \\ 0 & 0 & 0 & 0 & 0 & 0 & 0 & 1 \end{bmatrix} \quad (4)$$

$$[M_1] = \begin{bmatrix} 1 & 1 \\ -1 & -1 \end{bmatrix} \begin{bmatrix} 1 & 0 & 0 & 0 \\ 0 & 1 & 1 & 1 \end{bmatrix} \begin{bmatrix} A & 0 & 0 & 0 \\ 0 & D & 0 & 0 \\ 0 & 0 & F & 0 \\ 0 & 0 & 0 & H \end{bmatrix}$$

$$[M_2] = \begin{bmatrix} 1 & 1 & 0 \\ 1 & 0 & 1 \end{bmatrix} \begin{bmatrix} -1 & 1 & 0 & 0 & 0 & 0 \\ 0 & 0 & 1 & 0 & 1 & 0 \\ 0 & 0 & 0 & 1 & 0 & 1 \end{bmatrix} \begin{bmatrix} E & 0 & 0 & 0 \\ 0 & G & 0 & 0 \\ 0 & 0 & B & 0 \\ 0 & 0 & C & 0 \\ 0 & 0 & 0 & I \\ 0 & 0 & 0 & J \end{bmatrix}.$$

In the equation (4), A to J are defined as follows:

$$A = \frac{1}{\sqrt{2}}$$

$$F = \frac{\cos\frac{\pi}{8} - \cos\frac{3\pi}{8}}{4}$$

$$D = \frac{1}{4}$$

$$H = \frac{1}{4} + \frac{1}{2\sqrt{2}}$$

$$B = \frac{\cos\frac{\pi}{16} + \cos\frac{3\pi}{16} + 3\cos\frac{5\pi}{16} - \cos\frac{7\pi}{16}}{4}$$

$$C = \frac{\cos\frac{\pi}{16} - 3\cos\frac{3\pi}{16} - \cos\frac{5\pi}{16} - \cos\frac{7\pi}{16}}{4}$$

$$E = \frac{\cos\frac{\pi}{16} - \cos\frac{3\pi}{16} - \cos\frac{5\pi}{16} - \cos\frac{7\pi}{16}}{4}$$

$$G = \frac{\cos\frac{\pi}{16} - \cos\frac{3\pi}{16} + \cos\frac{5\pi}{16} + \cos\frac{7\pi}{16}}{4}$$

$$I = \frac{\cos\frac{\pi}{16} - \cos\frac{3\pi}{16} + 3\cos\frac{5\pi}{16} + \cos\frac{7\pi}{16}}{4}$$

$$J = \frac{\cos\frac{\pi}{16} + 3\cos\frac{3\pi}{16} - \cos\frac{5\pi}{16} + \cos\frac{7\pi}{16}}{4}$$

Figure 21:
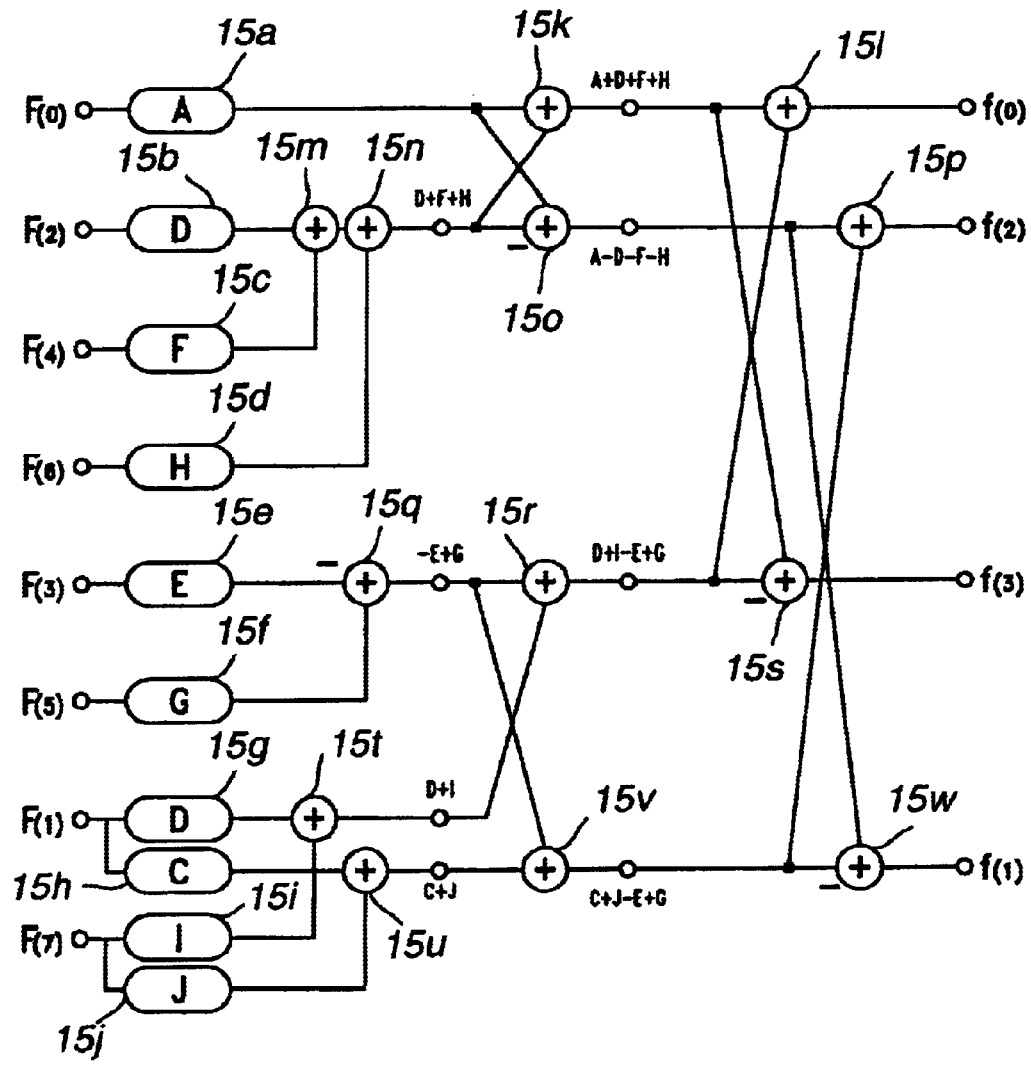
FIG. 21 illustrates a calculation flow in case the Wang's algorithm is applied to the one-block processing of the decimating IDCT device for the frame mode of the picture decoding unit adapted to cope with the interlaced picture.

The processing flow in the case of applying the Wang algorithm to the processing by the decimating inverse discrete cosine transform unit for frame mode 15 is shown in FIG. 21. As may be seen from this processing flow, the processing speed can be enhanced by employing first to tenth multipliers 15a to 15j and first to thirteenth adders 15k to 15w.

In the above-described first embodiment of the picture decoding device 1 according to the present invention, if an interlaced picture is inputted, the interlaced picture accommodating picture decoding unit 3 applies IDCT to the coefficients of the entire frequency components of the DCT block, IDCTed in the frame DCT mode, to separate the block into two pixel blocks associated with interlaced scanning, then applies DCT to the separated two pixel blocks, then applies IDCT to the low-frequency components. Two pixel blocks resulting from IDCT are then synthesized. In the present first embodiment of the picture decoding device 1, if a progressive picture is inputted, the progressive picture accommodating picture decoding unit 2 applies IDCT to low-frequency coefficients of the respective coefficients of the DCT block.

Thus, in the present first embodiment of the picture decoding device 1 according to the present invention, pixel dephasing between the field DCT mode and the frame DCT mode can be eliminated to improve the picture quality of the sequential scanned picture without detracting from the properties peculiar to the sequential scanned picture.

Meanwhile, the progressive picture accommodating picture decoding unit 2 and the interlaced picture accommodating picture decoding unit 3 of the picture decoding device 1 share certain components having the same processing contents. For example, the processing contents of the variable-length decoding units 3 and 12, those of the dequantizers 4 and 13, those of the addition units 6 and 16 and those of the frame memories 7, 17 are the same. Therefore, these components may be owned in common by the progressive picture accommodating picture decoding unit 2 and the interlaced picture accommodating picture decoding unit 3.

Second Embodiment

A picture decoding device of a second embodiment of the present invention is hereinafter explained. In the following explanation of the second embodiment of the picture decoding device, parts or components which are the same as those of the int3 of the first embodiment are depicted by the same reference numerals and are not explained specifically. Also, in the present second embodiment of the picture decoding device, the interlaced picture accommodating picture decoding unit 3 of the above-described first embodiment is modified. Therefore, only the modified interlaced picture accommodating picture decoding unit is explained in detail.

Figure 22:
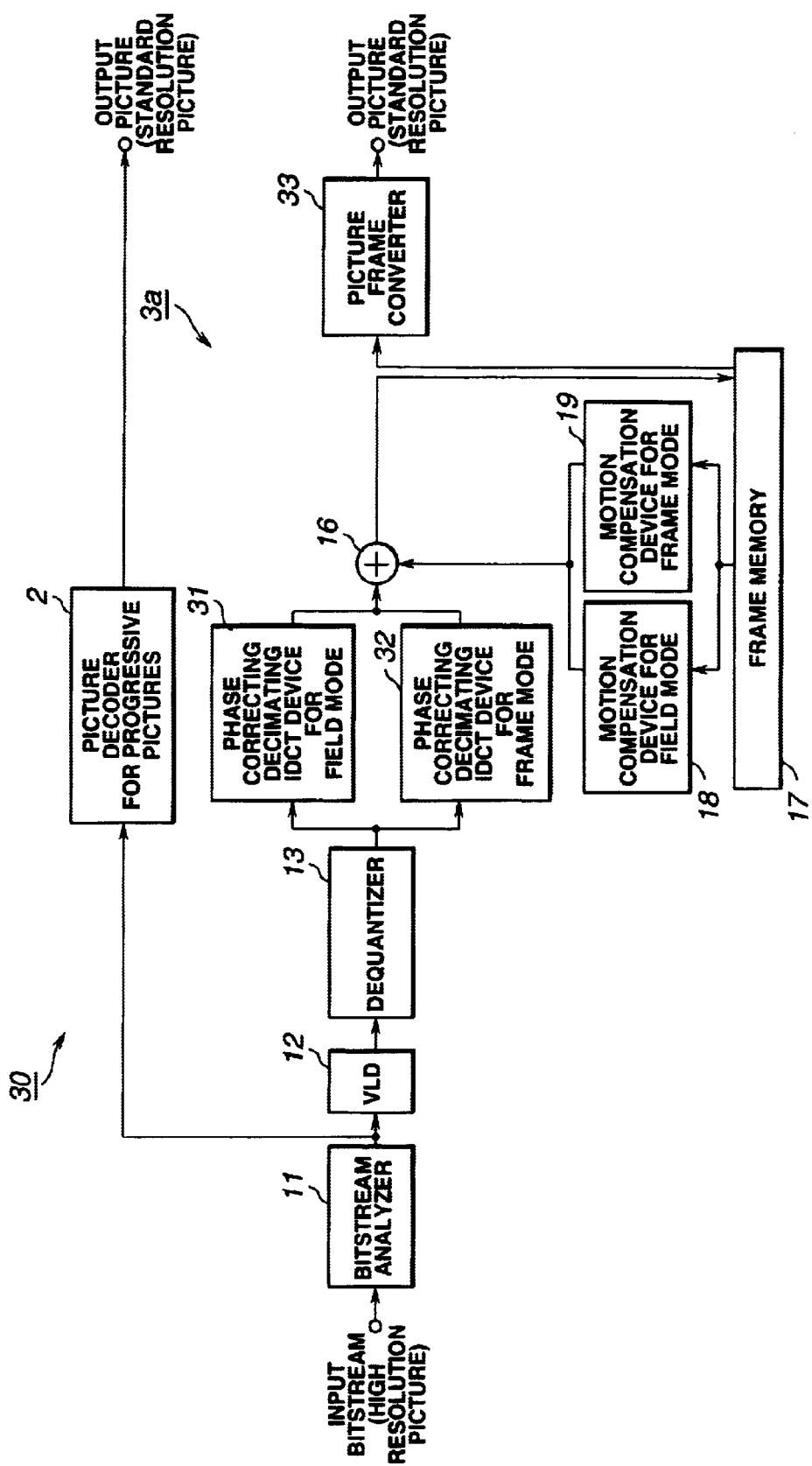
FIG. 22 is a block diagram of a picture decoding device according to a second embodiment of the present invention.

Referring to FIG. 22, a picture decoding device 30 according to the second embodiment of the present invention includes a bitstream analysis unit 11, a progressive picture accommodating picture decoding unit 2 and an interlaced picture accommodating picture decoding unit 3*a*. The picture decoding device 30 is fed with a bitstream corresponding to a high resolution picture with the number of effective lines in the vertical direction of, for example, 1152, obtained on picture compression with MPEG2, and decodes this input bitstream as it reduces the resolution to one half to output a standard resolution picture with the number of effective lines in the vertical direction of, for example, 576.

This picture decoding device 30 includes a variable length decoder 12 fed with a bitstream inputted from the bitstream analysis unit 11 and which is adapted for decoding the bitstream which is encoded with variable length encoding allocating a code length corresponding to the data occurrence frequency. The picture decoding device 30 also includes a dequantizer 13 for multiplying respective coefficients of the DCT block with quantization steps, and a phase-correcting decimating inverse discrete cosine transform unit for field mode 31 for executing decimating inverse discrete cosine transform on the DCT block discrete cosine transformed by the field DCT mode to generate a standard resolution picture. The picture decoding device 30 also includes a phase-correcting decimating inverse discrete cosine transform unit for frame mode 32 for executing decimating inverse discrete cosine transform on the DCT block discrete cosine transformed by the frame DCT mode to generate a standard resolution picture, and an addition unit 16 for summing the decimating inverse discrete cosine transformed standard resolution picture to the motion-compensated reference picture. The picture decoding device 30 also includes a frame memory 17 for transiently storing the reference picture, and a motion compensation unit for field mode 18 for motion-compensating the reference picture stored by the frame memory 17 in meeting with the field motion prediction mode. The picture decoding device 30 also includes a motion compensation unit for frame mode 19 for motion-compensating the reference picture stored in the frame memory 17 in meeting with the frame motion prediction mode and a picture frame conversion unit 33 for outputting picture data of the standard resolution for converting the picture frame of a picture stored in the frame memory 17 for display on e.g., a monitor.

Figure 23:
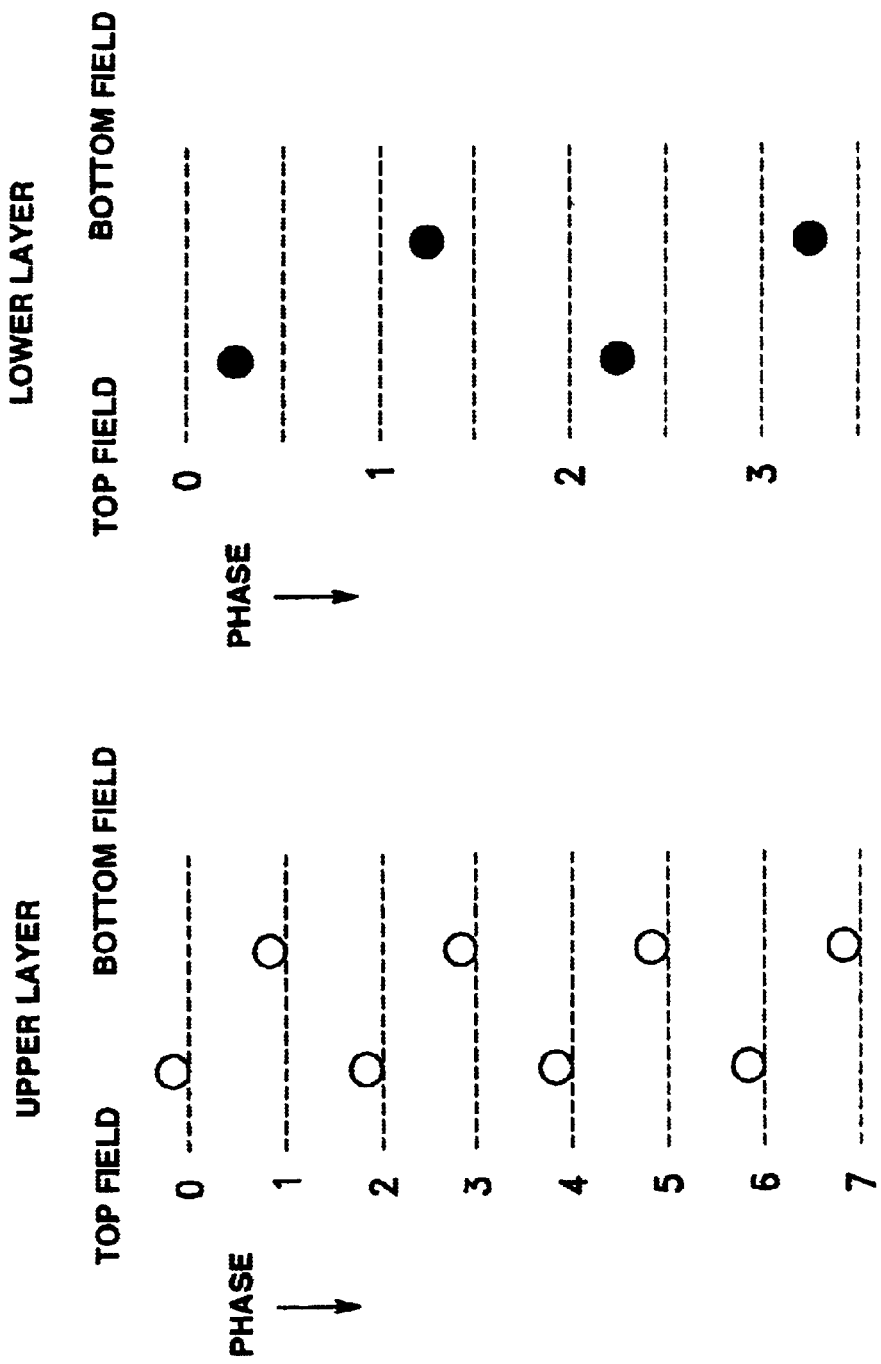
FIG. 23 illustrates the phase of a pixel in the vertical direction of a reference picture stored in the frame memory of a picture decoding unit of the second embodiment of the picture decoding device adapted to cope with the interlaced pictures.

The phase-correcting decimating inverse discrete cosine transform unit for field mode 31 is used in the event that a macro-block of an input bitstream is discrete cosine transformed with the field motion prediction mode. In the phase-correcting decimating inverse discrete cosine transform unit for field mode 31, inverse discrete cosine transform, in which has been corrected the dephasing of pixels in the vertical direction of the top and bottom fields, is applied to only 4×8 coefficients, among the totality of the coefficients of the DCT block with 8×8 coefficients in the macro-block discrete cosine transformed with the field DCT mode. That is, the phase-correcting decimating inverse discrete cosine transform unit for field mode 31 effects inverse discrete cosine transform in the horizontal direction based on the four low-range point discrete cosine coefficients, while effecting inverse discrete cosine transform corrected for de-phasing in the vertical direction based on the eight point discrete cosine coefficients. Specifically, the phase-correcting decimating inverse discrete cosine transform unit for field mode 31 corrects the phase in an amount corresponding to ¼ pixel for each pixel of the top field in the vertical direction, while correcting the phase in an amount corresponding to ¾ pixel for each pixel of the bottom field in the vertical direction. By performing the above-described decimating inverse discrete cosine transform, a standard resolution picture (lower layer) shown in FIG. 23 is generated in which the phases of the respective pixels of the top field in the vertical direction are ¼, 9/4, . . . , with the phases of the respective pixels of the bottom field in the vertical direction being ⁵⁄₄, ¹³⁄₄, . . . , The phase-correcting decimating inverse discrete cosine transform unit for frame mode 32 is used if a macro-block of an input bitstream has been discrete cosine transformed with the frame DCT mode. In the phase-correcting decimating inverse discrete cosine transform unit for frame mode 32, decimating inverse discrete cosine transform, in which has been corrected the pixel dephasing along the vertical direction of the top field and the bottom field, is applied to the DCT block with 8×8 coefficients in the macro-block discrete cosine transformed with the frame DCT mode. The phase-correcting decimating inverse discrete cosine transform unit for frame mode 32 generates a picture of the same phase as the phase of the pixels of the standard resolution picture generated by the phase-correcting decimating inverse discrete cosine transform unit for field mode 31. That is, the phase-correcting decimating inverse discrete cosine transform unit for frame mode 32 executes decimating inverse discrete cosine transform with one-block or two-block processing to generate a standard resolution picture (lower layer) in which the phases in the vertical direction of the respective pixels of the top field are ¼, ⁹⁄₄, . . . , with the phases in the vertical direction of the respective pixels of the bottom field being ⁵⁄₄, ¹³⁄₄, . . . , as shown in FIG. 23.

The motion compensation unit for field mode 18 is used if the motion prediction mode of the macro-block is the field motion prediction mode. The motion compensation unit for field mode 18 applies pixel interpolation employing orthogonal transform to the reference picture of the standard resolution picture stored in the frame memory 17 to generate a virtual upper-order picture having the same resolution as that of the high resolution picture. The motion compensation unit for field mode 18 motion-compensates the virtual upper-order picture in meeting with the field motion prediction mode and reduces the resolution of the motion-compensated virtual upper-order picture by employing orthogonal transform to generate a reference picture of the standard resolution. The reference picture, motion-compensated by the motion compensation unit for field mode 18, is sent to the addition unit 16, where it is synthesized to an inter-picture.

The motion compensation unit for frame mode 19 is used if the motion prediction mode of the macro-block is the frame motion prediction mode. The motion compensation unit for frame mode 19 applies interpolation to the reference picture of the standard resolution picture stored in the frame memory 17 to effect motion compensation in meeting with the frame motion prediction mode. The reference picture, motion-compensated by the motion compensation unit for frame mode 19, is sent to the addition unit 16, where it is synthesized to an inter-picture.

The picture frame conversion unit 33 is fed with a reference picture of the standard resolution stored in the frame memory 17 and converts the picture frame of this reference picture by post-filtering for conformity to the standard for a standard resolution television. That is, the picture frame conversion unit 33 converts the picture frame of the high resolution television standard to the picture frame of the standard resolution television reduced in size to ¼. Meanwhile, with the present picture frame conversion unit 33, since the picture stored in the frame memory 17 is not subjected to dephasing between the top and bottom fields, it is unnecessary to effect the correction for pixel dephasing in contradistinction from the picture frame converting dephasing correction unit 20 of the above-described first embodiment.

With the interlaced picture accommodating picture decoding unit 3a, constructed as described above, the bitstream of a high resolution picture, compressed in accordance with MPEG2, can be decoded and simultaneously reduced in resolution to ½ in order to output a standard resolution picture.

The processing contents of the phase-correcting decimating inverse discrete cosine transform unit for field mode 31 will be explained in further detail.

Figure 24:
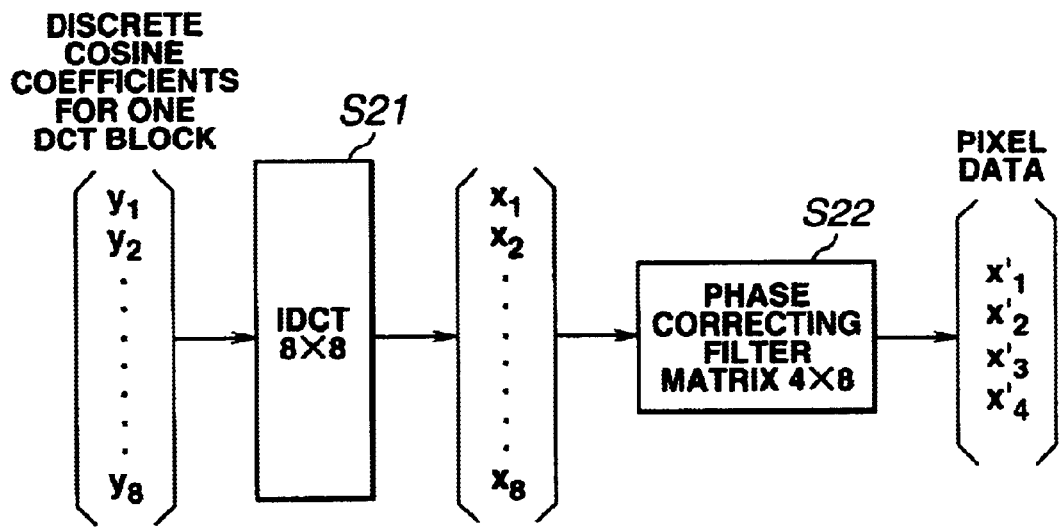
FIG. 24 illustrates processing contents of the phase correcting decimating IDCT device for field mode of the picture decoding unit adapted to cope with the interlaced pictures.

The phase-correcting decimating inverse discrete cosine transform unit for field mode 31 is fed with a bitstream, compression-coded from a high resolution picture, in terms of a DCT block as a unit, as shown in FIG. 24.

First, at step S21, 8×8 inverse discrete cosine transform (IDCT8×8) is applied to the discrete cosine coefficients y of the sole DCT block. It is noted that the coefficients in the vertical direction, among the totality of the discrete cosine coefficients in the DCT block, are denoted as $y_1$ to $y_8$ in the drawing. By the inverse discrete cosine transform, 8×8 decoded pixel data x are obtained. It is noted that pixel data along the vertical direction, among the totality of pixel data of the DCT block, are indicated as $x_1$ to $x_8$ in the drawing.

Then, at step S22, these 8×8 pixel data are processed with transform closed in the DCT block, by a 4×8 phase-correcting filter matrix, in order to produce phase-corrected pixel data x'. It is noted that the pixel data along the vertical direction, among the totality of pixel data, are denoted as $x'_1$, $x'_2$, $x'_3$, $x'_4$ in the drawing.

By performing the processing of steps S21 and S22, the phase-correcting decimating inverse discrete cosine transform unit for field mode 31 can generate a picture not subjected to dephasing between the top and bottom fields.

Figure 25:
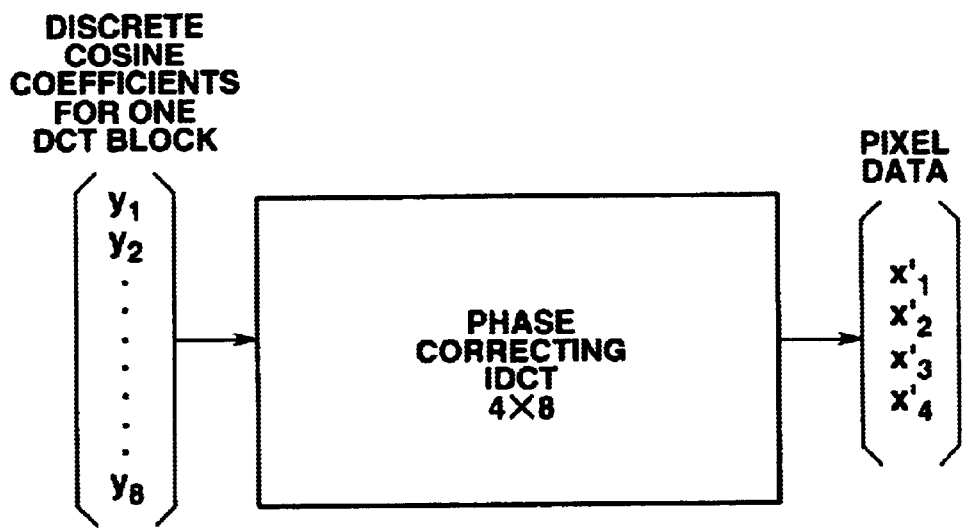
FIG. 25 illustrates the processing contents of the phase-correcting decimating IDCT device for the field mode in case processing is to be performed on a sole matrix.

It is also possible with the phase-correcting decimating inverse discrete cosine transform unit for field mode 31 to perform the above processing using a sole matrix (4×8 phase-correcting IDCT matrix), as shown in FIG. 25.

Figure 26:
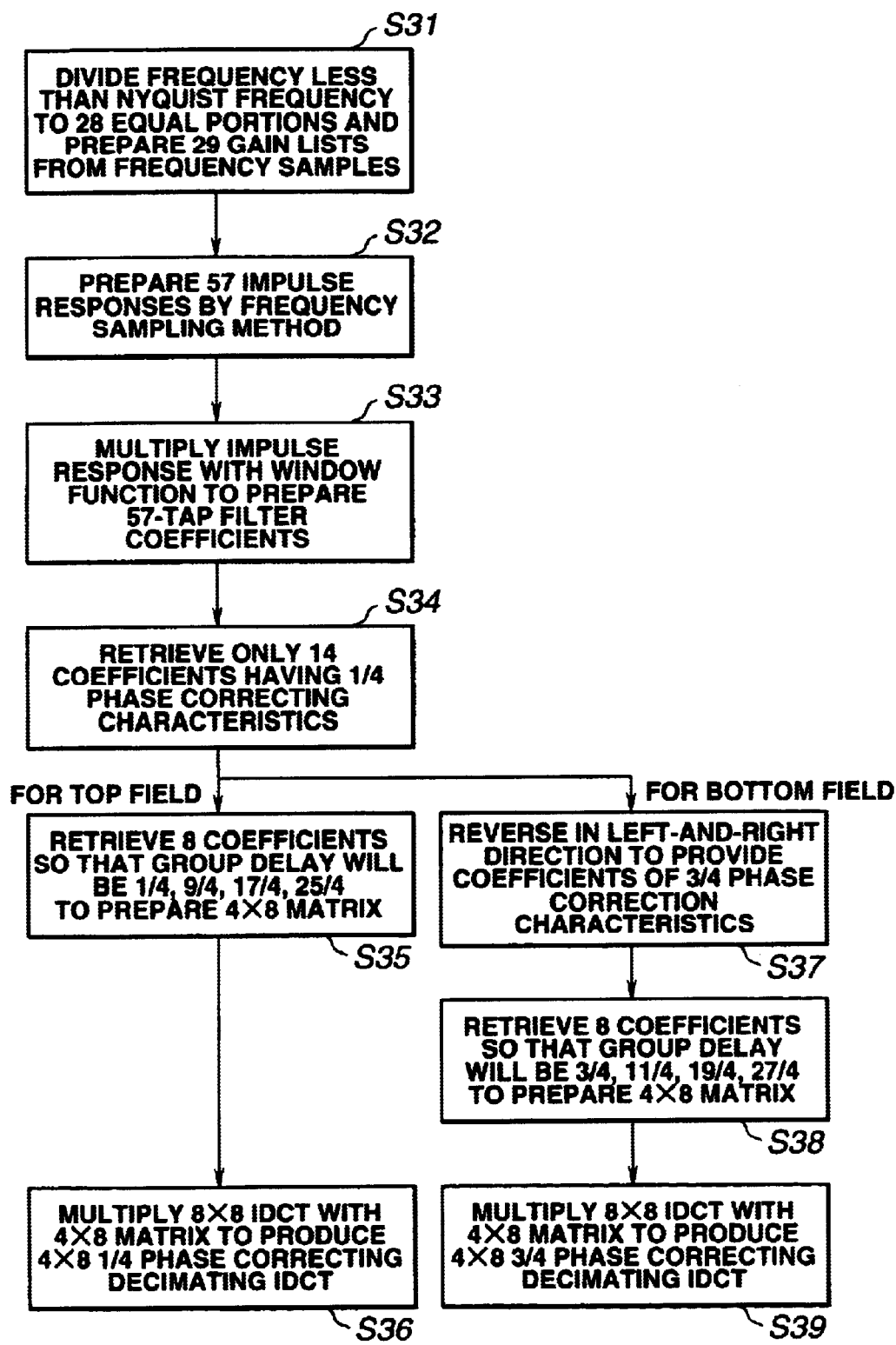
FIG. 26 is a flowchart for illustrating the designing sequence of the 4×8 phase-correcting IDCT matrix on which calculations are executed by the phase-correcting decimating IDCT device for the field mode.

FIG. 26 shows the designing procedure of the 4×8 phase correcting IDCT matrix, in which computations are executed by the above-described phase-correcting decimating inverse discrete cosine transform unit for field mode 31. This 4×8 phase correcting IDCT matrix is hereinafter explained. This 4×8 phase correcting IDCT matrix is formulated by polyphase resolution of a prototype filter.

The picture decoding device 30 downdecodes the high resolution picture having the frequency response as shown in FIG. 27A to a standard resolution picture of a one-half resolution, having frequency characteristics such that the signal range is halved by a low-pass filter, as shown in FIG. 27B. Thus, the frequency characteristics required of the prototype filter result from the 4-tupled oversampling, as shown in FIG. 27C, in order to obtain a pixel value of the ¼ phase of the standard resolution picture.

Figure 28:
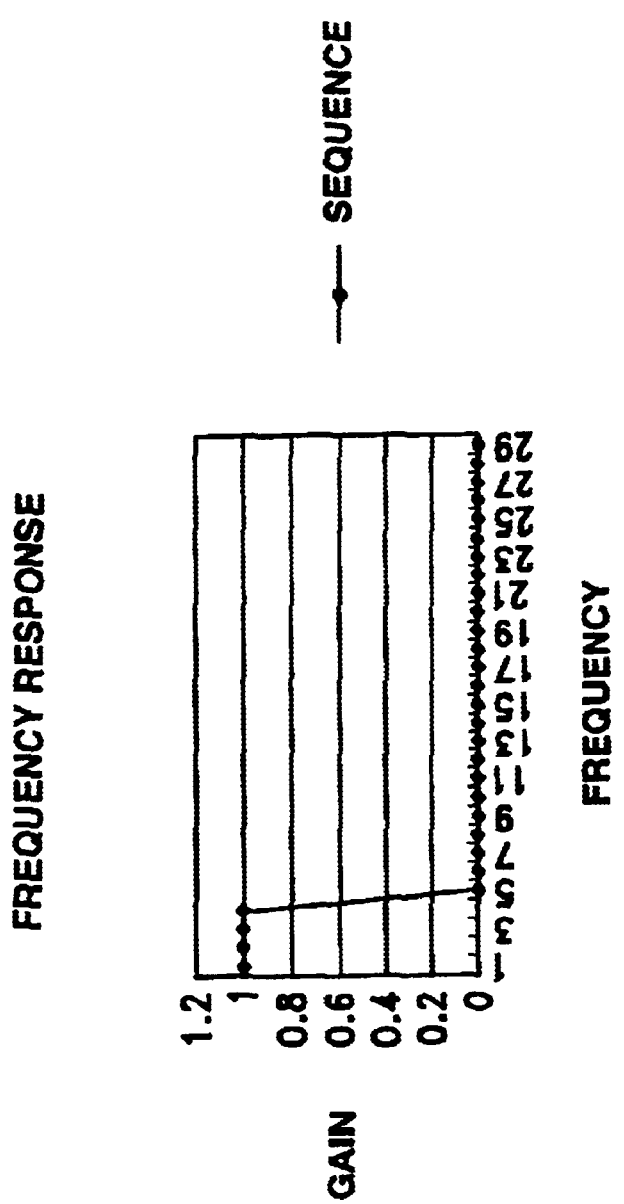
FIG. 28 illustrates a gain list formulated from frequency samples obtained on splitting the Nyquist frequency and the lower frequency into $\{(N-1)/2\}$ at equal intervals.

First, at step S31, the Nyquist frequency and the lower frequency are divided into $\{(N-1)/2\}$ equal intervals, and a gain list is formulated from the frequency samples. For example, the Nyquist frequency and the lower frequency are divided into equal (57−1)/2=28 intervals to formulate 29 gain lists, as shown for example in FIG. 28.

Figure 29:
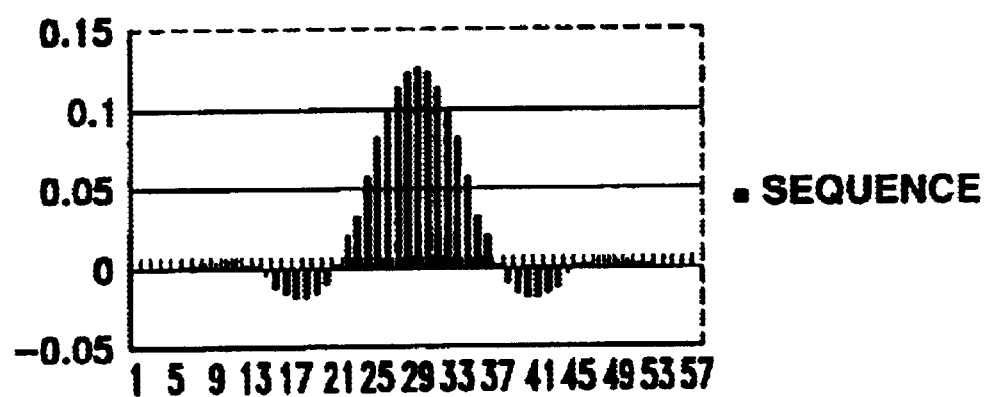
FIG. 29 illustrates the impulse response formulated by inverse discrete Fourier transforming the gain list.

Then, at step S32, 57 impulse responses are formulated by the frequency sampling method. That is, 29 gain lists ate inverse discrete cosine transformed to formulate 57 FOR impulse responses. These 57 impulse responses are shown in FIG. 29.

Next, at step Second ca holding portion 33, these impulse responses are multiplied with a window function to formulate 57-tap filter coefficients c1 to c57.

The filter prepared at this step Second ca holding portion 33 serves as the prototype filter.

Then, at step S34, the prototype filter, having the 57 filter coefficients c1 to c57, is polyphase-resolved to retrieve only 14 filter coefficients c'1 to c'14 having the ¼ phase correction characteristics to formulate a polyphase filter.

Figure 30:
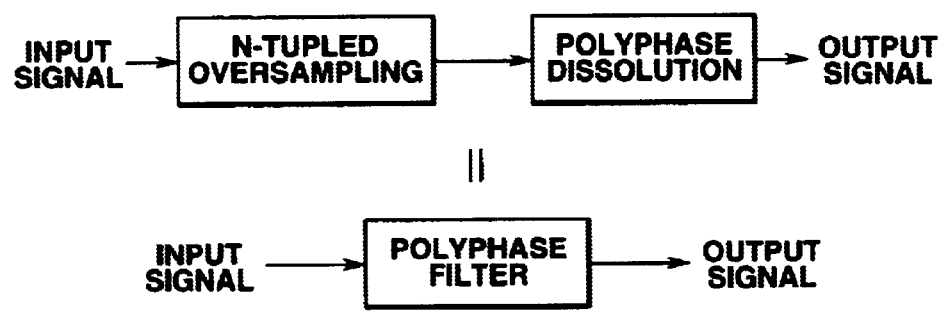
FIG. 30 illustrates a polyphase filter.
Figure 31:
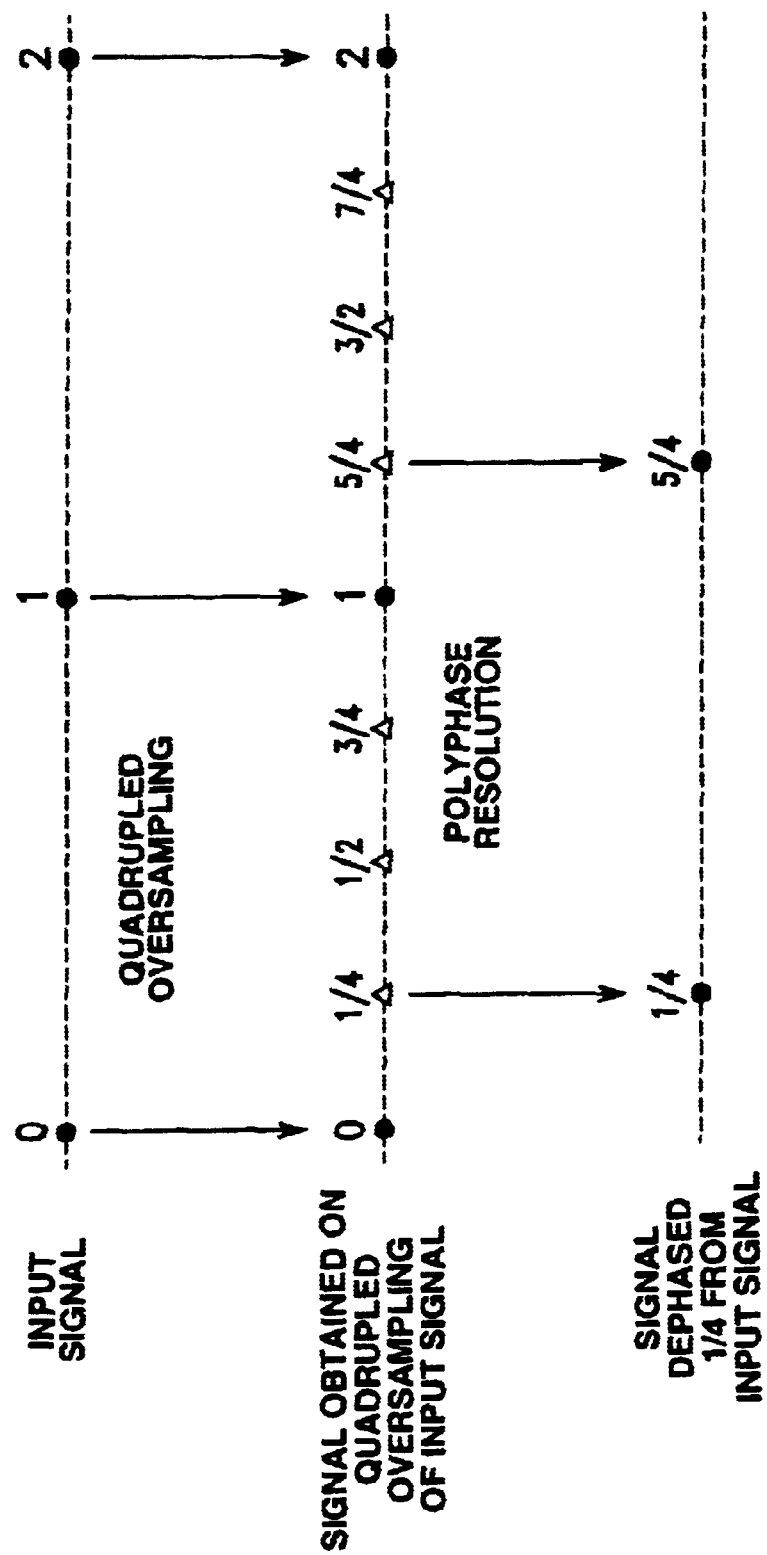
FIG. 31 illustrates the polyphase filter outputting a signal dephased by ¼ with respect to the input signal.

This polyphase filter is such a filter for oversampling an input signal by N times, and extracting pixels at an interval of N pixels from the oversampled signals, by way of polyphase resolution, for outputting signals dephased 1/N with respect to the input signal, as shown in FIG. 30. If desired to obtain a signal ¼ dephased with respect to the input signal, it suffices if the input signal is oversampled by a factor of four to retrieve a signal dephased by ¼ from the oversampled signal, as shown in FIG. 31.

Specifically, the 14 filter coefficients, formulated from the prototype filters c1 to c57 having 57 coefficients, are those having the following equation (5):

$$-0.000413627 \quad 0.0039878 \quad 0.00229913 \quad -0.015080 \quad -0.00939227 \quad 0.0561242 \quad 0.119497 \quad\quad (5)$$
$$0.095091 \quad 0.0017216 \quad -0.0190084 \quad -0.00554409 \quad 0.00518009 \quad 0.0014488 \quad -0.00122162.$$

After formulating the polyphase filter, the design processing is split between the 4×8 phase correction IDCT matrix for the top field and the 4×8 phase correction IDCT matrix for the bottom field.

Figure 32:
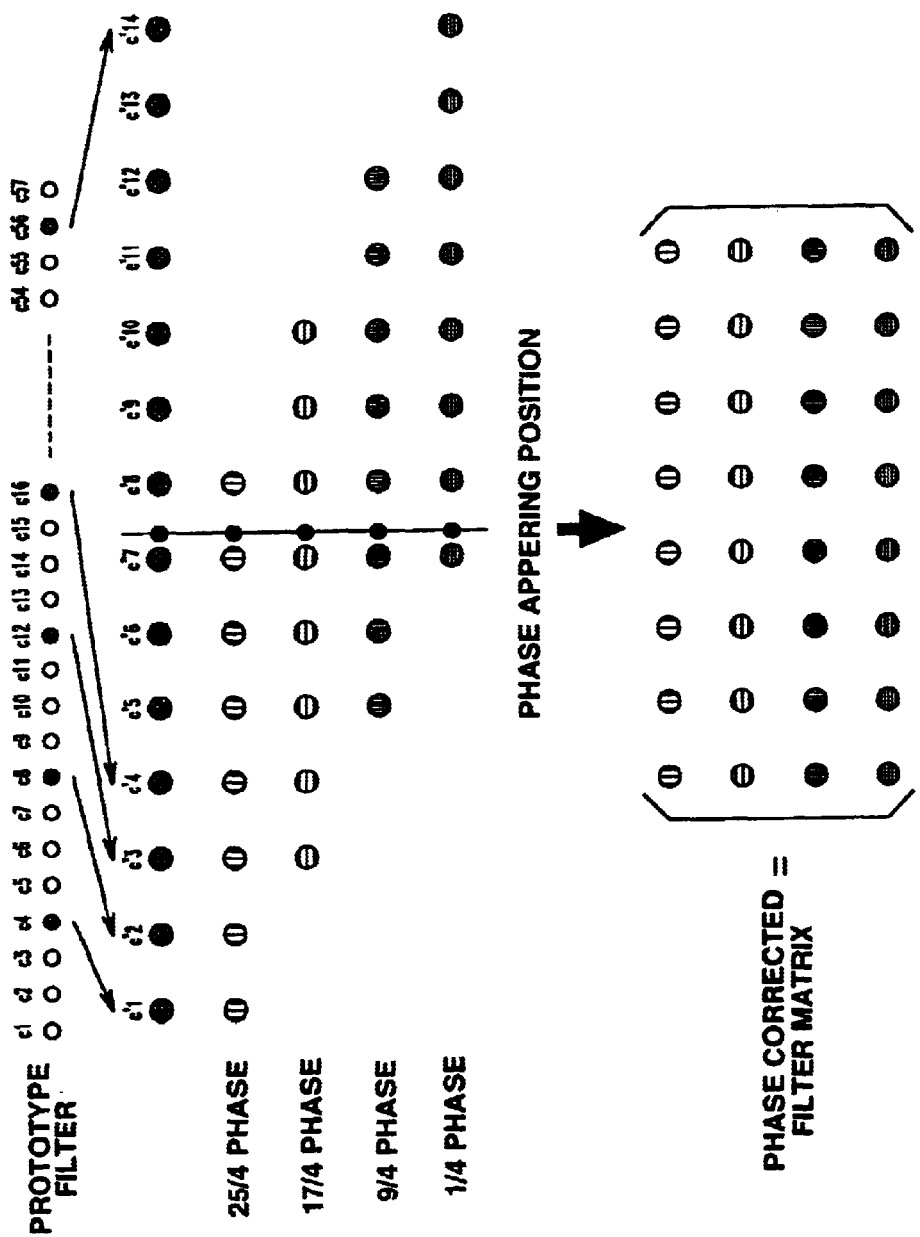
FIG. 32 illustrates the 4×8 phase correcting IDCT matrix for field mode in which processing is performed by the phase correcting decimating inverse discrete cosine transform device for the field mode.

First, in formulating the 4×8 phase correction IDCT matrix for the top field, eight coefficients with the group delay of ¼, ⁹⁄₄, ¹⁷⁄₄ and ²⁵⁄₄ phase are retrieved at step S35 from the polyphase-resolved 14 filter coefficients c'1 to c'14, so that the filter characteristics will be ¼ phase correction characteristics, to formulate a 4×8 phase correction filter matrix. The 4×8 phase correction filter matrix, thus prepared, is shown in FIG. 32.

From the 14 filter coefficients c'1 to c'14 of the equation (5), the coefficients shown by the following equation (7) are retrieved:

| | | | | | | | | |
|---|---|---|---|---|---|---|---|---|
| 25/4 phase | −0.000413627 | 0.0039878 | 0.00229913 | −0.015080 | −0.00939227 | 0.0561242 | 0.119497 | (6) |
| 17/4 phase | | | 0.00229913 | −0.015080 | −0.00939227 | 0.0561242 | 0.119497 | |
| 9/4 phase | | | | | −0.00939227 | 0.0561242 | 0.119497 | |
| 1/4 phase | | | | | | | 0.119497 | |

| | | | | | | |
|---|---|---|---|---|---|---|
| 0.095091 | | | | | | |
| 0.095091 | 0.017216 | −0.0190084 | | | | |
| 0.095091 | 0.017216 | −0.0190084 | −0.00554409 | −0.00518009 | | |
| 0.095091 | 0.017216 | −0.0190084 | −0.00554409 | −0.00518009 | 0.0014488 | −0.00122162 |

If a 4×8 phase correcting IDCT matrix is found from the coefficients of the equation (6), a matrix shown in the following equation (7) is found:

| | | | | | | | | |
|---|---|---|---|---|---|---|---|---|
| 0.119497 | 0.095091 | 0.017216 | −0.0190084 | −0.00554409 | 0.00518009 | 0.0014488 | −0.00122162 | (7) |
| −0.00939227 | 0.0561242 | 0.119497 | 0.095091 | 0.017216 | −0.0190084 | −0.00554409 | 0.00518009 | |
| 0.00229913 | −0.015080 | −0.00939227 | 0.0561247 | 0.119497 | 0.095091 | 0.017216 | −0.0190084 | |
| −0.000413627 | 0.0039878 | 0.00229913 | −0.015080 | −0.00939227 | 0.0561242 | 0.119497 | 0.095091 | |

If the 4×8 phase correcting IDCT matrix of the equation (7) is normalized, a matrix shown in the following equation (8) is obtained:

| | | | | | | | | |
|---|---|---|---|---|---|---|---|---|
| 0.561919 | 0.447153 | 0.809559 | −0.0893847 | −0.0260704 | 0.0243587 | 0.0068128 | −0.00574453 | (8) |
| −0.0382407 | 0.216559 | 0.461087 | 0.368915 | 0.066429 | −0.0733453 | −0.0213923 | 0.0199877 | |
| 0.00931777 | −0.0611172 | −0.0380645 | 0.227457 | 0.484291 | 0.38538 | 0.069772 | −0.0770364 | |
| −0.00164064 | 0.0158176 | 0.00911943 | −0.0598162 | −0.0372542 | 0.222615 | 0.473982 | 0.377176 . | |

At step S36, the 8×8 IDCT matrix is multiplied with this 4×8 phase correcting filter matrix to formulate a 4×8 phase correcting IDCT matrix for the top field.

The 4×8 phase correcting IDCT matrix, obtained on multiplying the 8×8 IDCT matrix with the 4×8 phase correcting filter matrix of the equation (8) is shown in the following equation (9):

| | | | | | | | | |
|---|---|---|---|---|---|---|---|---|
| 0.353553 | 0.470989 | 0.376964 | 0.182877 | −0.0419176 | −0.0790523 | −0.0325452 | −0.0123689 | (9) |
| 0.353553 | 0.249119 | −0.244534 | −0.39214 | −0.0586254 | 0.0447449 | 0.00293145 | 0.0032419 | |
| 0.353553 | −0.154747 | −0.424867 | 0.327667 | 0.101844 | −0.0599048 | 0.00729624 | −0.0053086 | |
| 0.353553 | −0.437751 | 0.267694 | −0.00183147 | −0.156649 | 0.0892455 | −0.0287812 | 0.0126261 . | |

For formulating a 4×8 phase correcting IDCT matrix for the bottom field, polyphase-resolved 14 filter coefficients c'1 to c'14 are inverted at step S37 in the left-and-right direction so that the filter coefficients will be ¾ phase correcting characteristics.

Then, at step S38, eight coefficients which will give the group delay of ¾, 11/4, 19/4 and 27/4 phase are retrieved at step S38 from the left-to-right inverted 14 filter coefficients c'1 to c'14 to formulate a 4×8 phase-correcting filter matrix.

Next, at step S39, the 8×8 IDCT matrix is multiplied with the 4×8 phase-correcting filter matrix to formulate a 4×8 phase correcting IDCT matrix for the bottom field.

By executing the processing of steps S31 to S39, it is possible to formulate a 4×8 phase correcting IDCT matrix worked on by the phase-correcting decimating inverse discrete cosine transform unit for field mode 31.

By the phase-correcting decimating inverse discrete cosine transform unit for field mode 31 performing matrix processing on the 4×8 phase-correcting filter matrix and on the input DCT coefficients, discrete cosine transformed with the field DCT mode, a standard resolution picture free of dephasing between the top and bottom fields can be produced on decoding. That is, with the phase-correcting decimating inverse discrete cosine transform unit for field mode 31, it is possible to generate a standard resolution picture (lower layer) which will give the phases in the vertical direction of the respective pixels of the top field of ¼, 9/4, ... and the phases in the vertical direction of the respective pixels of the bottom field of 5/4, 13/4, ..., as shown in FIG. 23.

The processing contents of the phase-correcting decimating inverse discrete cosine transform unit for frame mode 32 are explained in further detail.

Meanwhile, it is possible for the phase-correcting decimating inverse discrete cosine transform unit for frame mode 32 to execute the one-block processing and/or the two-block processing which will be explained subsequently. If necessary, it is possible to switch between the one-block processing and the two-block processing or to execute one of these processings.

Figure 33:
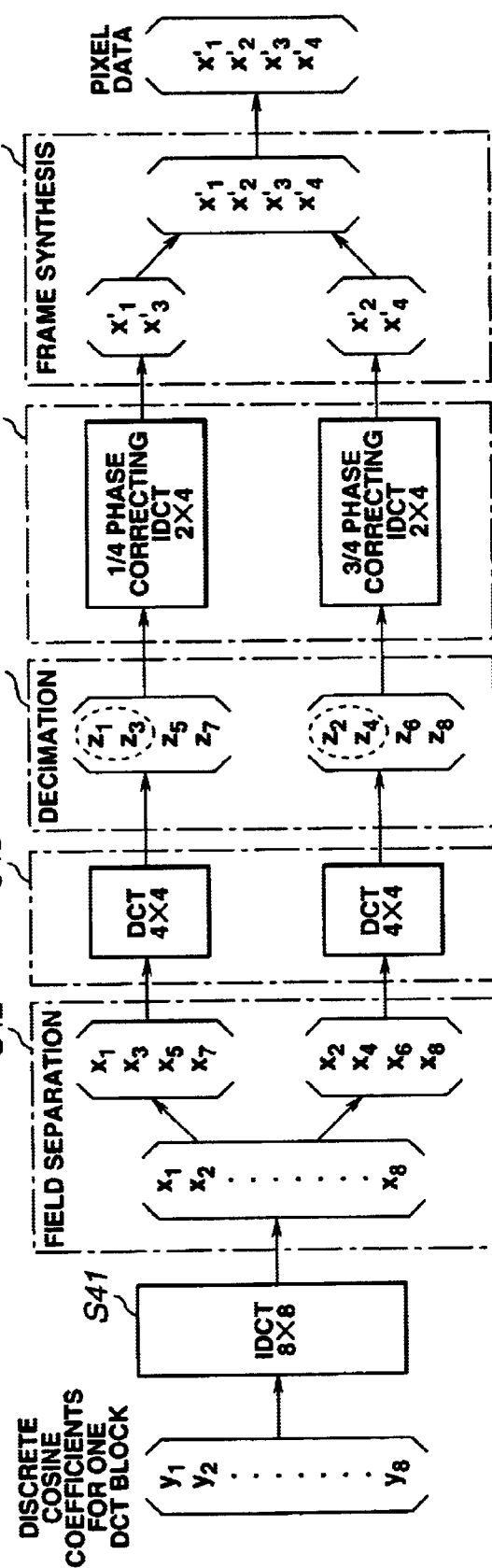
FIG. 33 illustrates the contents of one block processing of the phase correcting decimating inverse discrete cosine transform device for the frame mode of the picture decoding device shown in FIG. 9.

First, the one-block processing is explained. FIG. 33 illustrates the contents of the one-block processing.

The phase-correcting decimating inverse discrete cosine transform unit for frame mode 32 is fed with a bitstream, corresponding to a compression-encoded high resolution picture, in terms of a DCT block as a unit, as shown in FIG. 33.

First, at step S41, 8×8 inverse discrete cosine transform is applied to discrete cosine coefficients y of the sole DCT block. Then, at step S42, the 8×8 pixel data are field-separated into two pixel blocks. Then, at step Spring retainer 43, 4×4 discrete cosine transform is applied to each of the field-separated two pixel blocks. Next, at step S44, high-frequency components of the discrete cosine coefficients z of the respective pixel blocks are thinned out to give pixel blocks each made up of 2×2 discrete cosine coefficients. The processing as from the step S41 to the step S44 is the same as that from step S1 to step S4 for the one-block processing shown in FIG. 17.

Then, at step S45, inverse discrete cosine transform, having corrected the pixel dephasing in the vertical direction, is performed on the pixel block corresponding to the top field, using a 2×4phase correcting IDCT matrix adapted for performing ¼ pixel phase correction. On the other hand, inverse discrete cosine transform, having corrected the pixel dephasing in the vertical direction, is performed on the pixel block corresponding to the bottom field, using a 2×4 phase correcting IDCT matrix adapted for performing ¾ pixel phase correction. By performing the above-described decimating inverse discrete cosine transform, it is possible to produce 2×2 pixel data x', it being noted that pixel data in the vertical direction, among the totality of the pixel data of the pixel block corresponding to the top field, are denoted as $x'_1$ and $x'_3$, with pixel data in the vertical direction, among the totality of the pixel data of the pixel block corresponding to the bottom field, being denoted as $x'_2$, $x'_4$ in the drawing. These pixel data x' give a standard resolution picture (lower layer) in which the phases in the vertical direction of the respective pixels of the top field are ¼, 9/4 and those in the vertical direction of the respective pixels of the bottom field are 5/4, 13/4. The method for designing the 2×4 phase correcting IDCT matrix will be explained subsequently in detail.

Then, at step S46, pixel data of the pixel block corresponding to the top field and pixel data of the pixel block corresponding to the bottom field are synthesized to a frame. The processing at step S46 is the same as the processing at step S6 in the one-block processing shown in FIG. 17.

By performing the processing of steps S41 to S46, the phase-correcting decimating inverse discrete cosine transform unit for frame mode 32 is able to generate a picture free of phase deviation between respective pixels. On the other hand, the phase-correcting decimating inverse discrete cosine transform unit for field mode 31 is able to generate a picture free of dephasing with respect to the picture obtained on decoding by the phase-correcting decimating inverse discrete cosine transform unit for field mode 31.

It is also possible for the phase-correcting decimating inverse discrete cosine transform unit for frame mode 32 to execute the processing from step S41 to step S46 using a sole matrix.

Figure 34:
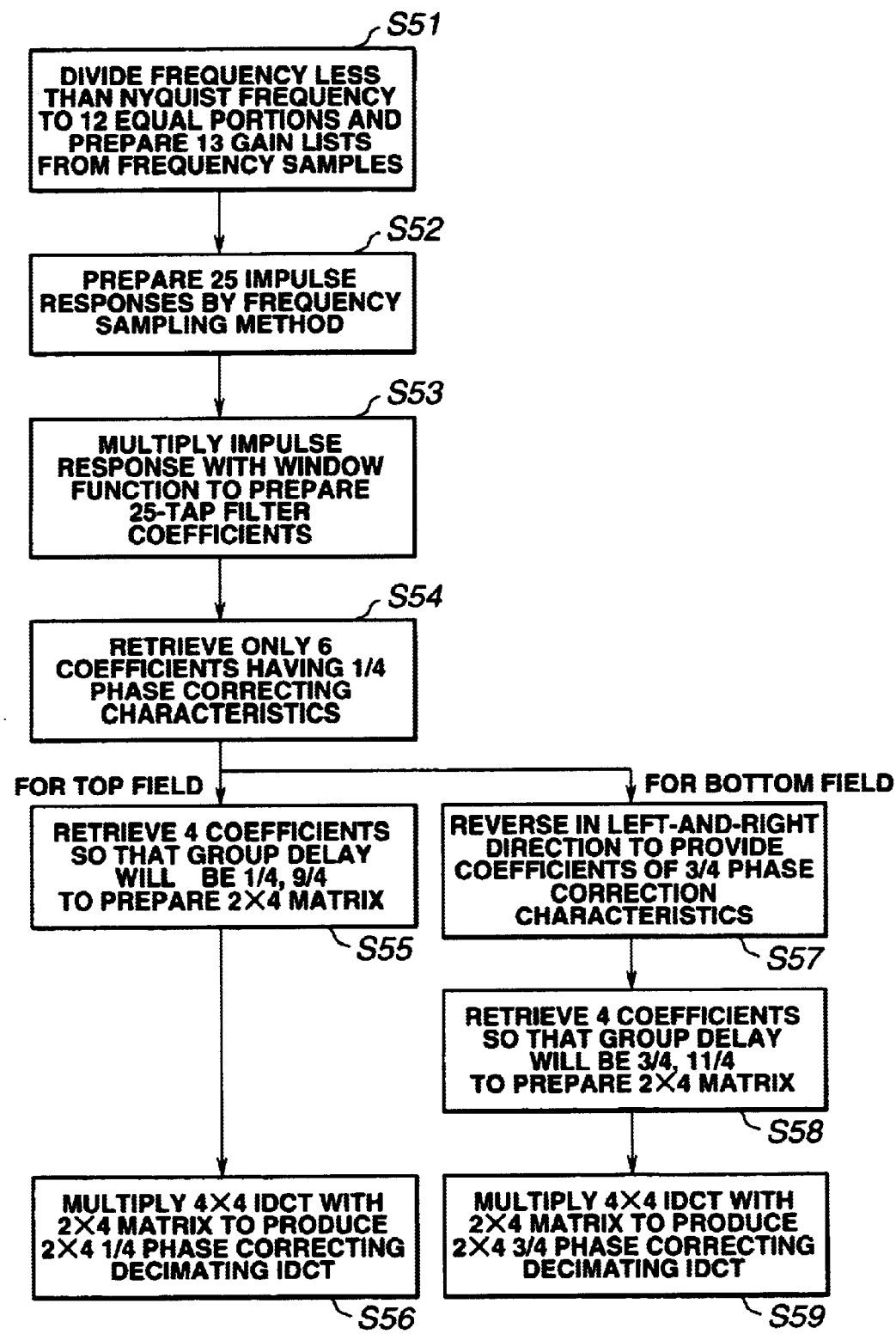
FIG. 34 is a flowchart for illustrating the designing contents of a 2×4 phase correcting IDCT matrix in which processing is performed by the phase correcting decimating inverse discrete cosine transform device for the frame mode.

The designing procedure for the 2×4 phase correcting IDCT matrix, processed at step S45 of the phase-correcting decimating inverse discrete cosine transform unit for frame mode 32, is shown in FIG. 34. This 2×8 phase correcting IDCT matrix is now explained.

Figure 35:
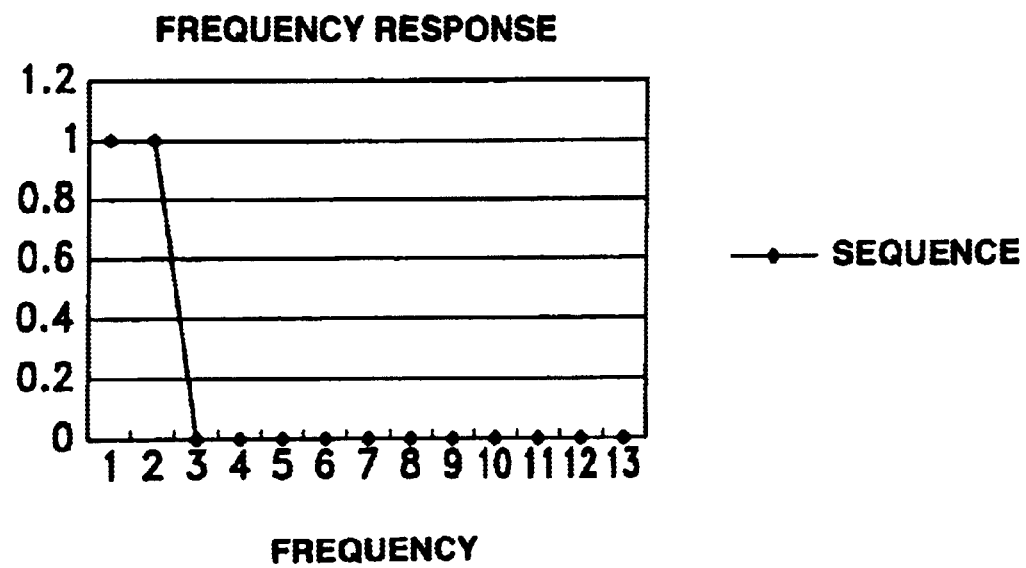
FIG. 35 illustrates a gain list formulated from frequency samples obtained on splitting the Nyquist frequency and the lower frequency into $\{(N-1)/2\}$ at equal intervals.

First, at step S51, the Nyquist frequency and the lower frequency are divided into $\{(N-1)/2\}$ equal intervals, and gain lists are formulated from the frequency samples. For example, the Nyquist frequency and the lower frequency are divided into equal $(25-1)/2=12$ intervals to formulate 13 gain lists, as shown in FIG. 35.

Figure 36:
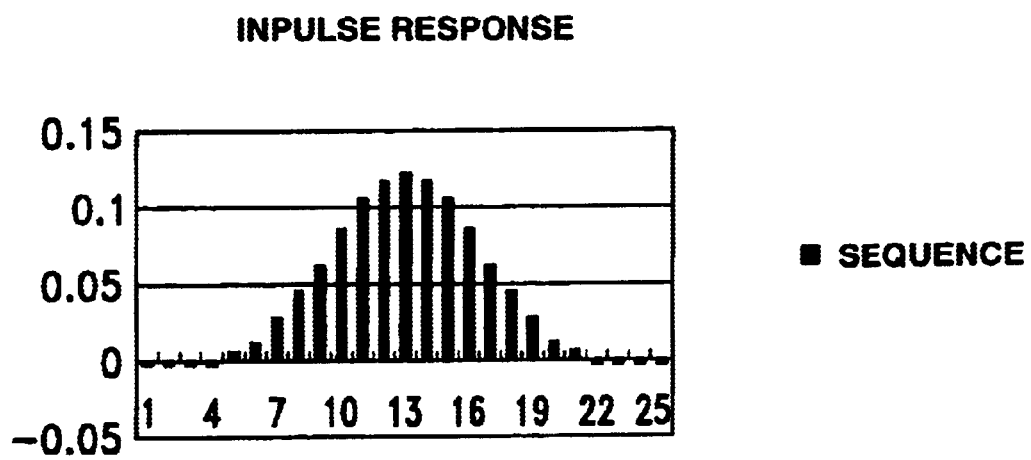
FIG. 36 illustrates the impulse response formulated by inverse discrete cosine transforming the gain list.

Then, at step S52, 25 impulse responses are formulated by the frequency sampling method. That is, 13 gain lists are inverse discrete cosine transformed to formulate 25 FOR impulse responses. These 25 impulse responses are shown in FIG. 36.

Next, at step S53, these impulse responses are multiplied with a window function to formulate 25-tap filter coefficients c1 to c25.

The filter prepared at this step S53 serves as the prototype filter.

Then, at step S54, the prototype filter, having the 25 filter coefficients c1 to c25, is polyphase-resolved to retrieve only 6 filter coefficients c'1 to c'6 having the ¼ phase correction characteristics to formulate a polyphase filter.

Specifically, the 14 filter coefficients, formulated from the prototype filters c1 to c25, having 25 coefficients c'1 to c'6, are as shown in the following equation (10):

$$-0.00236073 \quad 0.042655 \quad 0.115645 \quad 0.0850711 \quad 0.0105276 \quad 0.00328948 \quad (10).$$

After formulating the polyphase filter in this manner, the designing processing is split into a 2×4 phase-correcting IDCT matrix for the top field and a 2×4 phase-correcting IDCT matrix for the bottom field.

Figure 37:
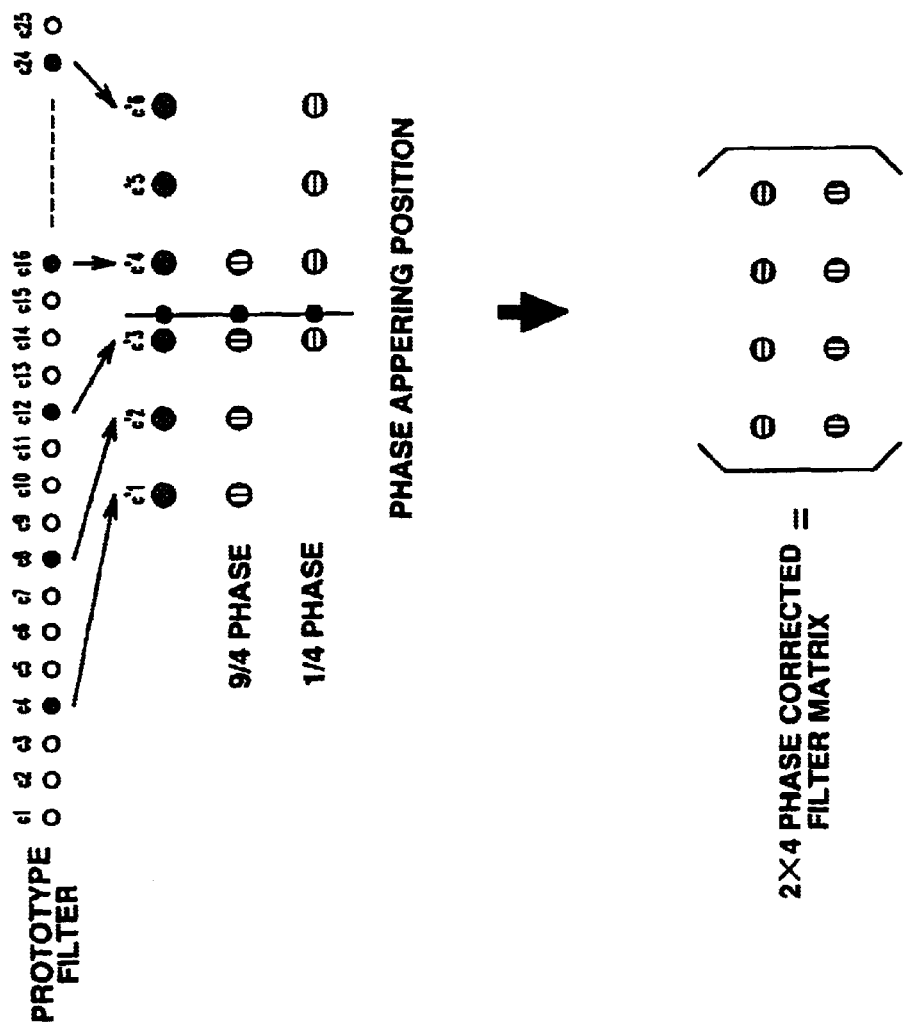
FIG. 37 illustrates a 2×4 phase correcting IDCT matrix in which processing is performed by the phase correcting decimating inverse discrete cosine transform device for the frame mode.

First, in formulating the 2×4 phase-correcting IDCT matrix for the top field, two coefficients are retrieved from each of the six polyphase-resolved filter coefficients c'1 to c'6, so that the group delay will be ¼ and ¾, respectively, to formulate a 2×4 phase-correcting filter matrix. The 2×4 phase-correcting filter matrix, thus formulated, is shown in FIG. 37.

For example, from the six filter coefficients c'1 to c'6 of the equation (10), the coefficients shown by the following equation (11) are retrieved:

| | | | | | | |
|---|---|---|---|---|---|---|
| 9/1 phase | −0.00236073 | 0.042655 | 0.115645 | 0.0850711 | | |
| 1/4 phase | | | 0.115645 | 0.0850711 | 0.0105276 | 0.00328948 | (11).|

If a 2×4 phase-correcting filter matrix is found from the coefficients of the equation (11), the matrix indicated by the following equation (12) is obtained:

| | | | | |
|---|---|---|---|---|
| 0.115645 | 0.0850711 | 0.0105276 | 0.00328948 | |
| −0.00236073 | 0.042655 | 0.115645 | 0.0850711 | (12). |

If the 2×4 phase-correcting filter matrix, shown by the equation (12), is normalized, the matrix shown by the following equation (13) is obtained:

| | | | | |
|---|---|---|---|---|
| 0.556108 | 0.409085 | 0.0506245 | −0.0158183 | |
| −0.00979515 | 0.176984 | 0.479834 | 0.352977 | (13). |

At step S56, the 4×4 IDCT matrix is multiplied with this 2×4 phase-correcting filter matrix to formulate a 2×4 phase-correcting IDCT matrix for the top field.

The 2×4 phase-correcting IDCT matrix, obtained on multiplying the 2×4 IDCT matrix with the 2×4 phase-correcting filter indicated by the above equation (13), is as shown in the following equation (14):

| | | | | |
|---|---|---|---|---|
| 0.5 | 0.470628 | 0.0402901 | −0.0794137 | |
| 0.5 | −0.318943 | −0.156819 | 0.0996811 | (14). |

On the other hand, in formulating a 2×4 phase-correcting IDCT matrix for the bottom field, the six polyphase-resolved filter coefficients c'1 to c'6 are inverted at step S57 in the left-and-right direction so that the filter coefficients will be of the ¾ phase correcting characteristics.

Then, at step S58, two coefficients are retrieved from each of the six polyphase-resolved filter coefficients c'1 to c'6, so that the group delay will be ¾ and 11/4, respectively, to formulate a 2×4 phase-correcting filter matrix.

At step S59, the 4×4 IDCT matrix is multiplied at step S59 with the 2×4 phase-correcting filter matrix to formulate the 2×4 phase-correcting filter matrix for the bottom field.

By performing the processing of the steps S51 to S59 as described above, it is possible to formulate the 2×4 phase-correcting filter matrix which the phase-correcting decimating inverse discrete cosine transform unit for frame mode 32 uses to perform the computations at step S45.

Figure 38:
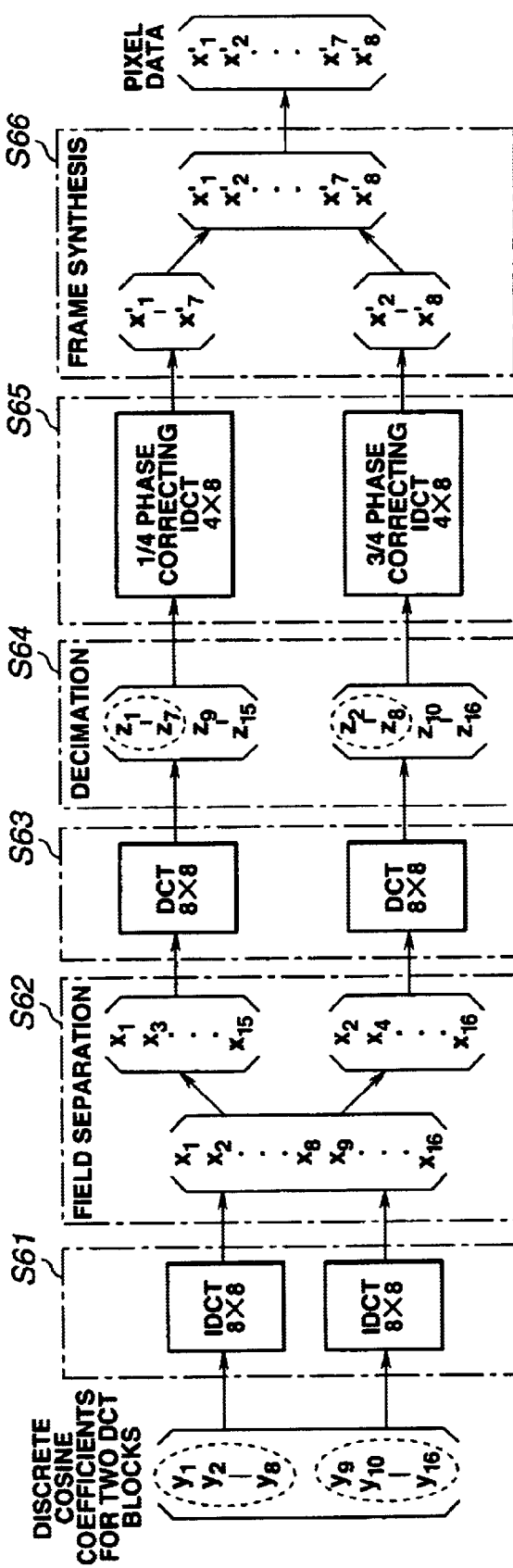
FIG. 38 illustrates the contents of two block processing of the phase correcting decimating inverse discrete cosine transform device for the frame mode of the picture decoding device shown in FIG. 11.

The two-block processing is now explained with reference to FIG. 38 illustrating the contents of the two-block processing.

The phase-correcting decimating inverse discrete cosine transform unit for frame mode 32 is fed with a bitstream, corresponding to the compression-coded high resolution picture, in terms of two DCT blocks as a unit, as shown in FIG. 38. If, for example, a macro-block is made up of four DCT blocks of luminance components and two DCT blocks of chroma components, two DCT blocks neighboring to each other along the vertical direction are inputted. If, for example, a macro-block is constituted as shown in FIG. 19, DCT blocks 0 and 2 of the luminance component (Y) are inputted as pairs, while DCT blocks 1 and 3 are also inputted as pairs.

First, at step S61, 8×8 inverse discrete cosine transform is applied independently to discrete cosine coefficients y of the two DCT blocks. The inverse discrete cosine transform gives 8×8 decoded pixel data x. Then, at step S62, two 8×8 pixel data are separated into respective fields. At the next step S63, 8×8 discrete cosine transform is executed on each of the two 8×8 pixel blocks separated into respective fields. At the next step S64, high-frequency components of the discrete cosine coefficients z of the pixel block of the top field obtained on 8×8 discrete cosine transform are thinned out to give a pixel block constituted by 4×4 discrete cosine coefficients. Also, high-frequency components of the discrete cosine coefficients z of the pixel block of the bottom field obtained on 8×8 discrete cosine transform are thinned out to give a pixel block constituted by 4×4 discrete cosine coefficients.

Figure 14:
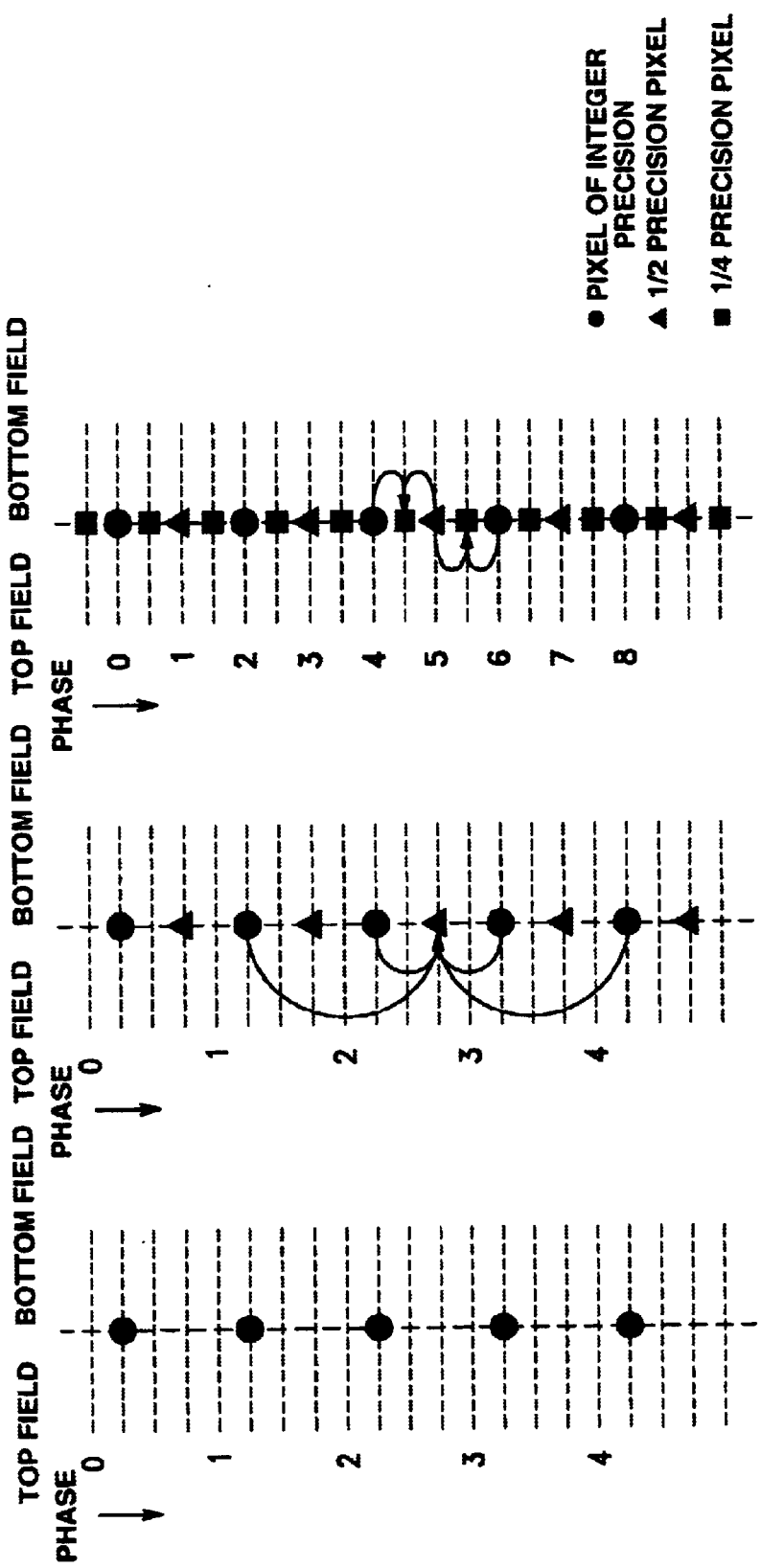
FIG. 14 illustrates the interpolation processing in the motion compensation device of the picture decoding unit adapted for coping with progressive images shown in FIG. 11.

The above-described processing from the step S61 to the step S64 is the same as the processing from step Spindle shaft inserting opening 11 to step S14 in the two-block processing shown in FIG. 14.

Then, at step S65, inverse discrete cosine transform, corrected for dephasing of pixels in the vertical direction, is performed on the pixel blocks of the top field, using a 4×8 phase-correcting IDCT matrix adapted for correcting the phase by ¼ pixel. Similarly, inverse discrete cosine transform, corrected for dephasing of pixels in the vertical direction, is performed on the pixel blocks of the bottom field, using a 4×8 phase-correcting IDCT matrix adapted for correcting the phase by ¾ pixel. By executing the above-described decimating inverse discrete cosine transform, it is possible to produce 4×4 pixel data x', it being noted that the pixel data along the vertical direction, among the totality of the pixel data of the pixel blocks of the top field are denoted as $x'_1$, $x'_3$, $x'_5$, $x'_7$, with the pixel data along the vertical direction, among the totality of the pixel data of the pixel blocks of the bottom field, being denoted as $x'_2$, $x'_4$, $x'_6$, $x'_8$. These pixel data x' generate a standard resolution picture (lower layer) in which the phases of the respective pixels of the top field in the vertical direction are ¼, 9/4, ..., with the phases of the respective pixels of the bottom field in the vertical direction being 5/4, 13/4, .... This designing method of the 4×8 phase-correcting IDCT matrix is the same as the matrix used in the processing by the phase-correcting decimating inverse discrete cosine transform unit for field mode 31.

Then, at step S66, pixel data of the pixel blocks of the top field and those of the pixel blocks of the bottom field are alternately taken on the line basis along the vertical direction and synthesized into a frame to generate decimating inverse discrete cosine transformed DCT blocks made up of 8×8 pixel data.

By the above-described two-block processing of the steps S61 to S66, it is possible with the phase-correcting decimating inverse discrete cosine transform unit for frame mode 32 to generate a picture free of dephasing between respective pixels. It is also possible to generate a picture free of dephasing with respect to the picture obtained on decoding by the phase-correcting decimating inverse discrete cosine transform unit for field mode 31.

It is also possible for the phase-correcting decimating inverse discrete cosine transform unit for frame mode 32 to perform the processing from the step S61 to the step S66 using a sole matrix.

In the above-described second embodiment of the picture decoding device 30, if an interlaced picture is inputted, 4×4 decimating IDCT is applied to each of the top and bottom fields, while phase correction is performed to decode a standard resolution picture. In the frame DCT mode, frame separation, decimating IDCT and phase correction are executed to decode the standard resolution picture. In the picture decoding device 30 of the second embodiment of the present invention, if the progressive picture is inputted, the progressive picture accommodating picture decoding unit 2 applies IDCT to the coefficients of the low-frequency components of the DCT block.

Thus, with the picture decoding device 1 of the first embodiment of the present invention, pixel dephasing between the field DCT mode and the frame DCT mode can be eliminated to improve the picture quality of the sequential scanned picture without detracting from the properties peculiar to the interlaced picture.

Meanwhile, the progressive picture accommodating picture decoding unit 2 and the interlaced picture accommodating picture decoding unit 3a of the picture decoding device 30 share certain components having the same processing contents. For example, the processing contents of the variable-length decoding units 3 and 12, those of the dequantizers 4 and 13, those of the addition units 6 and 16, those of the frame memories 7 and 17 and the picture frame conversion units 9 and 33 are the same. Therefore, these components may be owned in common by the progressive picture accommodating picture decoding unit 2 and the interlaced picture accommodating picture decoding unit 3a.

In the above-described picture decoding devices of the first and second embodiments, data processed in accordance with the present invention are not limited to data of pictures of the MPEG2 system. That is, the data processed in accordance with the present invention may be any picture data of the first resolution, compressed on encoding by orthogonal transform in terms of a pre-set pixel block as a unit. For example, the data processed in accordance with the present invention may be compressed picture data employing the wavelet system.

What is claimed is:

1. A picture decoding apparatus for decoding compressed picture data of a first resolution, obtained on predictive coding by motion prediction in terms of a macro-block as a unit and on compression coding by orthogonal transform in terms of an orthogonal transform block as a unit, to obtain moving picture data of a second resolution being lower than the first resolution, comprising:

first inverse orthogonal transform means for inverse orthogonal transforming an orthogonal transform block of the compressed picture data, orthogonal transformed by an orthogonal transform system in a field orthogonal transform mode associated with an interlaced scanning;

second inverse orthogonal transform means for inverse orthogonal transforming an orthogonal transform block of said compressed picture data, orthogonal transformed in accordance with an orthogonal transform system in a frame orthogonal transform mode associated with a sequential scanning;

first addition means for summing the compressed picture data, inverse orthogonal transformed by said first inverse orthogonal transform means or said second inverse orthogonal transform means, to motion compensated reference picture data, to output moving picture data of the second resolution;

first memory means for storing moving picture data outputted by said first addition means as reference picture data; and first motion compensation means for motion compensating the macro-block of the reference picture data stored in said first memory means;

correction means coupled to the first memory means and receiving picture data therefrom for correcting the picture data by post-filtering for phase deviation between top and bottom fields, with phases of respective pixels of the top field in a vertical direction being (1+2N)/2, where N is a positive even integer including zero and phases of respective pixels of the bottom field in the vertical direction being M, where M is a positive odd integer, so that the corrected phrase of the pixels of the top field in the vertical direction are P, where P is a positive even integer including zero, and so that the corrected phases of the pixels of the bottom field in the vertical direction are Q, where Q is a positive odd integer; said correction means being additionally coupled to the first addition means for converting a picture frame of the first resolution into a picture frame of the second resolution;

said first inverse orthogonal transform means inverse orthogonal transforming coefficients of low-frequency components of said orthogonal transform block;

said second inverse orthogonal transform means including a first picture decoding unit for inverse orthogonal transforming coefficients of the entire frequency components of said orthogonal transform block, separating respective pixels of the inverse orthogonal transformed orthogonal transform block into two pixel blocks associated with interlaced scanning, orthogonal transforming the separated two pixel blocks, inverse orthogonal transforming the coefficients of the low-frequency components of the two orthogonal transformed pixel blocks and synthesizing the inverse orthogonal transformed two pixel blocks to generate an orthogonal transform block;

third inverse orthogonal transform means for inverse orthogonal transforming the orthogonal transform block of compressed picture data, orthogonal transformed in the frame orthogonal transform mode;

second addition means for summing the compressed picture data, inverse orthogonal transformed by said third inverse orthogonal transform means, to motion compensated reference picture data, to output moving picture data of the second resolution;

second memory means for storing the moving picture data outputted by said second addition means as reference picture data; and second motion compensation means for motion compensating the macro-block of reference picture data stored in said second memory means;

said first inverse orthogonal transform means including a second picture decoding unit for inverse orthogonal transforming coefficients of low-frequency components of said orthogonal transform block;

conversion means couple to the second memory means and receiving picture data therefrom for converting a picture frame of the first resolution into a picture frame of the second resolution;

wherein if compressed picture data of the first resolution, encoded from the moving picture signals of the interlaced scanning system, are inputted, the moving picture data of the second resolution are decoded by said first picture decoding unit; and if compressed picture data of the first resolution, encoded from the moving picture signals of the sequential scanning system, are inputted, the moving picture data of the second resolution are decoded by said second picture decoding unit, whereby with said picture decoding apparatus for decoding compressed picture data of a first resolution, moving picture data of a second resolution lower than the first resolution is obtained regardless of whether the first or the second decoding unit is used.

2. A picture decoding apparatus for decoding moving picture data of a second resolution from compressed picture data of a first resolution, obtained on predictive coding by motion prediction in terms of a macro-block as a unit and on compression coding by orthogonal transform in terms of an orthogonal transform block as a unit, the second resolution being lower than the first resolution, comprising:

first inverse orthogonal transform means for inverse orthogonal transforming an orthogonal transform block of the compressed picture data, orthogonal transformed by an orthogonal transform system associated with an interlaced scanning;

second inverse orthogonal transform means for inverse orthogonal transforming an orthogonal transform block of said compressed picture data, orthogonal transformed in accordance with an orthogonal transform system associated with a sequential scanning;

addition means for summing the compressed picture data, inverse orthogonal transformed by said first inverse orthogonal transform means or said second inverse orthogonal transform means, to motion compensated reference picture data, to output moving picture data of the second resolution;

memory means for storing moving picture data outputted by said addition means as reference picture data; and motion compensation means for motion compensating the macro-block of reference picture data stored in said memory means;

said first inverse orthogonal transform means inverse orthogonal transforming coefficients of low-frequency components of said orthogonal transform block, correcting the phase by ¼ pixel with respect to a vertical direction of the respective pixels of the top field obtained on inverse orthogonal transform, correcting the phase by ¾ pixel with respect to the vertical direction of the respective pixels of the top field obtained on inverse orthogonal transform;

said second inverse orthogonal transform means including a first picture decoding unit for inverse orthogonal transforming coefficients of the entire frequency components of said orthogonal transform block, separating the inverse orthogonal transformed orthogonal transform block into two pixel blocks associated with the interlaced scanning, orthogonal transforming the separated two pixel blocks, inverse orthogonal transforming the coefficients of the low-frequency components of the orthogonal transformed two pixel blocks, correcting the phase of the respective pixels of the top field resulting from inverse orthogonal transform by ¼ pixel, correcting the phase of the respective pixels of the bottom field resulting from inverse orthogonal transform by ¾ pixel, and synthesizing the phase-corrected top and bottom fields; third inverse orthogonal transform means inverse orthogonal transforming an orthogonal transform block of said compressed picture data, orthogonal transformed in the frame orthogonal transform mode;

addition means for summing compressed image data inverse orthogonal transformed by said third inverse orthogonal transform means to motion compensated reference picture data to output moving picture data of second resolution;

memory means for storing the moving picture data outputted by said addition means as reference picture data; and motion compensation means for motion compensating a macro-block of the reference picture data stored in said memory means;

said first inverse orthogonal transform means including a second picture decoding unit for inverse orthogonal transforming the coefficients of low-frequency components of said orthogonal transform block;

wherein if compressed picture data of the first resolution, encoded from the moving picture signals of the interlaced scanning system, are inputted, the moving picture data of the second resolution are decoded by said first picture decoding unit; and if compressed picture data of the first resolution, encoded from the moving picture signals of the sequential scanning system, are inputted, the moving picture data of the second resolution are decoded by said second picture decoding unit.

3. A picture decoding method for decoding compressed picture data of a first resolution, obtained on predictive coding by motion prediction in terms of a macro-block as a unit and on compression coding by orthogonal transform in terms of an orthogonal transform block as a unit, to obtain moving picture data of a second resolution being lower than the first resolution, wherein if compressed picture data of the first resolution, encoded from moving picture signals of the an interlaced scanning system are inputted, an orthogonal transform block of the compressed picture data, orthogonal transformed in accordance with the orthogonal transform system associated with the g sequential scanning in a field orthogonal transform mode, is inverse orthogonal transformed;

an orthogonal transform block of the compressed picture data, orthogonal transformed in accordance with the orthogonal transform system associated with the sequential scanning in a frame orthogonal transform mode, is inverse orthogonal transformed;

the inverse orthogonal transformed compressed picture data is summed to motion compensated reference picture data;

reference picture data obtained on addition is stored as reference picture data;

a macro-block of the stored reference picture data is motion compensated;

coefficients of low-frequency components of the orthogonal transform block, orthogonal transformed in the field orthogonal transform mode, are inverse orthogonal transformed;

coefficients of the entire frequency components of said orthogonal transform block, orthogonal transformed in the frame orthogonal transform mode, are inverse orthogonal transformed, pixels of the inverse orthogonal transformed orthogonal transform block are separated into two pixel blocks associated with interlaced scanning, the separated two pixel blocks are respectively orthogonal transformed, coefficients of the low-frequency components of the two orthogonal transformed pixel blocks are inverse orthogonal transformed, and the two inverse orthogonal transformed pixel blocks are synthesized to generate an orthogonal transform block; and the picture data is corrected by post-filtering for phase deviation between top and bottom fields, with phases of respective pixels of the top field in a vertical direction being (1+2N)/2, where N is a positive even integer including zero, and phases of respective pixels of the bottom field in the vertical direction being M, where M is a positive odd integer, so that the corrected phases of the pixels of the top field in the vertical direction are P, where P is a positive even integer including zero, and so that the corrected phases of the pixels of the bottom field in the vertical direction are Q, where Q is a positive odd integer; and, a picture frame of the first resolution is converted into a picture frame of the second resolution;

and wherein if compressed picture data of the first resolution, encoded from the moving picture signals of the sequential scanning system, are inputted, the orthogonal transformed block of the compressed picture data, orthogonal transformed in the frame orthogonal transform mode, is inverse orthogonal transformed;

the inverse orthogonal transformed compressed picture data and the motion compensated reference picture data are summed together;

moving picture data resulting from the summation are stored as reference picture dala;

a macro-block of the stored reference picture data is motion compensated;

coefficients of the low-frequency components of said orthogonal transform block are inverse orthogonal transformed, and a picture frame of the first resolution is converted into a picture frame of the second resolution;

whereby with the picture decoding method for decoding compressed picture data of a first resolution, moving picture data of a second resolution lower than the first resolution is obtained when one of (i) compressed picture data of the first resolution, encoded from moving picture signals of the interlaced scanning system, and (ii) compressed picture data of the first resolution, encoded from the moving picture signals of the sequential scanning system, are inputted.

4. Picture decoding method for decoding moving picture data of a second resolution from compressed picture data of a first resolution, obtained on predictive coding by motion prediction in terms of a macro-block as a unit and on compression coding by orthogonal transform in terms of an orthogonal transform block as a unit, the second resolution being lower than the first resolution, wherein if compressed picture data of the first resolution, encoded from moving picture signals of the an interlaced scanning system are inputted, an orthogonal transform block of the compressed picture data, orthogonal transformed in accordance with the orthogonal transform system associated with a sequential scanning is inverse orthogonal transformed;

the inverse orthogonal transformed compressed picture data is summed to motion compensated reference picture data;

reference picture data obtained on addition is stored as reference picture data;

a macro-block of the stored reference picture data is motion compensated;

coefficients of low-frequency components of the orthogonal transform block, obtained on orthogonal transform in the field orthogonal transform mode, are inverse orthogonal transformed, the respective pixels of the top field obtained on inverse orthogonal transform are phase-corrected by ¼ pixel in the a vertical direction of the pixel, the respective pixels of the bottom field obtained on inverse orthogonal transform are phase-corrected by ¾ pixel in the vertical direction of the pixel, coefficients of the low-frequency components of the entire frequency components of the orthogonal transform block, obtained on orthogonal transform in the frame orthogonal transform mode, are inverse orthogonal transformed, the inverse orthogonal transformed orthogonal transform block is separated into two pixel blocks associated with interlaced scanning, the separated two pixel blocks are respectively orthogonal transformed, coefficients of the low-frequency components of the orthogonal transformed two pixel blocks are inverse orthogonal transformed, the respective pixels of the top field obtained on inverse orthogonal transform are corrected for phase by ¼ pixel in the vertical direction of the pixel, die respective pixels of the bottom field obtained on inverse orthogonal transform are corrected for phase by ¾ pixel in the vertical direction of the pixel, and the phase-corrected top and bottom fields are synthesized;

and wherein if compressed picture data of the first resolution, encoded from the moving picture signals of the sequential scanning system, are inputted, the orthogonal transformed block of the compressed picture data, orthogonal transformed in the frame orthogonal transform mode, is inverse orthogonal transformed;

the inverse orthogonal transformed compressed picture data and the motion compensated reference picture data are summed together;

moving picture data resulting from the summation are stored as reference picture data;

a macro-block of the stored reference picture data is motion compensated; and coefficients of the low-frequency components of said orthogonal transform block are inverse orthogonal transformed.

* * * * *